US006663926B1

(12) United States Patent
Okushita et al.

(10) Patent No.: US 6,663,926 B1
(45) **Date of Patent: *Dec. 16, 2003**

(54) HEAT-INSULATING CONTAINER AND APPARATUS FOR PRODUCING THE SAME

(75) Inventors: Masataka Okushita, Tokyo (JP); Kazuki Yamada, Tokyo (JP); Yuichi Hirai, Tokyo (JP); Yoichi Mochizuki, Tokyo (JP); Kenichi Endo, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/269,594

(22) PCT Filed: Aug. 27, 1998

(86) PCT No.: PCT/JP98/03814

§ 371 (c)(1),
(2), (4) Date: Mar. 29, 1999

(87) PCT Pub. No.: WO99/11526

PCT Pub. Date: Mar. 11, 1999

(30) Foreign Application Priority Data

| | | |
|---|---|---|
| Aug. 28, 1997 | (JP) | 9-245966 |
| Jan. 7, 1998 | (JP) | 10-11999 |
| Apr. 20, 1998 | (JP) | 10-109804 |
| May 8, 1998 | (JP) | 10-126491 |
| May 8, 1998 | (JP) | 10-126492 |
| May 8, 1998 | (JP) | 10-126493 |

(51) Int. Cl.[7] .......................... B29D 22/00; B29D 23/00; B32B 1/08

(52) U.S. Cl. ...................................................... 428/34.2

(58) Field of Search ......................... 428/34.2; 229/400, 229/403; 220/592.17, 592.27, 592.2, 672, 62.12, 62.2, 62.22; 493/158, 159, 95

(56) References Cited

U.S. PATENT DOCUMENTS

| | | | | |
|---|---|---|---|---|
| 2,266,828 A | | 12/1941 | Sykes | |
| 3,186,850 A | | 6/1965 | Anthony | |
| 3,456,860 A | * | 7/1969 | Jannick | 206/520 |
| 3,797,369 A | * | 3/1974 | Amberg | 493/100 |
| 4,007,670 A | * | 2/1977 | Albano et al. | 493/128 |
| 4,247,277 A | | 1/1981 | Marion | |
| 4,680,016 A | | 7/1987 | Lynch | |

(List continued on next page.)

FOREIGN PATENT DOCUMENTS

| | | |
|---|---|---|
| EP | 0695692 | 7/1996 |
| EP | 0695692 A2 | 7/1996 |
| FR | 1294731 | 7/1963 |
| FR | 1394731 | 7/1963 |
| WO | 9707030 | 2/1997 |
| WO | WO 97/07030 | 2/1997 |

*Primary Examiner*—Kenneth R. Rice
(74) *Attorney, Agent, or Firm*—Ladas & Parry

(57) ABSTRACT

A heat-insulating container is used for an instant dried food and is excellent in heat-insulating property, design and economy. The container comprises a paper cup body with a bottom, which has an inner surface coated with a polyolefin resin and is provided with an outward curled portion formed at an upper opening end of the cup body and at least one horizontal rib formed on a side wall of the cup body so as to project outward therefrom; and an inverse-frustoconical paper sleeve provided with an inward curled portion formed at a lower end of the sleeve. The cup body and the sleeve are integrally combined with each other so that an upper end of the sleeve is joined to an outer periphery of the side wall of the cup body, which is adjacent to the outward curled portion of the cup body, and an inner surface of the inward curled portion of the sleeve is joined to an outer periphery of a lower portion of the side wall of the cup body.

25 Claims, 41 Drawing Sheets

U.S. PATENT DOCUMENTS

| | | | | | |
|---|---|---|---|---|---|
| 5,145,107 | A | * | 9/1992 | Silver et al. | 229/4.5 |
| 5,460,323 | A | | 10/1995 | Titus | |
| 5,524,817 | A | * | 6/1996 | Meier et al. | 229/4.5 |
| 5,542,599 | A | * | 8/1996 | Sobol | 229/403 |
| 5,752,653 | A | * | 5/1998 | Razzaghi | 229/403 |
| RE35,830 | E | * | 6/1998 | Sadlier | 220/441 |
| 6,109,518 | A | * | 8/2000 | Mueller et al. | 229/403 |
| 6,126,584 | A | * | 10/2000 | Zadravetz | 493/109 |
| 6,193,098 | B1 | * | 2/2001 | Mochizuki et al. | 220/592.17 |
| 6,260,756 | B1 | * | 7/2001 | Mochizuki et al. | 220/592.17 |

* cited by examiner

FIG. 2A
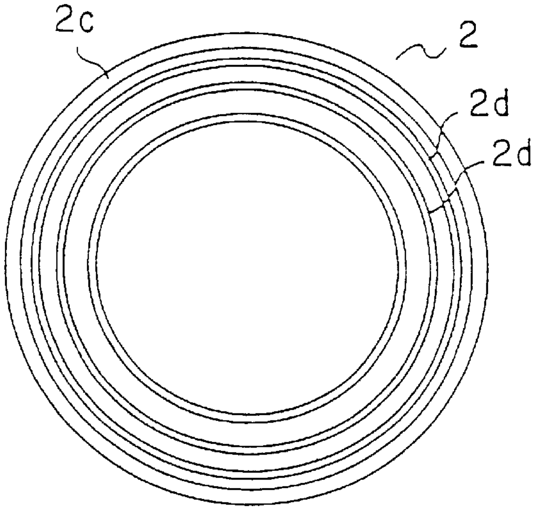
FIG. 2B
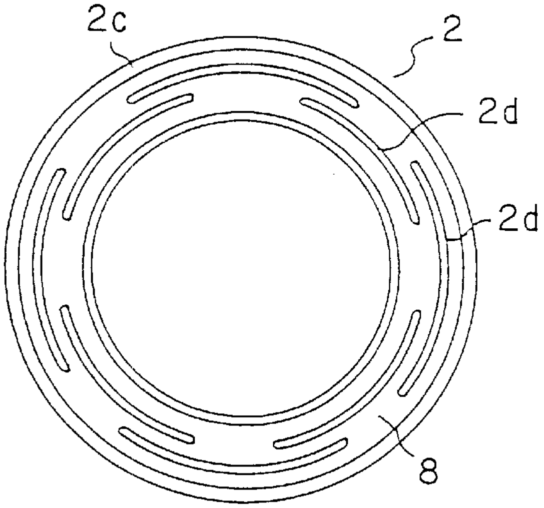
FIG. 3A
FIG. 3B
FIG. 3C
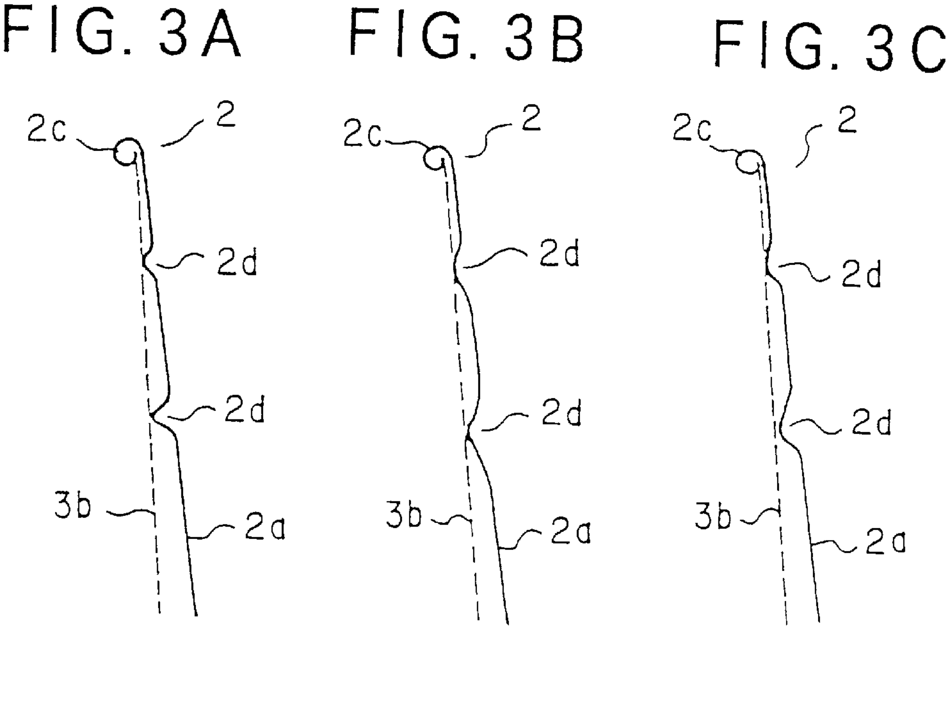

HEAT-INSULATING CONTAINER AND APPARATUS FOR PRODUCING THE SAME

TECHNICAL FIELD

The present invention relates to a heat-insulating container made of paper, which is used for an instant dried food to be become eatable by pouring boiled water over it and an apparatus suitable for producing at least one part of the container.

BACKGROUND ART

As a heat-insulating container made paper mainly used for instant dried Chinese noodles, there has widely been used a container in which a paper cup body surrounded over its outer periphery with a heat-insulating corrugated member subjected to a process so as to make an alternate arrangement of narrow projections and recesses in the longitudinal direction of the cup body.

In Japanese Patent Provisional Publication No. H8-113274, there is proposed a heat-insulating container in which a change in its cross-sectional shape is made so that the total area of concave portions on the outer surfaces of the container is decreased and the total area of flat portions thereon is increased. Such a container has been put to practical use.

In Japanese Patent Provisional Publication No. H4-45216 and Japanese Patent Provisional Publication No. H8-104372, there is proposed a heat-insulating container, in which a heat-insulating member subjected to a corrugating process or an embossing process so that no irregularity is formed on the outer surface of the container.

In Japanese Utility Model Provisional Publication No. 4-45212, there is made, on the other hand, a proposal that a heat-insulating property is given by a gap formed between a double-walled cup body.

The above-described container having the cup body surrounded with the heat-insulating corrugated member has a problem that the container has an unnecessarily larger thickness even in the upper portion thereof, which is not brought into contact with a hand, regardless of the cross-sectional shape of the heat-insulating member. The irregularity on the outer surface of the container may become obstacle to a high grade design to be given to the container, and characters, patterns and the like printed on the surface thereof may be made unclear and vague, thus causing problems.

In order to solve such problems of the external appearance of the container, there is made a proposal to cause the above-mentioned container to be surrounded with an additional liner or thin sheet of paper in Japanese Utility Model Provisional Publication No. S49-87479 and Japanese Utility Model Publication No. H4-45216. The container obtained in accordance with such a proposal has an uneconomic problem that the high production cost is required, an external appearance problem that the heat-insulating container may has the irregular bottom and the narrow projections and recesses or the embossed portions may be visible from the bottom, and an unhygienic problem that dust or a liquid may enter gaps of these portions.

FIG. 43 is a cross-sectional view of a conventional heat-insulating container 50 proposed in Japanese Utility Model Provisional Publication No. H4-45212. The heat-insulating container 50 is obtained by inserting a paper cup body 51 composed of a bottom plate 52 and a side wall 3b3 having an outward curled top portion 54 into a sleeve 55 provided on its lower end with an inward curled portion 56, and integrally combining the cup body 51 and the sleeve 55 with each other at the upper and lower contact portions of them. A heat-insulating space is formed with the utilization of the thickness of the curled portion 56 of the sleeve 55.

Such a heat-insulating container 50 does not use any specific heat-insulating member and has therefore no disadvantage caused by the heat-insulating member. When the container is actually held at the central portion of the side wall thereof with a hand, the sleeve 55 may however easily be warped inward to decrease the capacity of the heat-insulating space, thus deteriorating the heat-insulating property.

In addition, a container in which a sleeve is disposed on an outer periphery of a cup body is also proposed, for example, in Japanese Utility Model Provisional Publication No. S52-97282, and Japanese Patent Provisional Publication No. H4-201840. The container disclosed in these publications is provided with an outward projecting rib and the sleeve bonded to the rib.

However, in such structure, since the rib is formed into a round or triangular shape in its cross-section, only a ridge portion of the rib contacts the sleeve, so that a bonding area between the rib and the sleeve reduces, causing the lack of the bonding strength. Since the position of the rib changes variously in accordance with the type of the container, it is necessary to adjust the position to which the adhesive agent is applied in accordance with the position of the rib, so that a preparation for the process may be troublesome. In particular, if the rib functions as the Peter line indicating proper level of liquid poured in the container, the position of the rib often changes in accordance with a kind of a product packaged in the container, and thus the above mentioned problem may be more serious. Also, if the Peter line is adjacent to the curled portion of the cup body, distance between the sleeve and the cup body reduces and the resistance force during the combination process may increase to thereby cause an assembling error.

Further, it is desired to provide an apparatus capable of producing the container efficiently. In particular, it is preferable to form the sleeve completely without changing a mandrel on which a sheet-like blank as a material of the sleeve is curled. It is also desired to assemble the sleeve and the cup body correctly and efficiently.

Furthermore, it is particularly desired to provide an apparatus capable of facilitate a process for forming the rib on the side wall of the cup body. In Japanese Patent Provisional Publication No. H4-97833, there is disclosed a rib-processing apparatus in which an expandable chuck is inserted into the cup body, and the chuck expands outward at a predetermined position in the cup body to enlarge the container outside, thereby forming the rib.

However, since the apparatus disclosed in the above publication forms the rib on the side wall of the cup body all at once over an entire periphery thereof, it is necessary to add a relatively great force to the side wall with using force-magnification means, such as a wedge or the like, even if the rib is relatively small. Therefore, it is difficult to form a large rib. Also, since the chuck is driven in the cup body, it is necessary to locate one part of a driving mechanism for the chuck in a narrow space in the cup body, so that structure of the mechanism becomes complex. It needs a long time to take the chuck in and out against the cup body, so that it is difficult to form the rib efficiently.

DISCLOSURE OF INVENTION

One of objects of the present invention, which was made in order to solve the above-mentioned problems, is to provide a heat-insulating container made of paper, which has a stable heat-insulating property, a high grade design, a high degree of freedom in indication by printing on the outer surface of the container, and a lower production cost.

In order to attain the above-described object, the heat-insulating container of the present invention comprises:

a paper cup body with a bottom, which has an inner surface coated with a polyolefin resin and is provided with an outward curled portion formed at an upper opening end of the cup body and at least one horizontal rib formed on a side wall of the cup body so as to project outward therefrom; and an inverse-frustoconical paper sleeve provided with an inward curled portion formed at a lower end of the sleeve, the cup body and the sleeve are integrally combined with each other so that an upper end of the sleeve is joined to an outer periphery of the side wall of the cup body, which is adjacent to the outward curled portion of the cup body, and an inner surface of the inward curled portion of the sleeve is joined to an outer periphery of a lower portion of the side wall of the cup body.

Any number of the horizontal rib may be formed so as to extend continuously over the entire periphery or intermittently in the circumferential direction of the side wall of the cup body.

A heat-insulating corrugated member may be arranged between the sleeve and the upper portion of the side wall of the cup body.

According to the above invention, it is possible to provide the heat-insulating container made of paper, which is excellent in design and has a stable heat-insulating property, a smooth outer surface, a high grade external appearance and a high degree of freedom in indication by printing.

The container has an appropriate rigidity so as to prevent the occurrence of warp of the side wall, and it can therefore be easily held with a hand, with the result that it is possible to improve safety required for the container, which is to be filled with boiled water to make an instant dried food eatable received therein.

In addition, it is possible to prevent costs for material and production from rising, thus permitting the provision of the heat-insulating container at a low cost.

The heat-insulating container of the present invention is made of paper so as to be disposed easily without being subjected to segregated disposal, and it is also easy to decrease the volume of the container in the light of disposal thereof, thus leading to an excellent disposability. The container can easily be recycled. Thus, the present invention contributes to decrease in adverse influence on environment.

Another object of the present invention is to provide a heat-insulating container having improved structure in which a sleeve is surely bonded to a cup body.

In order to attain the above-mentioned object, there is provided a heat-insulating container comprising:

a cup body having a side wall and a bottom disposed on one end of the side wall, the side wall being provided with an outward projecting rib extending in a circumferential direction thereof and being provided at another end thereof with an outward curled portion; and a sleeve disposed outside the side wall with leaving a space therebetween and bonded to the side wall in a bonding area defined so as to be adjacent to the outward curled portion of the cup body, wherein the outward projecting rib is disposed only on an area apart from the bonding area.

According to the above container, since the outward projecting rib is eliminated from the bonding area, the sleeve and the side wall of the cup body can widely contact each other, so that the size of the bonding area is increase to thereby improve the bonding strength between the sleeve and the cup body. The bonding area is always disposed adjacently to the outward curled portion formed on a periphery of the opening end portion of the cup body, so that the position to be applied with the adhesive agent is not changed, regardless of the position of the outward projecting rib.

The sleeve may be provided at one end thereof with an inward curled portion capable of contacting an outer periphery of the one end of the side wall.

The side wall of the cup body may be provided with an inward projecting rib extending in the circumferential direction thereof. The inward projecting rib can be included in the bonding area, to thereby improve rigidity of the cup body without reducing the bonding are. The inward projecting rib may function as a line indicating a proper level of liquid poured into the cup body. The rib as the Peter line may be provided in the bonding area so as to be close to the outward curled portion.

According to still another aspect of the present invention, there is provided a heat-insulating container comprising:

a cup body having a side wall and a bottom disposed on one end of the side wall; and a sleeve disposed outside the side wall with leaving a space therebetween and bonded to the side wall;

wherein a rib indicating a proper level of liquid poured into the cup body is provided on the side wall so as to project inward therefrom.

In this case, it is possible to keep the bonding area sufficiently by defining it so as to include the rib as the Peter line.

According to still another aspect of the present invention, there is provided a heat-insulating container comprising:

a cup body having a side wall and a bottom disposed on one end of the side wall, the side wall being provided at another end thereof with an outward curled portion; and a sleeve disposed outside the side wall with leaving a space therebetween and bonded to the side wall in a bonding area defined so as to be adjacent to the outward curled portion of the cup body;

wherein the side wall is provided with an inward projecting rib included in the bonding area.

In this case, it is possible to keep the bonding area sufficiently by defining it so as to beyond the inward projecting rib toward the bottom of the cup body.

Still another object of the present invention is to provide a producing apparatus which can produce a heat-insulating container efficiently and rationally.

In order to attain the above-mentioned object, there is provided a producing apparatus for combining a sleeve on an outer periphery of a cup body to produce a heat-insulating container comprising:

a sleeve forming section for forming the sleeve by curling a blank sheet cylindrically and joining both ends thereof; and an assembling section for combining the sleeve on the outer periphery of the cup body;

the assembling section comprises;

a rib-processing device for processing a rib on a side wall of the container;

an adhesive-applying device for applying an adhesive agent on the side wall of the cup body formed with the rib; and a sleeve-delivering device for putting the sleeve formed by the sleeve forming section on the outer periphery of the cup body on which the adhesive agent is applied.

According to the above producing apparatus, the rib is formed on the cup body and the adhesive agent is applied thereto in the assembling section, while the sleeve is formed from the blank in the sleeve forming section. Then, the formed sleeve is put on the outer periphery of the cup body applied with the adhesive agent to combine them together. Since the processes necessary for producing the container are simultaneously with each other in two sections, it is possible to produce the container efficiently and rationally.

According to still another aspect of the present invention, there is provided a producing apparatus for combining a sleeve on an outer periphery of a cup body to produce a heat-insulating container comprising:

a sleeve holder capable of holding the sleeve;

a cup holder capable of holding the cup body; and a driving device for circulating the sleeve holder and the cup holder along respective certain circulation paths, wherein the apparatus is provided along the circulation path of the sleeve holder with a curling device for curling up a sheet-like blank on the sleeve holder and for joining both ends of the curled blank to each other and a sleeve-ejecting device for removing the sleeve from the sleeve holder;

the apparatus is also provided along the circulation path of the cup holder with a cup-body-supplying device for supplying the cup body to the cup holder, a rib-processing device for processing a rib on a side wall of the cup body set on the cup holder, an adhesive-applying device for applying an adhesive agent to the side wall of the cup body formed with the rib, and a sleeve-delivering device for receiving the sleeve ejected by the sleeve-ejecting device and for putting the received sleeve on the outer periphery of the cup body on which the adhesive agent is applied; and the driving device drives the sleeve holder and the cup holder in such a manner that the cup body on which the adhesive agent is applied is carried in the sleeve-delivering device when the sleeve on the sleeve holder is carried in the sleeve-ejecting device.

In this apparatus, the blank is curled on the sleeve holder to form the sleeve, and the prepared sleeve is removed from the sleeve holder and ejected to the sleeve-delivering device in accordance with the circulation of the sleeve holder. On the other hand, the cup body is set on the cup holder and carried in the sleeve-delivering device, after the rib is processed on the cup body and the adhesive agent is applied thereon. Then, the formed sleeve is put on the outer periphery of the cup body applied with the adhesive agent to combine them together. Since the processes necessary for producing the container are simultaneously with each other in two sections, it is possible to produce the container efficiently and rationally.

A end-curling device for processing a curled portion on one end of the sleeve may be provided on the circulation path of the sleeve holder.

A sleeve-fitting device for pressing the sleeve which is put on the cup body by the sleeve-delivering device toward the cup body with aligning the sleeve with respect to the cup body may be provided on the circulation path of the cup holder.

The apparatus may further comprise a blank-supplying device for supplying the blank to the curling device, and the blank-supplying device may be provided with an adhesive applicator for applying an adhesive agent to one end of the blank.

A sealing device for pressing both ends of the blank overlapped by the curling device to each other may be provided on the circulation path of the sleeve holder. The sealing device may be provided with a heater therein to hasten the adhesion between the cup body and the sleeve.

Still another object of the present invention is to provide a sleeve forming apparatus which can form a sleeve of a heat-insulating container efficiently, especially can perform an operation for curling up a blank on a mandrel and an operation for processing an end-curled portion to the curled blank without changing the mandrel.

In order to attaint the above object, there is provided a sleeve forming apparatus for forming a sheet-like blank into a sleeve used as an outer package of a heat-insulating container, comprising:

a mandrel having a body portion which is capable of being fitted inside the sleeve and which is shorter than the sleeve;

a curling device for curling up a blank on the mandrel in such a manner that one end portion of the blank to which an adhesive agent is applied is located under another end portion of the blank to form a joint line;

a main-sealing device for pressing the joint line onto the mandrel;

an assist-sealing device for nipping one end portion of the joint line, which projects from the mandrel by a pair of nippers;

an end-curling device for pressing a projecting portion of the blank, which projects from the mandrel, toward the mandrel to form a curled portion of the sleeve; and a sleeve-ejecting device for removing the sleeve from the mandrel.

According to the above sleeve forming apparatus, since one part of the blank curled on the mandrel projects therefrom, it is possible to form a curled portion of the sleeve with the sleeve being mounted on the mandrel. The end portion of the joint line can be pressed by the assist-sealing device, and the joint line is thus joined certainly.

The sleeve forming apparatus may further comprise a blank-supplying device for supplying the blank to the curling device with applying the adhesive agent to the one end of the blank.

The sleeve forming apparatus may further comprise: a conveyor capable of circulating along a predetermined circulation path and having mandrel-attachment portions arranged along the circulation path with leaving a certain interval therebetween, each of the attachment portions being provided with the mandrel; and a driving device for moving the conveyor intermittently by a pitch corresponding to the interval between the mandrel-attachment portions to feed the mandrel on each of the mandrel-attachment portions step by step with respect to a plurality of stations defined along the circulation path; and the curling device, the assist-sealing device, the end-curling device and the sleeve-ejecting device may be distributed to the stations in such a manner that the mandrel is fed to the curling device, the assist-sealing device, the end-curling device and the sleeve-ejecting in this described order in accordance with movements of the conveyor.

The main-sealing device may be movable along the circulation path together with the mandrel.

According to still another aspect of the present invention, there is provided a sleeve forming apparatus for forming a sheet-like blank into a sleeve used as an outer package of a heat-insulating container, comprising:

a conveyor capable of circulating along a predetermined circulation path;

a plurality of mandrels arranged on the conveyor so as to leave a certain interval therebetween in a circulation direction of the conveyor;

a driving device for moving the conveyor intermittently by a pitch corresponding to the interval between the mandrels to feed each of the mandrel step by step with respect to stations defined along the circulation path;

a blank-supplying device for supplying the blank to a curling station selected from the stations with applying an adhesive agent to one end portion of the blank;

a curling device for curling up the supplied blank on each of the mandrels in such a manner that said one end portion of the blank is located under another end portion thereof to form a joint line;

a sealing device for pressing both end portions of the blank, which forms the joint line, to each other; and a sleeve-ejecting device provided in an ejecting station which is selected from the stations and is located forward from the curling station in the circulation direction for removing the sleeve from each of the mandrels.

According to this sleeve forming apparatus, every time the conveyor moves by a certain amount, one mandrel holding the prepared sleeve is carried in the sleeve-ejecting device. The operation of the curling device and the operation of the sleeve-ejecting device are performed simultaneously with each other, so that the sleeve is formed efficiently.

Each of the mandrels may have a body portion which is capable of being fitted inside the sleeve and which is shorter than the sleeve, and the sealing device may comprise a main-sealing device for pressing the joint line of the blank to each of the mandrels and an assist-sealing device for nipping one end portion of the joint line, which projects from each of the mandrels, by a pair of nippers.

The assist-sealing device may be provided in an assist-sealing station selected from the stations and located between the curling station and the ejecting station.

The assist-sealing device may be provided in an assist-sealing station selected from the stations and located between the curling station and the ejecting station.

An end-curling device for processing an curled portion on a projecting portion of the blank, which projects from each of the mandrels, may be provided in at least one end-curling station selected from the stations and located between the assist-sealing station and the ejecting station.

The stations may include at least two end-curling stations, each of which is provided with the end-curling device.

The sleeve-ejecting device may remove the sleeve from each of the mandrels by pressing a roller onto the sleeve fitted on each mandrel with rotating the roller about an axis perpendicular to an axis of each mandrel.

The conveyor may comprise a turn table capable of turning about a predetermined axis.

Still another object of the present invention is to provide an assembling apparatus which can combine a sleeve and a cup body efficiently and correctly.

In order to attain the above-mentioned object, there is provided an assembling apparatus for combining a sleeve on an outer periphery of a cup body to produce a heat-insulating container, comprising:

a conveyor capable of circulating along a predetermined circulation path;

a cup holder mounted on the conveyor and having a rotary portion capable of rotating about an axis thereof with holding the cup body thereon;

a driving device for moving the conveyor to feed the cup body step by step with respect to stations defined along the circulation path;

a holder driving device provided in a driving station which is selected from the stations and capable of being connected with the rotary portion of the cup holder in the driving station to rotate the cup holder;

an adhesive-applying device provided in an applying station which is selected from the stations and is located forward from the driving station in a circulation direction of the conveyor and capable of applying an adhesive agent on an outer periphery of the cup body; and a sleeve-delivering device provided in a delivering station which is selected from the stations and is located forward from the applying station in the circulation direction and capable of putting the sleeve on the cup body.

According to the above assembling apparatus, when the cup holder holding the cup body is carried in the holder driving device, the rotary portion of the cup holder is rotatably driven by the holder driving device. Therefore, it is possible to perform various processing, preferably processing of elements extending in the circumferential direction of the cup body, such as the rib, with using the rotation of the cup body. If the cup body is carried into the adhesive-applying device while the cup body keeps its rotation due to inertia thereof, it is possible to apply the adhesive agent on the outer periphery of the cup body without driving the cup holder. Therefore, it is not necessary to provide any driving means for rotating the cup holder in the adhesive-applying device. Also, it is not necessary to provide any driving means for rotating the cup holder on the conveyor. As a result, the structure of the assembling apparatus is simplified.

The rotary portion of the cup holder may be provided with a disk-like rotation input portion coaxial with the cup body, and the holder driving device may comprise a rotation output portion and a drive power source for rotating the rotation output portion.

The adhesive-applying device may be provided with a nozzle ejecting the adhesive agent toward the outer periphery of the cup body.

The cup holder may be provided with an abutment portion capable of being brought into contact with an inner surface of a side wall of the cup body, and the holder driving device may comprise a press mechanism capable of pressing a predetermined model member to the abutment portion with nipping the side wall therebetween to process the side wall.

The conveyor may comprise a turn table capable of turning about a predetermined axis.

According to another aspect of the present invention, there is provided an assembling apparatus for combining a sleeve on an outer periphery of a cup body to produce a heat-insulating container, comprising:

a cup holder capable of holding the cup holder in an inverted posture in a vertical direction;

a sleeve-delivering device capable of putting the sleeve on the outer periphery of the cup body held on the cup holder from the upper side thereof; and a sleeve-fitting device having a jig capable of contacting an end portion of the sleeve put on the cup body in an axial direction thereof, the sleeve-fitting device being capable of pressing the jig toward the cup body to arrange the sleeve and the cup body with each other in an axial direction thereof;

wherein the jig is provided with an aligning equipment capable of engaging with the sleeve before the sleeve is pressed down by the jig to move the sleeve in a radial direction thereof so as to be aligned with the cup body.

According to the above assembling device, if the sleeve is put on the cup body in a miss-alignment manner, the sleeve is moved in its radial direction by the aligning equipment so as to be aligned against the cup body.

The aligning equipment may comprise pins arranged around the axis of the cup body on the cup holder.

Each of the pins may be supported by a jig body of the jig so as to be movable in the vertical direction, and a lower end portion of each of the pins may be formed with a tapered or rounded portion capable of contacting a lower end of a side wall of the cup body, which surrounds a bottom of the cup body.

Still another object of the present invention is to provide a rib-processing apparatus which can form a rib on a side wall of a cup body with reducing force to be added to the cup body and simplify structure thereof. Preferably, the rib-processing apparatus can form an outward projecting rib by an operation performed outside the cup body, and improve efficiency of process by omitting an operation of moving a model or the like in and out against the cup body.

In order to attain the above-mentioned object, there is provided a rib-processing apparatus for processing a rib on a side wall of a cup body so as to extend in a circumferential direction of the side wall comprising:

a male and a female model members disposed opposite to each other with putting the side wall therebetween, the male model member being provided on a portion facing the female model member with a projection to form a concave side of the rib, and the female model member being provided on a portion facing the male model member with a groove to form a convex side of the rib;

a radial direction driving device for moving at least one of the male and the female model members in a radial direction of the cup body so as to let the male and the female model members close to and away from each other;

a circumferential direction driving device for making a relative rotation between the cup body and at least one of the male and the female model members to change a position at which the side wall is nipped between the male and the female model members in the circumferential direction.

According to the above rib-processing apparatus, it is possible to form the rib gradually in the circumferential direction of the cup body, in accordance with the relative rotation between the cup body and the male or the female model member. Therefore, it is possible to reduce force added to the cup body during the process in comparison with the case in which the entire rib is formed at once.

The rib-processing apparatus may further comprise a cup holder capable of rotating about an axis thereof with supporting the cup body from an inside thereof, the cup holder may be provided with one of the male and the female model members, another one of the male and the female model members may be disposed on an outer periphery of the cup body, the radial direction driving device may move said another one of the male and the female model members in the radial direction of the cup body, and the circumferential direction driving device may rotate the cup holder.

One of the male and the female model members provided on the cup body may extend continuously over an entire periphery of the side wall of the cup body. In this case, it is possible to nip the side wall of the cup body by moving the male or the female model member provided outside the cup body in the radial direction, and under this condition, the rib can be formed by rotating the cup body. It is not necessary to drive the model member inside the cup body in the radial direction, and the model member outside the cup body may be driven only in the radial direction. Therefore, it is possible to simplify the structure of the apparatus.

A roller rotatable about an axis parallel to an axis of the cup body may be provided as said another one of the male and the female model members disposed on the outer periphery of the cup body.

The rib-processing apparatus may further comprise a restraining device for preventing the cup body from rising up from the cup holder.

The male model member may be provided inside the cup body, and the female model member may be provided outside the cup body.

According to still another aspect of the present invention, there is provided a rib-processing apparatus for processing a rib on a side wall of a cup body so as to extend in a circumferential direction of the side wall comprising:

a cup holder capable of rotating about an axis of the cup body with holding the cup body from an inside thereof;

a rotary drive mechanism for rotating the cup holder; and a press mechanism which is provided on one side of the cup holder and which has a press roller rotatable about an axis parallel to the axis of the cup body and a driving power source for moving the press roller reciprocally in a radial direction of the cup body, wherein one of a groove for forming a convex side of the rib and a projection for forming a concave side of the rib is provided on an outer periphery of the press roller, and another one of the groove and the projection is provided on the cup holder so as to accord a position thereof in a direction parallel to the axis of the cup holder with a position of said one of the groove and the projection provided on the press roller.

In this apparatus, the rib is formed on the side wall of the cup body gradually in the circumferential direction thereof by the steps of holding the cup body from the inside thereof by the cup holder, pressing the press roller on the side wall to nip the side wall between the groove of the press roller and the projection of the cup holder, and rotating the cup holder together with the cup body held thereon. Therefore, it is possible to reduce force added to the cup body during the process in comparison with the case in which the entire rib is formed at once. Since no member in the cup body is driven in the radial direction of the cup body and the press roller is only driven in the radial direction, it is possible to simplify the structure of the apparatus. Since the press roller can rotate about its axis, it is possible to reduce friction between the roller and the side wall of the cup body.

The rib-processing apparatus may further comprise a conveyor for conveying the cup holder through a plurality of processes, and the rotary driving mechanism and the press mechanism may be provided intermediate positions of a conveying path of the conveyor.

According to still another aspect of the present invention, there is provided a process for forming a rib on a side wall of a cup body so as to extend in a circumferential direction of the cup body, comprising by the steps of:

nipping one part of the side wall of the cup body by a male and a female model members, the male model member being provided on a portion facing the female model member with a projection to form a concave side of the rib, and the female model member being provided on a portion facing the male model member with a groove to form a convex side of the rib; and making a relative rotation between the cup body and at least one of the male and the female model members to change a position, at which the side wall is nipped between the male and the female model members in the circumferential direction of the side wall.

In this process, the rib is formed on the side wall of the cup body gradually in the circumferential direction thereof in the same manner as is mentioned above. Therefore, it is possible to reduce force added to the cup body during the process in comparison with the case in which the entire rib is formed at once.

In the above process, the cup body may be held from an inside thereof by an cup holder capable of rotating about an axis of the cup body, the cup holder may be provided with one of the male and the female model members, another one of the male and the female model members may be pressed on a side wall from an outside thereof to nip the side wall between the male and the female model members, and under this condition, the cup holder may be rotated.

A bottom of the cup body may be pressed down to the cup holder when the side wall is nipped by the male and the female model members.

Still further objects, features and other aspect of the present invention will be understood form the following detailed description of the preferred embodiments of the present invention with reference to the accompanying drawings.

BRIEF DESCRIPTION OF DRAWINGS

FIGS. 2A and 2B are bottom views, each of which illustrates the cup body of the heat-insulating container of the present invention;

FIGS. 3A to 3C are cross-sectional views, each of which illustrates the horizontal rib of the heat-insulating container of the present invention;

BEST MODE FOR CARRYING OUT THE INVENTION

The preferred embodiments of the present invention will be described below more in detail with reference to the attached drawings.

FIGS. 1A to 1D are descriptive views illustrating structure of a heat-insulating container of the present invention.

Figure 1A:
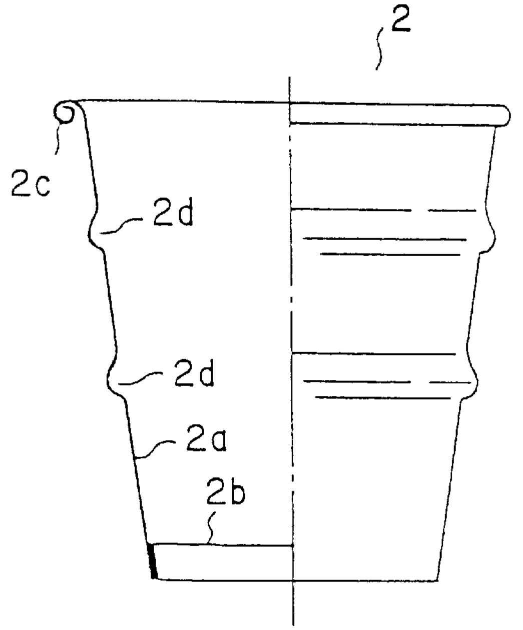
FIGS. 1A to 1D are descriptive views illustrating structure of a heat-insulating container of the present invention.
Figure 1B:
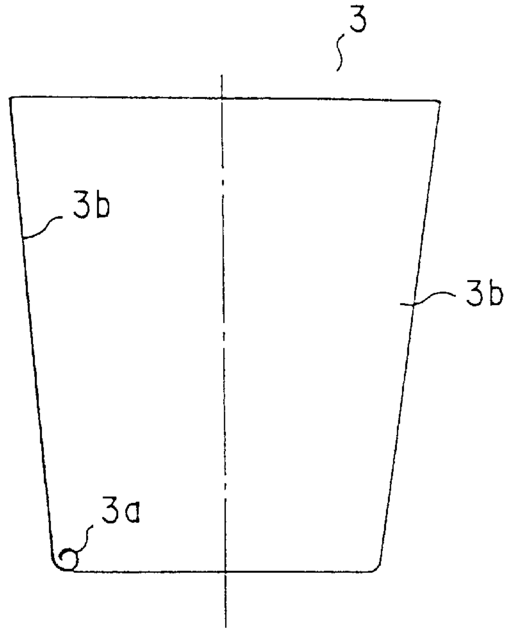
Figure 1C:
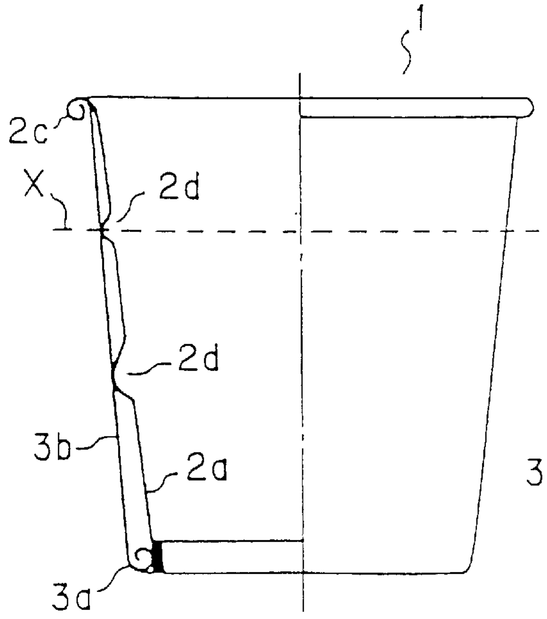

The heat-insulating container 1 of the present invention is composed of a cup body 2 made of paper, which has at the upper portion of the side wall 2*a* thereof an outward curled portion 2*c* and at the middle portion of the side wall 2*a* horizontal ribs 2*d*, 2*d*, and is provided with a bottom 2*b*, as shown in FIG. 1A, and an inverse-frustoconical paper sleeve 3, which has the upper and lower opening ends and is provided at its lower end with an inward curled portion 3*a*. The upper end portion of the sleeve 3 is joined by means of an adhesive agent with the outer periphery of the side wall 2*a* of the cup body 2, which is adjacent to the outward curled portion 2*c*, as shown in FIG. 1C. The inner surface of the inward curled portion 3*a* formed at the lower end of the sleeve 3 is also joined by means of the adhesive agent with the outer periphery of the lower end of the side wall 2*a* of the cup body 2, which forms the bottom. The cup body 2 and the sleeve 3 are integrally combined with each other in this manner so as to prepare the heat-insulating container 1 of the present invention.

The horizontal ribs 2*d*, 2*d*, which are formed on the side wall 2*a* of the cup body 2 so as to project outward have functions of improving the strength of the cup body 2 and forming a space for heat-insulation. A single horizontal rib or three or more horizontal ribs may be formed. The position of the horizontal ribs 2*d*, 2*d* may be determined taking into consideration the balance of strength of the cup body 2. It is however preferable to form one of the horizontal ribs 2*d*, 2*d* at the position, by which the formed rib 2*d* can also serve as the Peter line X, i.e., the line indicating an appropriate level of boiled water to be poured into the cup body 2, as shown in FIG. 1C.

Figure 43:
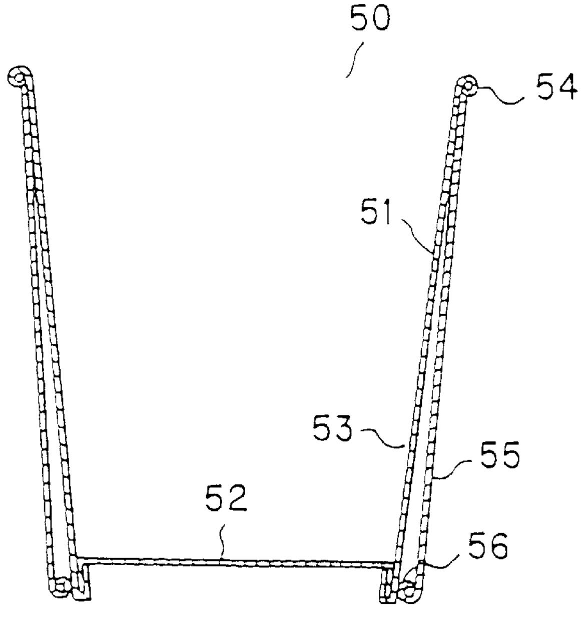
FIG. 43 PRIOR ART
FIG. 43 is a cross-sectional view of a conventional heat-insulating container.

In the heat-insulating container 1 of the present invention as shown in FIG. 1C, the horizontal ribs 2*d*, 2*d* support the side wall 3*b* of the sleeve 3, unlike the conventional heat-insulating container 50 as shown in FIG. 43, thus making it possible to prevent the side wall 3*b* of the sleeve 3 from being warped inward, when holding the middle portion of the side wall 3*b* with a hand. It is therefore possible to maintain the sufficient capacity of the space for heat-insulation, thus leading to the excellent heat-insulating property.

Figure 1D:
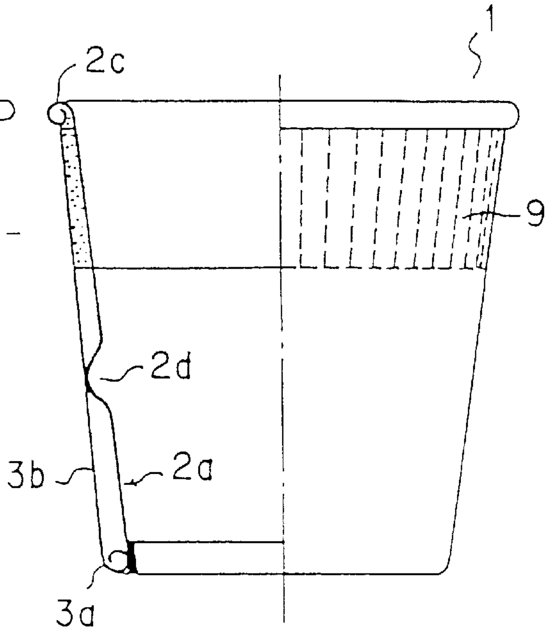

In the heat-insulating container 1 of the present invention, the horizontal distance of the heat-insulating space increases gradually toward the bottom of the container 1 so that the sufficient heat-insulating property can be obtained between the intermediate portion of the container 1 and the bottom thereof. The portion in the vicinity of the outward curled portion 2*c* at the top end of the container 1 has however a decreased heat-insulating property. In order to prevent decrease in the heat-insulating property at the top portion of the container 1, there can be provided the other embodiment of the heat-insulating container 1 of the present invention as shown in FIG. 1D. More specifically, the heat-insulating container 1 of the other embodiment of the present invention has the upper portion of the cup body, which is surrounded with a heat-insulating corrugated member 9 made of paper, which has alternate narrow projections and recesses. In this embodiment, the upper portion of the sleeve 3 is also joined in the vicinity of the outward curled portion 2*c* with the side wall 2*a* of the cup body through the heat-insulating member 9.

With respect to instant dried foods to be received in the heat-insulating containers 1 of the present invention as shown in FIGS. 1C and 1D, the container as shown in FIG. 1C is applicable in case where almost the half capacity of the container, which receives for example instant dried miso soup, instant dried Western soup or the like is to be filled with boiled water. The container as shown in FIG. 1D is applicable, on the other hand, in case where almost the entire capacity of the container, which receives for example instant dried Chinese noodles is to be filled with boiled water.

FIGS. 2A and 2B are bottom views illustrating the cup body of the heat-insulating container of the present invention.

Each of the horizontal ribs 2*d*, 2*d* formed at the middle portion of the cup body extends continuously over the entire periphery of the side wall 2*a* as shown in FIG. 2A. Each of these ribs 2*d*, 2*d* may extends intermittently in the circumferential direction of the side wall 2*a* as shown in FIG. 2B.

If the ribs 2*d*, 2*d* continuously formed and the ribs 2*d*, 2*d* intermittently formed are identical with each other in its number, the latter permits to expand the heat-insulating space and to cause the lower and upper heat-insulating spaces to communicate with each other so that the heated air can easily move over the entire zone of the heat-insulating space to maintain a uniform temperature distribution, resulting in improvement in the heat-insulating property, although the latter is slightly inferior to the latter in function of preventing warp of the side wall 3*b* of the sleeve 3.

When each of the horizontal ribs 2*d*, 2*d* is formed intermittently in the circumferential direction of the side wall 2*a* in this manner to form notches 8, it is preferable to divide the horizontal rib 2*d* or 2*d* into four to eight parts in the circumferential direction of the side wall 2*a*, and to maintain the ratio of the total length of the notches 8 to the entire periphery of up to 30 percent.

FIGS. 3A to 3C are cross-sectional views illustrating the horizontal rib of the heat-insulating container of the present invention.

The horizontal rib 2*d* formed on the cup body 2 preferably has a sharp-pointed shape as shown in FIG. 3A in the light of expansion of the heat-insulating space. The formation of the horizontal rib 2*d* having such a shape requires an excellent processing property of the sheet of paper, which is used for the cup body 2. The horizontal rib 2*d* having a gentle curve as shown in FIG. 3B can easily be formed without being subjected to restriction in processing property of the sheet of paper to be used. In this case, the contacting area of the both side walls 2*a*, 3*b* however increases and the capacity of the heat-insulating space decreases so as to deteriorate the heat-insulating property, thus causing unfavorable problems.

Therefore, the horizontal rib 2*d* most preferably has a cross-section as shown in FIG. 3C, which is obtained by the combination of the cross-sectional shapes of the horizontal ribs 2*d* as shown in FIGS. 3A and 3B, in the light of the heat-insulating property and the processing property described later.

Figure 4A:
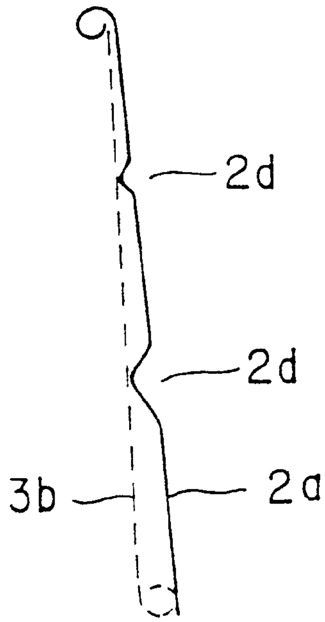
FIGS. 4A and 4B are descriptive views, each of which illustrates the insulating space ensured by the horizontal rib in the heat-insulating container of the present invention.
Figure 4B:
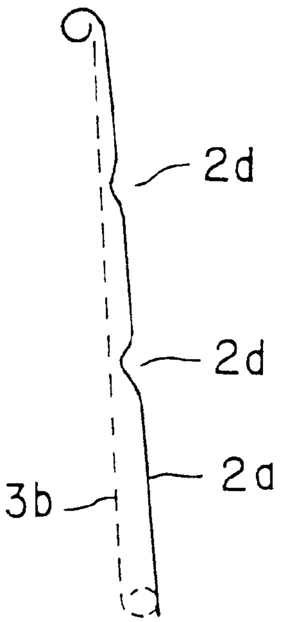

FIGS. 4A and 4B are descriptive views illustrating the insulating space ensured by the horizontal rib in the heat-insulating container of the present invention.

In the formation of the heat-insulating container 1 of the present invention, the horizontal ribs 2*d*, 2*d* may be brought into contact with the side wall 3*b* of the sleeve 3 as shown in FIG. 4A, or may not be done as shown in FIG. 4B.

When the horizontal ribs 2*d*, 2*d* are not brought into contact with the side wall 3*b* of the sleeve 3, the temperature of the outer surface of the heat-insulating container 1 is so low that the heat-insulating container 1 can be held with a hand, even after the completion of the process for soaking an instant dried food in boiled water poured into the container, although a slight warp of the side wall 3*b* of the sleeve 3 may be caused. The reason therefor is that the non-contacting condition of the rib 2*d* with the side wall 3*b* causes the heat-insulating space to be expanded, and the up-and-down circulation of air easily occurs between the both side walls 2*a*, 3*b*, thus permitting a uniform dispersion of heat.

The heat-insulating container 1 of the present invention has a capacity of 200 to 500 cc. When the paper cup body 2 having the capacity within the above-mentioned range is formed by means of the conventional paper cup forming machine, it is preferable to use a sheet of paper having a basic weight within the range of from 160 $g/m^2$ to 300 $g/m^2$. In general, the inner surface of the sheet of paper for the cup body is coated with the thermoplastic resin in an amount of 20 to 80 $\mu$m. The inner surface of the sheet of paper is coated for example with a polyolefin resin such as a low density polyethylene resin, a medium density polyethylene resin, a high density polyethylene resin, a linear low density polyethylene resin, or the like with the use of an extrusion coating method.

The resultant thermoplastic resin layer has functions of improving the cup formability, ensuring the sealing property of a cover (not shown) heat-sealed by means of a heat-sealing method and providing good formability of the horizontal rib 2*d*, in addition to the function of protecting the contents received in the container.

With respect to the sheet of paper used for the sleeve 3, there are required the good printing property as well as the formability of the curled portion. It is preferable for the sleeve 3 to use a sheet of coated fiberboard having a basic weight within the range of from 230 $g/m^2$ to 350 $g/m^2$ or a sheet of cardboard having a basic weight within the range of from 160 $g/m^2$ to 250 $g/m^2$.

With the basis weight of under the lower limit mentioned above, the rigidity of the sleeve 3 may remarkably be decreased, and a serious warp of the sleeve 3 may easily occur at an high temperature, thus leading to a poor heat-insulating property. With the basis weight of over the upper limit mentioned above, the forming property of the inward curled portion 3*a* may be deteriorated and the cost of material used for the sleeve 3 may be increased, thus causing unfavorable problems, although the rigidity of the sleeve 3 is improved.

When the material used for the sleeve 3 is subjected to a resin coating process or a resin impregnating process, it is possible to improve the rigidity, the proof compressive property, the proof collapsing property and the like so as to protect the contents received in the container from an external force applied to thereto during distribution of the container.

The heat-insulating container, which has not only a stable heat-insulating property over its entirety, but also a sufficient rigidity to prevent the occurrence of warp of the container permits to improve safety and reliability required for an eating container, which is to be filled with boiled water to make an instant dried food eatable received in the container, and is to be held with a hand in order to eat it. Such properties are considered as important factors especially for aged persons, physically handicapped persons and children, as well as essential factors required for barrier-free goods.

The heat-insulating container of the present invention is made of paper so as to be disposed easily without being subjected to segregated disposal. It is easy to decrease the volume of the container in the light of disposal thereof, due to the fact that the container has such an appropriate rigidity that a hand can easily collapse it. The container of the present invention has an excellent disposability and a smaller adverse influence on environment in comparison with the other conventional heat-insulating container using foamed plastic as the heat-insulating material.

In addition, no uneven portion is formed on the side wall of the heat-insulating container 1 of the present invention and in other words, the side wall has the smooth outer surface. The inward curled portion 3*a* of the sleeve 3 is located at the bottom of the container so as to reveal a moderate curvature. The heat-insulating container 1 therefore has an elaborated design as a cup-shaped container. The gap formed between the side wall 2*a* of the cup body 2 and the side wall 3*b* of the sleeve 3 at the bottom of the container is sealed with the inward curled portion 3*a* so as to prevent dust or foreign matters from entering the space formed between the side walls 2*a*, 3*b* and to prevent the absorption of liquid on the end of the sheet of paper for forming the cup body 2. The heat-insulating container 1 of the present invention can be kept hygienic.

The sleeve 3 has a high degree of freedom in printing, and can therefore be subjected without specific restriction not only to the conventional printing process such as an offset printing, a gravure printing, a flexo graphic printing or the like, but also to the conventional process such as a overcoating process, a stamping process, an embossing process or the like, which are to be carried out after the completion of the printing process. As a result, such printing and processing properties can provide an excellent aesthetic effect in cooperation with the smooth outer surface of the container mentioned above.

It is further possible to form an overcoating layer of varnish on the side wall of the sleeve 3 and/or the surface of the inward curled portion 3*a* so as to prevent these portion from being wetted and becoming unclean.

Next, the description will be given below of a method for manufacturing the heat-insulating container 1 of the present invention.

First, a tubular member having a frustoconical shape is formed from a fan-shaped blank sheet of paper with the use of a cup forming machine. A bottom plate 2 is then supplied to the cup forming machine to carry out a seaming treatment so as to form the bottom. Then, an outward curled portion is formed at the upper opening end of the tubular member and horizontal ribs 2*d*, 2*d* are formed, thus preparing a cup body 2.

The step for forming the horizontal ribs 2*d*, 2*d* may be carried out under the on-line condition of the cup forming machine or under the off-line condition thereof. More specifically, it is possible to form the horizontal rib 2*d* projecting outward from the cup body 2 by putting the formed cup body 2 having no ribs 4 into a forming cavity of a mold, which has grooves corresponding to the horizontal ribs 2*d*, 2*d* and strongly pressing the inner surface of the cup body 2 through a roller in the vicinity of the grooves, which is urged by means of an expander, while rotating the cup body 2.

In this case, when the roller is pressed on the entire periphery of the cup body 2, there can be formed the horizontal ribs 2*d*, 2*d* as shown in FIG. 2A, which extend continuously over the entire periphery of the cup body 2. When the roller is pressed only on the divided portions along the circumferential direction of the cup body 2, there can be formed the horizontal ribs 2*d*, 2*d* as shown in FIG. 2A, each of which extends intermittently in the circumferential direction of the cup body 2.

The cup body 2 is pulled out from the forming cavity of the mold after the completion of formation of the horizontal ribs 2*d*, 2*d*. The horizontal rib 2*d* having a gentle curved upper portion as shown in FIG. 3C may causes the cup body 2 to be more easily pulled out from the forming cavity in comparison with the horizontal rib 2*d* having a sharp pointed portion as shown in FIG. 3A, thus leading to an excellent formability.

The horizontal rib 2*d* can be formed by means of a drawing process using made and female dies.

A sleeve 3 can be prepared on the other hand by printing a pattern, a logotype, characters or the like on a cut sheet or a rolled sheet of cardboard or coated fiberboard, punching the sheet to form a fan-shaped blank sheet, applying an adhesive joining process to the thus formed fan-shaped blank sheet with the use of the cup forming machine to form a formed body having an inverse-frustoconical shape, and curling the under peripheral edge of the thus formed body to form the inward curled portion.

The cup body 2 is put into the sleeve 3 and the upper contacting portions of the cup body 2 and the sleeve 3 and the lower contacting portions thereof are joined with each other by means of an adhesive agent, thus completing the preparation of the heat-insulating container 1 of the present invention. The joining step applied to the lower contacting portions of the cup body 2 and the sleeve 3 may be omitted as the occasion demands.

The thus prepared heat-insulating container 1 of the present invention has a stacking property so that a plurality of containers 30 can be supplied under a stacked condition to a user.

An example of the heat-insulating container of the present invention will be described below.

The sample of the heat-insulating container of the present invention was prepared in accordance with the following manner:

| Particulars of the cup body 2 | |
|---|---|
| Capacity | 400 cc |
| Inside diameter of the upper end of the side wall | 88 mm |
| Outside diameter of the bottom | 66 mm |
| Height | 90 mm |
| Material | Sheet of paper having a basic weight of 280 g/m$^2$ provided with a polyethylene layer of 20 $\mu$m |
| Number of horizontal ribs | 2 |

| Particulars of the sleeve 3 | |
|---|---|
| Inside diameter of the inward curled portion | 66 mm |
| Thickness of the inward curled portion | 2.5 mm |
| Inside diameter of the upper end of the side wall | 89 mm |
| Height | 88.5 mm |
| Material | Sheet of coated fiberboard having a basic weight of 230 g/m$^2$ provided with a printing layer and an over coating layer of varnish |

The respective upper portions of the cup body 2 and the sleeve 3 and the respective lower portions thereof are joined with each other by means of an acrylic emulsion type adhesive agent so that the cup body 2 and the sleeve 3 are combined integrally with each other.

There was prepared, as a comparative sample, a heat-insulating container 50 as shown in FIG. 43, which was identical with the sample of the present invention except that the container 50 had no horizontal rib 2*d*.

Boiled water having a temperature of 95° C. was poured into each samples in an amount of 240 cc so that the level of boiled water reached the Peter line. After the lapse of time of 2 or 3 minutes, the middle portion of each of the samples was held by a hand to make a tactile inspection of temperature on the outer surface of each of the samples. The above-mentioned tactile inspection revealed the fact that the sample of the present invention was more excellent in heat-insulating property than the comparative sample and the temperature of the outer surface of the former was lower than that of the latter, thus making it possible to keep holding the sample of the former without perceiving the high temperature.

Such a tactile inspection was made under two conditions, i.e., the firm holding condition and the soft holding condition of the sample. In the sample of the present invention, perception of heat under the firm holding condition was substantially identical with that under the soft holding condition. In the comparative sample, heat was more seriously perceived under the firm holding condition rather than the soft holding condition.

Next, the embodiment of the apparatus for producing the heat-insulating container will be described below in detail.

Figure 5:
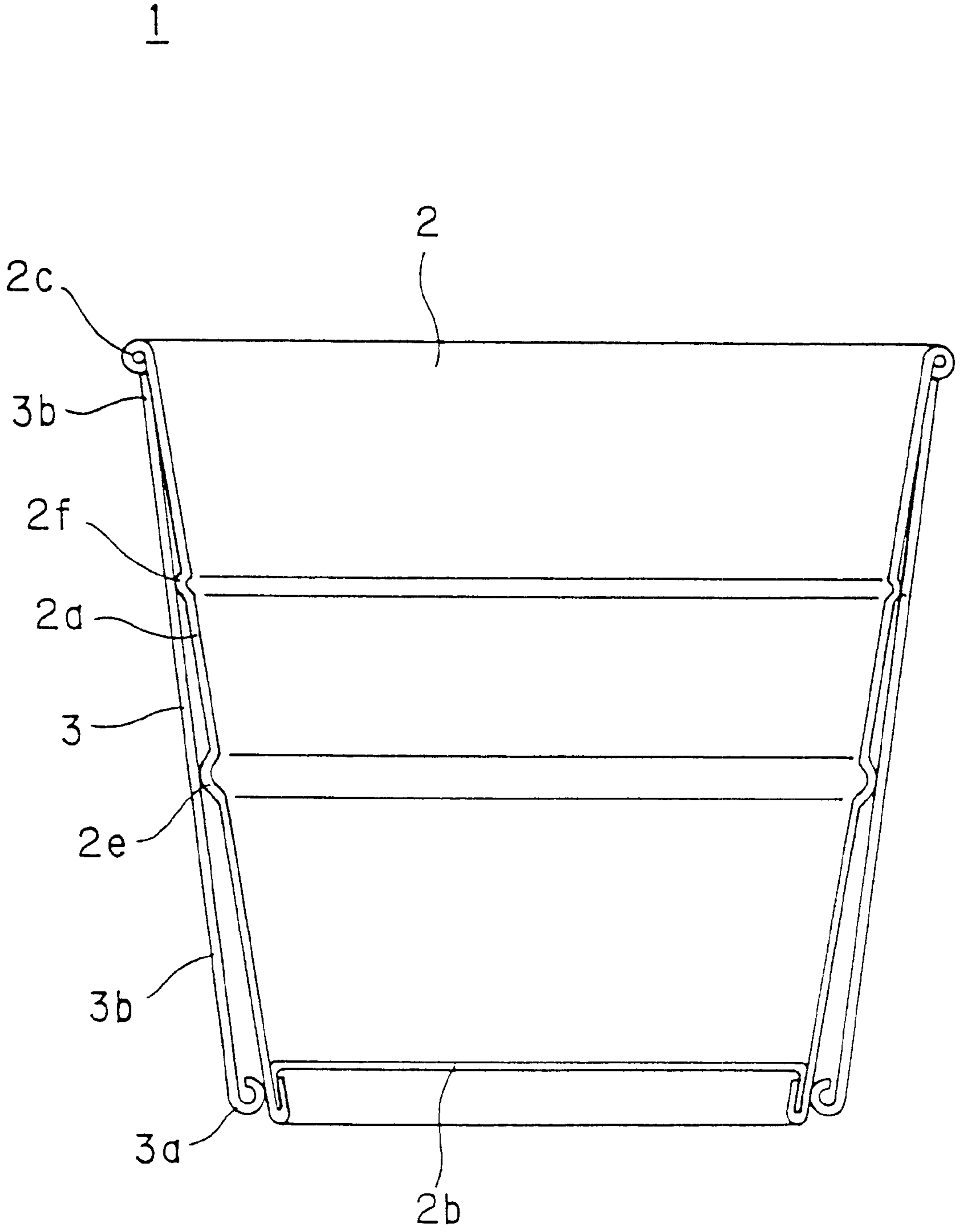
FIG. 5 is a sectional view of the heat-insulating container produced by a processing apparatus of the present invention.
Figure 6:
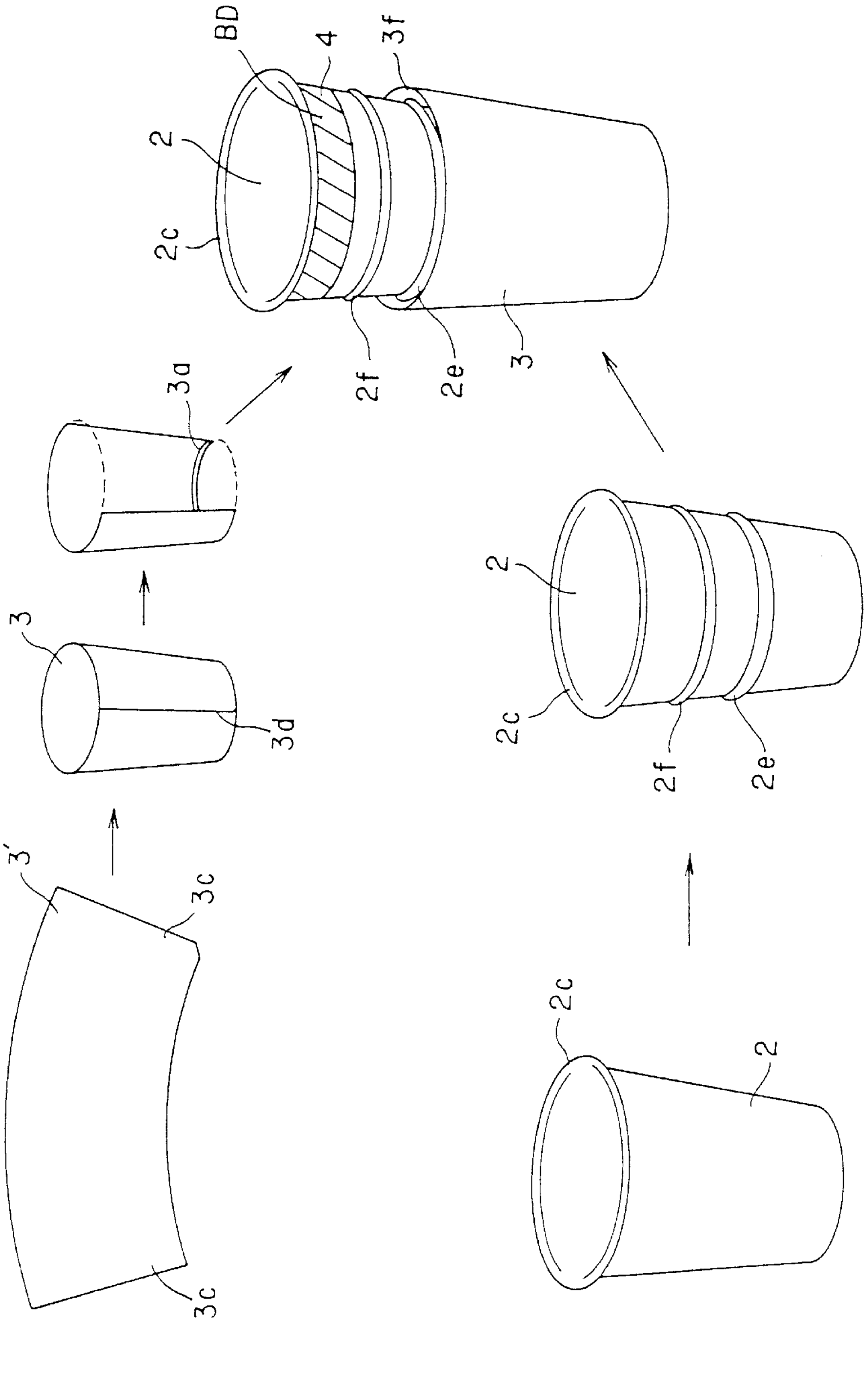
FIG. 6 is a view illustrating a schematic process for producing the container.

FIG. 5 shows an example of a heat-insulating container prepared by the producing apparatus of the present invention, and FIG. 6 shows a schematic process for producing the container. The container 1 described in FIG. 5 is composed of the cup body 2 and the sleeve 3 in the same way as in the case of FIG. 1C. The cup body 2 is formed in a frustoconical shape having the side wall 2*a* and the bottom 2*b*. On the periphery of the opening end of the cup body 2, there is formed an outward curled portion 2*c*, and after forming this, two ribs 2*e*, 2*f* are formed on the side wall 2*a* so as to project outward in a radial direction of the container 1, respectively. Each of the ribs 2*e*, 2*f* is provided for reinforcing the cup body 2, and the upper rib 2*f* functions as the Peter line indicating a proper level of poured matter, such as boiled water. The lower rib 2*e* is somewhat greater than the upper rib 2*f*. The projecting amounts of the ribs 2*e*, 2*f* are determined so as not to contact the inner surface of the sleeve 3, respectively. The material of the cup body 2 is, for example, a sheet of paper having basic weight of 150 to 400 g/m$^2$, and at least the inner surface of the cup body 2 is coated with a coating layer, such as a polyethylene layer, to improve the heat-resisting and water-resisting properties thereof.

The sleeve 3 is provided for improving the heat-insulating property of the container 1. As is clearly illustrated in FIG. 6, the sleeve 3 is formed by the steps of curling a fan-shaped paper blank 3' into a frustoconical shape, joining both ends 3*c*, 3*c* of the blank 3' with each other and processing inward curled portion 3*a* on the lower end thereof. The container 1 is prepared by the steps of applying an adhesive agent 4 on a predetermined bonding area (a hatched area in FIG.6) BD of the cup body 2, assembling the cup body 2 and the sleeve 3 to thereby join the upper end portion 3*f* of the sleeve 3 and the side wall 2*a* of the cup body 2 with each other. The material of the sleeve 3 is, for example, paper having basic weight of 150–400 g/m$^2$. Since the sleeve 3 contacts neither cold water nor boiled water, it is possible for the sleeve 3 to omit a coating layer contrary to the cup body 2.

Next, an apparatus for producing the container 1 will be explained with reference to FIGS. 7 to 37.

Figure 7:
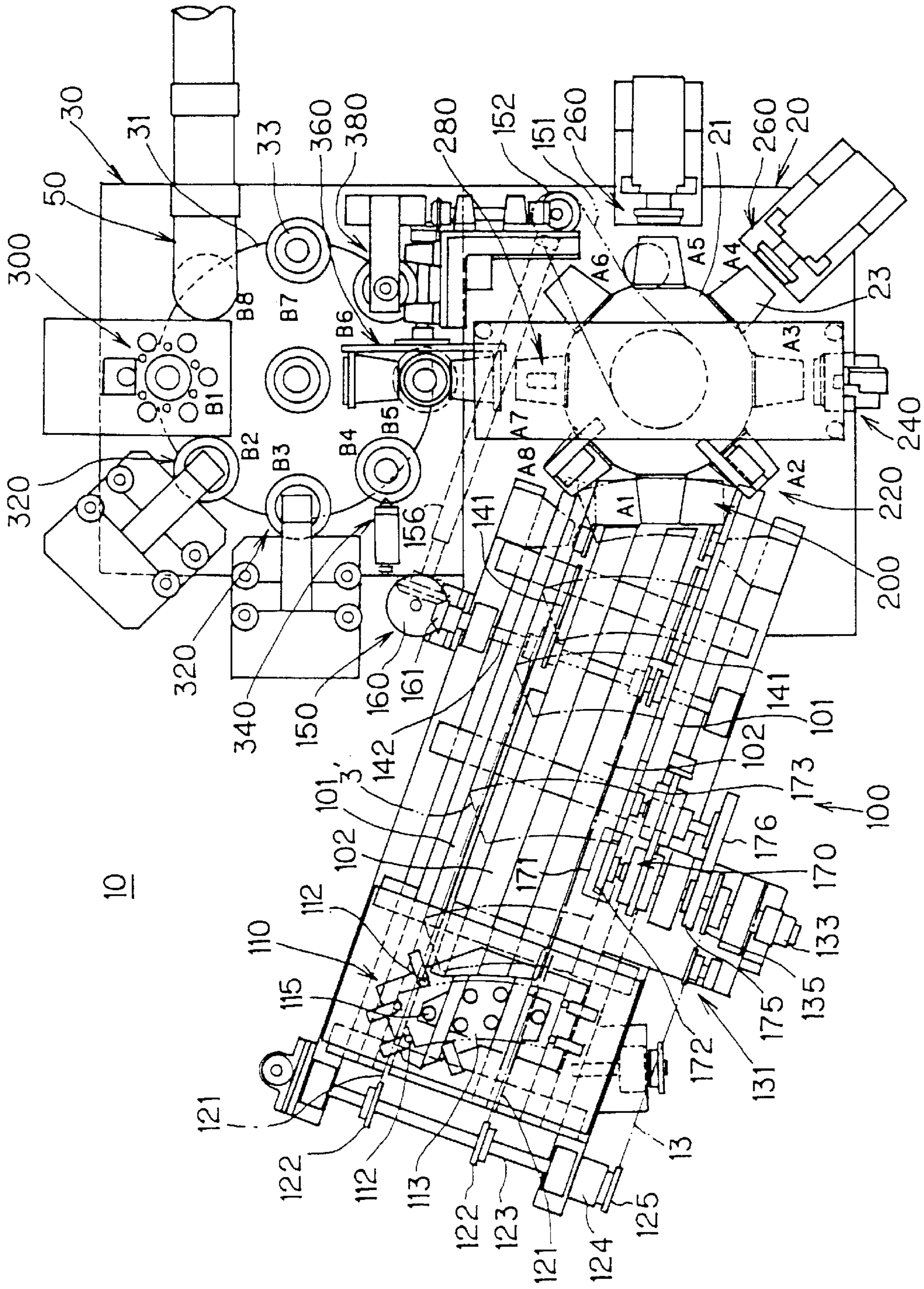
FIG. 7 is a plan view of the producing apparatus for the container of FIG. 5.
Figure 8:
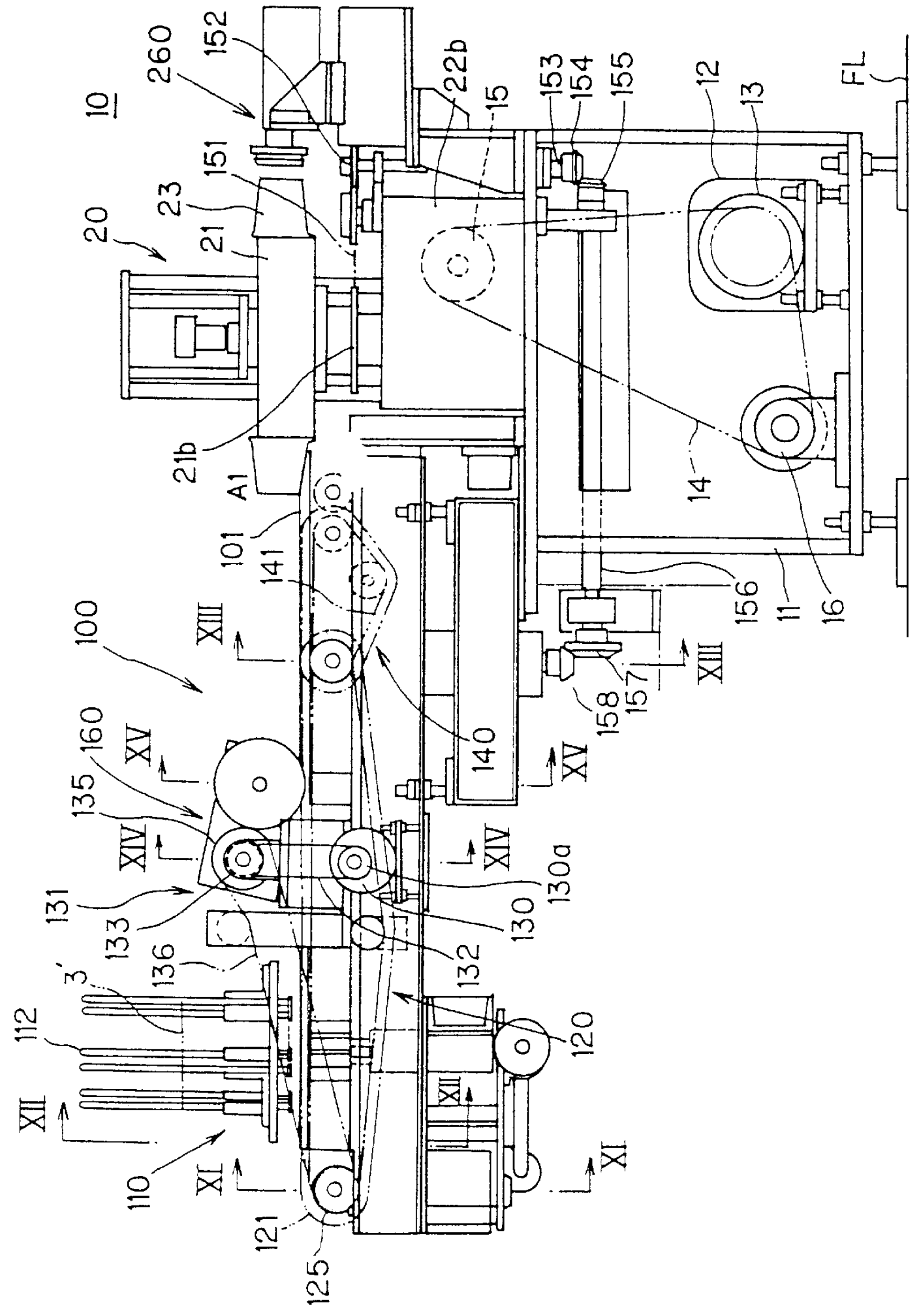
FIG. 8 is a front side view of the producing apparatus.
Figure 9:
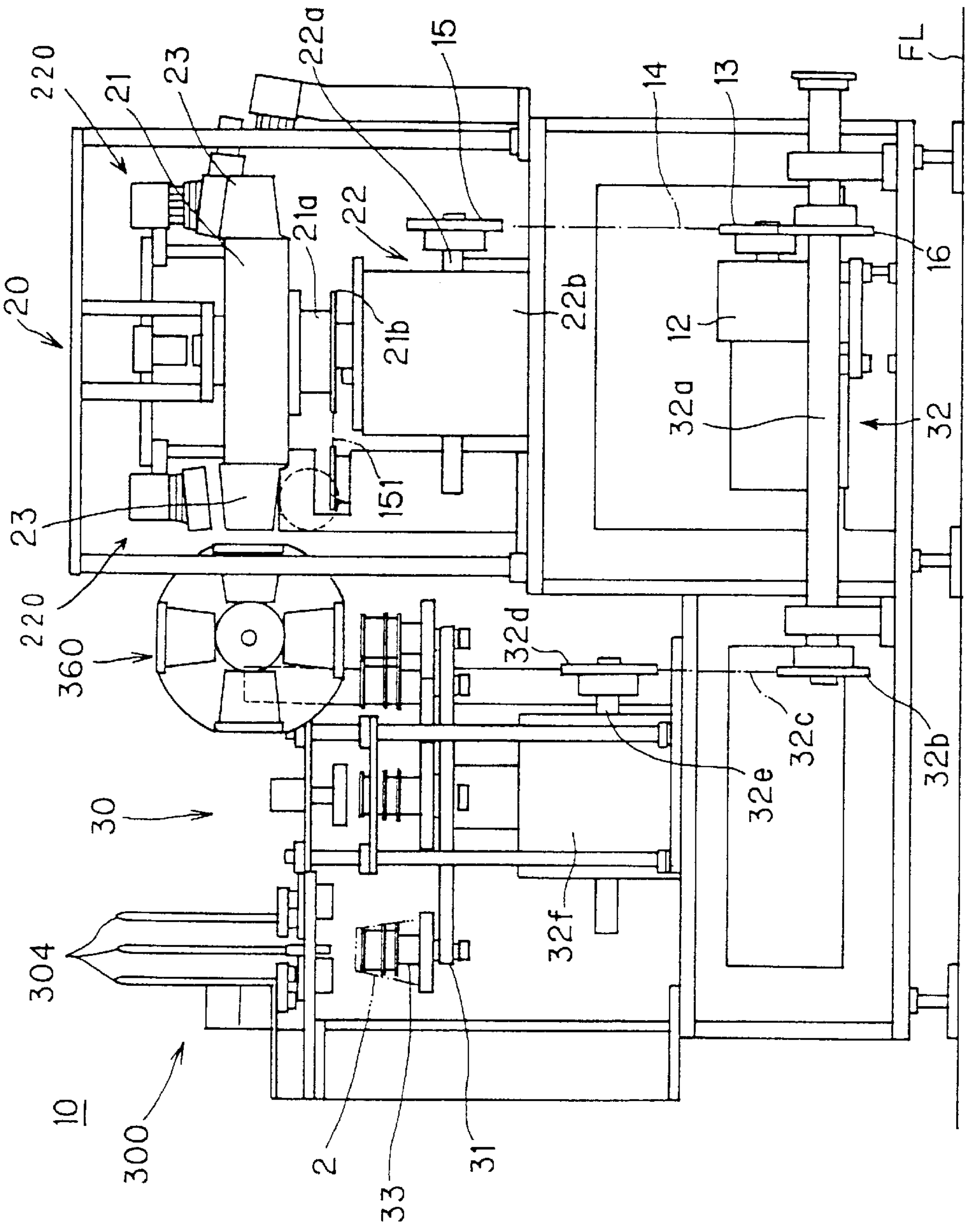
FIG. 9 is a left-hand side view of the producing apparatus.

FIGS. 7 to 9 show structure of a producing apparatus 10 in accordance with the present invention, that is, FIG. 7 is a plan view, FIG. 8 is a front side view, and FIG. 9 is a schematic left side view. As shown in these figures, the producing apparatus 10 comprises a sleeve forming section 20 and an assembling section 30. In the sleeve forming section 20, the sleeve 3 is formed from the blank 3' illustrated in FIG. 6, and in the assembling section 30, the sleeve 3 and the cup body 2 are assembled and joined with each other.

The sleeve forming section 20 and the assembling section 30 are provided with turn tables 21, 31, respectively. Each of the tables 21, 31 is supported by a main body 11 of the producing apparatus 10 so as to be turnable about a vertical axis. The main body 11 is a basic portion to which various elements of the producing apparatus 10 are attached. The body 11 is constructed by assembling steel products or the like, and is installed horizontally on a floor FL in a factory or the like. The main body 11 is provided at the lower portion thereof with a motor 12 as a drive power source (refer to FIGS. 8 and 9). A sprocket 13 is mounted on an output shaft of the motor 12. The rotation of the sprocket 13 is transmitted to sprockets 15, 16 through a chain 14, and the rotations of the sprockets 15,16 are transmitted to the tables 21, 31 through transmission mechanisms 22, 32, respectively. The speed reduction ratios from the motor 12 to each of the turn tables 21,31 are equal with each other. Therefore, the tables 21, 31 are driven synchronously with each other. The motions of the tables 21, 31 are intermittent, that is, the tables 21, 31 repeatedly turn and stop and the turning angle at a time is set to 45 degrees. The turning directions of the tables 21, 31 are set to a counter-clockwise direction in FIG. 7, respectively.

Figure 10:
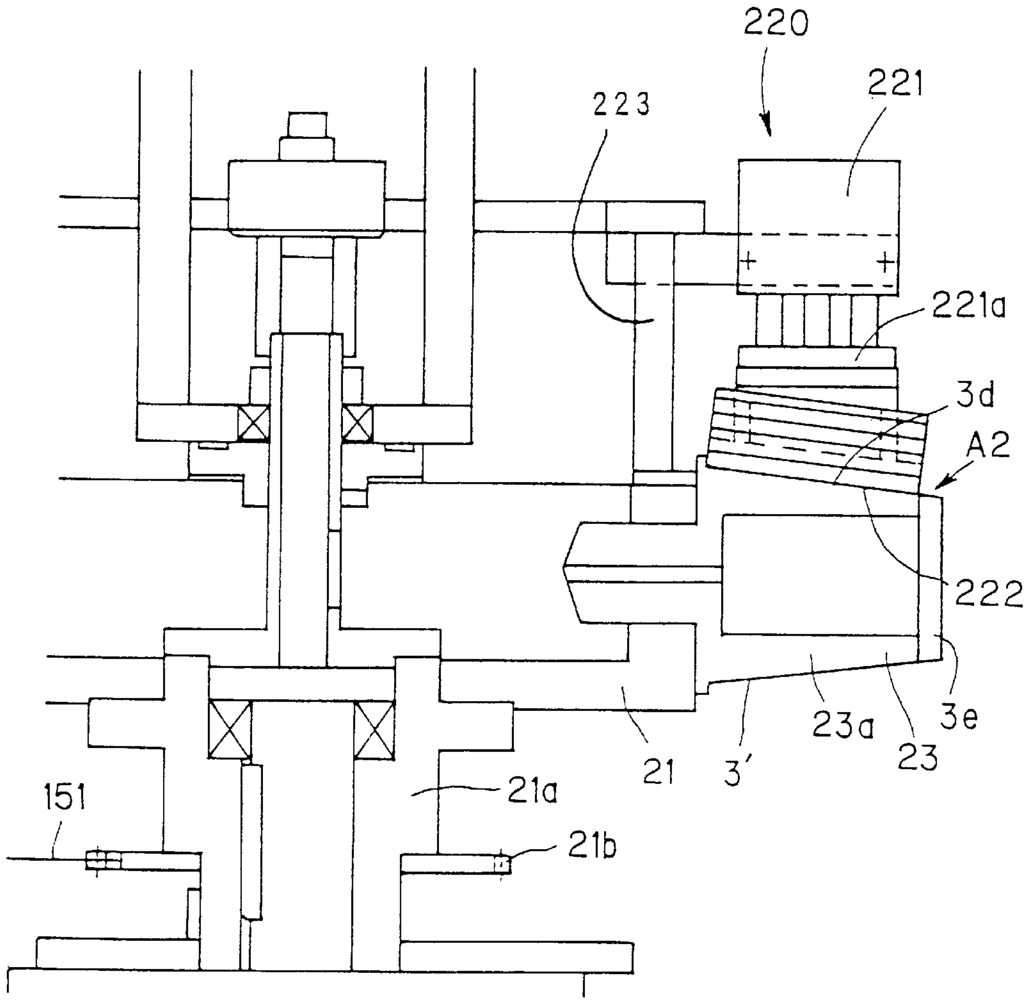
FIG. 10 is an enlarged view illustrating structure of a main-sealing device provided in the producing apparatus and periphery thereof.

In the transmission mechanism 22, the rotation of the sprocket 14 is input into a motion conversion mechanism (not shown) housed in a gear box 22*b*, and converted into the rotation of the drive shaft 21*a* of the turn table 21 (refer to FIG. 10). Also, in the transmission mechanism32, the rotation of the sprocket 16 is transmitted to a sprocket 32*f* through a sprocket shaft 32*a* which can integrally rotate with the sprocket 16, a sprocket 32*b* attached to the end of the shaft 32*a* and a chain 32*c*. Then the rotation of the sprocket 32*f* is input into a motion conversion mechanism (not shown) housed in a gear box 32*f*, and converted into the rotation of the drive shaft (also not shown) of the turn table 31. It is possible to change details of these transmission mechanisms 22, 32.

On the outer periphery of the turn table 21, there are provided eight mandrels 23 . . . 23 as sleeve holders so as to leave equal angles (45 degrees) therebetween in a circumferential direction of the table 21. Each mandrel 23 is formed with a body 23*a* having a tapered outer circumferential surface in which a diameter decreases as it goes toward the tip thereof. The axial direction of the body 23*a* of each mandrel 23 accords with the radial direction of the turn table 21. On the outer periphery of the turn table 31, there are provided eight cup holders 33 . . . 33 so as to leave equal angles (45 degrees) therebetween in a circumferential direction of the table 31. Each cup holder 33 supports the cup body 2 in a reversed posture in the vertical direction. The details thereof will be explained later.

During the production of the container 1, the turn tables 21, 31 are intermittently driven at intervals of 45 degrees, and this drive angle is equal to the angle intervals at which the mandrels 23 . . . 23 and the cup holders 33 . . . 33 are arranged. Therefore, each mandrel 23 stops at eight stations A1 to A8 defined on the outer periphery of the turn table 21 step by step, and each cup holder 33 stops at eight stations B1 to B8 provided on the outer periphery of the turn table 31 step by step. Namely, the mandrel 23 circulates along its circulation path defined on the outer periphery of the table 21, and the cup holder 33 circulates along its circulation path defined on the outer periphery of the table 31. Thus, a combination of the motor 12, the sprocket 13, the chan 14, the sprockets 15, 16, the table 21, the transmission mechanism 22, the table 31 and the transmission mechanism 32 functions as a driving device for the sleeve holder and the cup holder.

As shown in FIG. 7, the sleeve forming section 20 is provided with a curling device 200 in the station A1 as a curling station, an assist-sealing device 240 in the station A3 as an assist-sealing station, end-curling devices 260, 260 in the stations A4, A5 as end-curling stations, and a sleeve-ejecting device 280 in the station A7 as an ejecting station. And a blank-supplying device 100 is provided at one side of the curling device 200. On the other hand, the assembling section 30 is provided with a cup-body-supplying device 300 in the station B1, rib-processing devices 320, 320 in the stations B2 and B3 as driving stations, an adhesive-applying device 340 in the station B4 as an applying station, a sleeve-delivering device 360 in the station B5 as a delivering station, and a sleeve-fitting device 380 in the station B6. Every time the turn tables 21, 31 stop after turning 45 degrees, each device performs proper processing assigned thereto. In the sleeve forming section 20, a main-sealing device 220 is provided in association with each mandrel 23. Note that the main-sealing device 220 is illustrated only in the stations A2 and A8 in FIG. 7, and the illustration of the device 220 is omitted at each of the other stations.

FIGS. 11 to 15 show a detail of the blank-supplying device 100. The device 100 is provided for supplying the blank 3' illustrated in FIG. 6 to the station A1 one by one. As is clearly shown in FIG.7 and FIGS. 12 to 15, the device 100 comprises a pair of rails 101, 101 for guiding the blank 3' with supporting both end portions thereof from the lower side, and guide plates 102, 103 disposed so as to put the middle portion of the blank 3' therebetween to thereby prevent the blank 3' from hanging down or rising up. As shown in FIG. 7, the blank 3' is guided by the rails 101, 101 in a direction parallel to one end portion 3*c* of the blank 3'. To accord the center of the blank 3' and the center axis of the mandrel 23 with each other in the vertical direction at the station A1, the rails 101, 101 are inclined from the direction of the center axis of the mandrel 23 at the station A1.

As shown in FIGS. 7 and 8, the blank-supplying device 100 is provided with a blank delivering unit 110 for delivering the blank 3' to one end (left hand side in FIG. 7) portion of each rail 101, first and second chain conveyors 120, 140 (refer to FIG. 8) for feeding the blank 3' along the rails 101, 101, and an adhesive applicator 170 for applying an adhesive agent to the end portion 3*c* of the blank 3' supported the rail 101.

Figure 12:
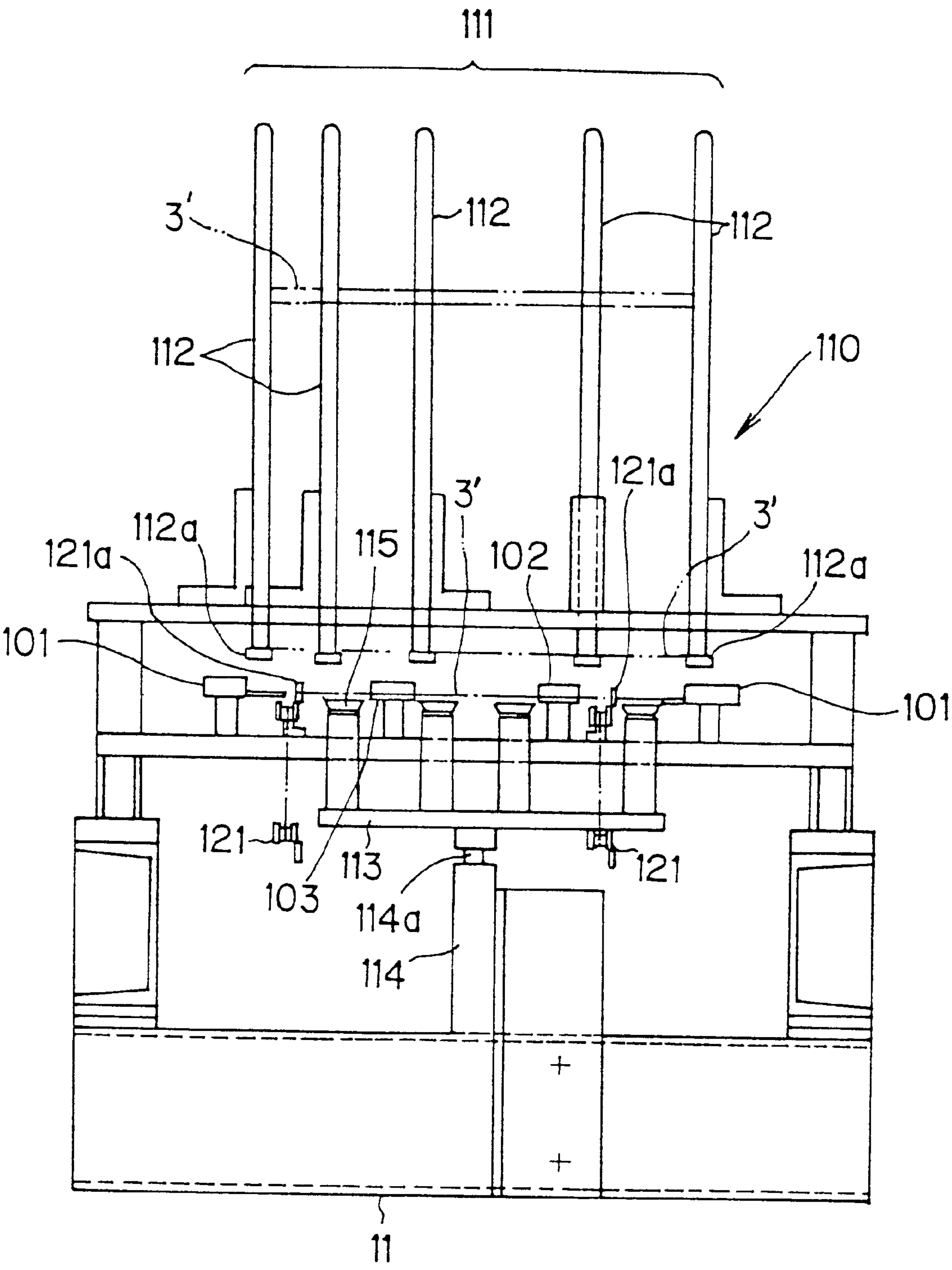
FIG. 12 is a sectional view of the blank-supplying device along the line XII—XII in FIG. 8.

As is clearly illustrated in FIG. 12, the blank delivering unit 110 comprises a blank holder 111 having vertically extending rods 112 . . . 112. The rods 112 . . . 112 are arranged along the contour of the blank 3' with leaving proper intervals therebetween. At the lower end of each rod 112, there is provided an enlarged portion 112*a* for preventing the blank 3' from falling off, and a lot of blanks 3' are piled up on the enlarged portions 112*a*. . . 112*a* and accommodated in a space enclosed by the rods 112 . . . 112. Below the blank holder 111, there is provided a blank drawing member 113. The blank drawing member 113 is connected with a piston rod 114*a* of a pneumatic cylinder 114 mounted on the main body 11 and is capable of being moved up and down. The blank drawing member 113 is provided at the upper end portion thereof with a plurality of suckers 115 . . . 115.

When the blank drawing member 113 is driven upward, the suckers 115 are brought into contact with the blank 3' disposed at the lower end of the blank holder 111, and at the same time, air is sucked from the sticking surface of each sucker 115 to thereby stick the suckers 115 to the blank 3'. After this, the blank drawing member 113 is driven downward, so that the blank 3' which has stuck to the suckers 115 moves over the enlarged portions 112*a* and is drawn out below the blank holder 111. Then the blank drawing member 113 is further driven downward, so that both end portions of the blank 3' engage with the rails 101, 101, and at the same time, the air suction from the suckers 115 is suspended to thereby release the suckers 115 from the blank 3'.

Figure 11:
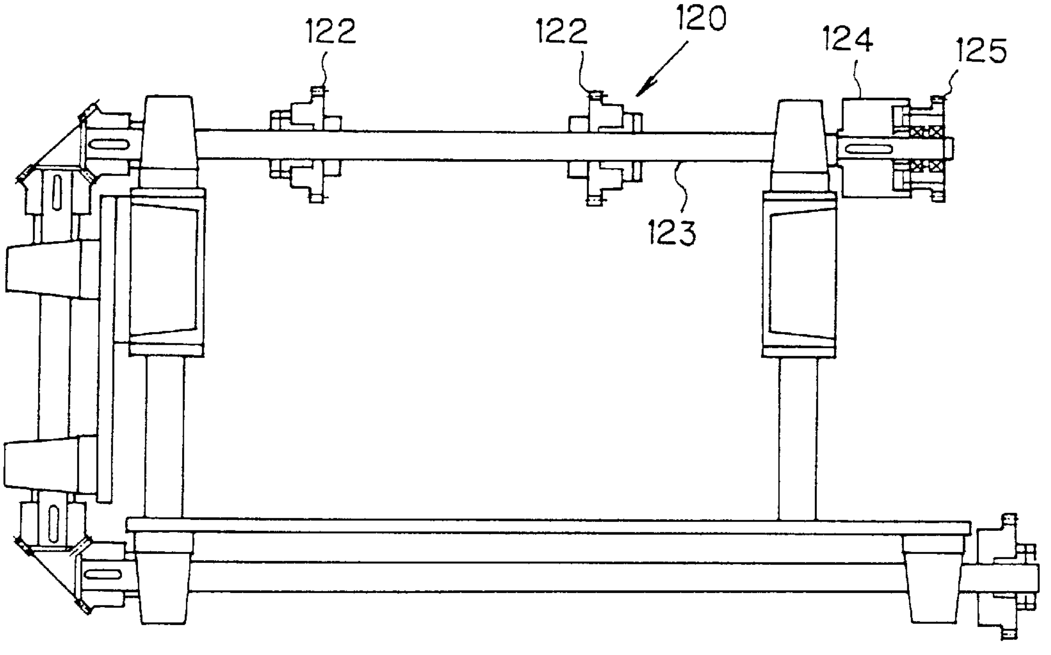
FIG. 11 is a sectional view of a blank-supplying device provided in the producing apparatus along the line XI—XI in FIG. 8.

As shown in FIGS. 12 to 15, the chain conveyors 120, 140 comprise two lines of chains 121, 141 disposed along the rails 101, 101, respectively. The chains 121, 141 are provided with nails 121*a*, 141*a* capable of engaging with the blank 3' to transmit the feeding force from the chains 121, 141 to the blank 3'. As shown in FIGS. 7 and 11, the first chain conveyor 120 is equipped at one end thereof with sprockets 122, 122 which are attached to a sprocket shaft 123 so as to be rotatable therewith. The sprocket shaft 123 is rotatably supported by the main body 11, and one end of the shaft 123 is connected with a sprocket 125 through a clutch 124. As shown in FIGS. 7 and 8, the sprocket 125 is connected with a motor 130 mounted on the main body 11 through a transmission mechanism 131. The transmission mechanism 131 transmits the rotation of a pulley 130*a* fitted on an output shaft of the motor 130 to an intermediate shaft 134 through a belt 132 and a pulley 133 (refer to FIG. 14), and the mechanism 131 further transmits the rotation of the intermediate shaft 134 to the sprocket 125 through a sprocket 135 and a chain 136 (refer to FIGS. 7 and 8). The detail of the transmission mechanism 131 may be changed variously.

Figure 13:
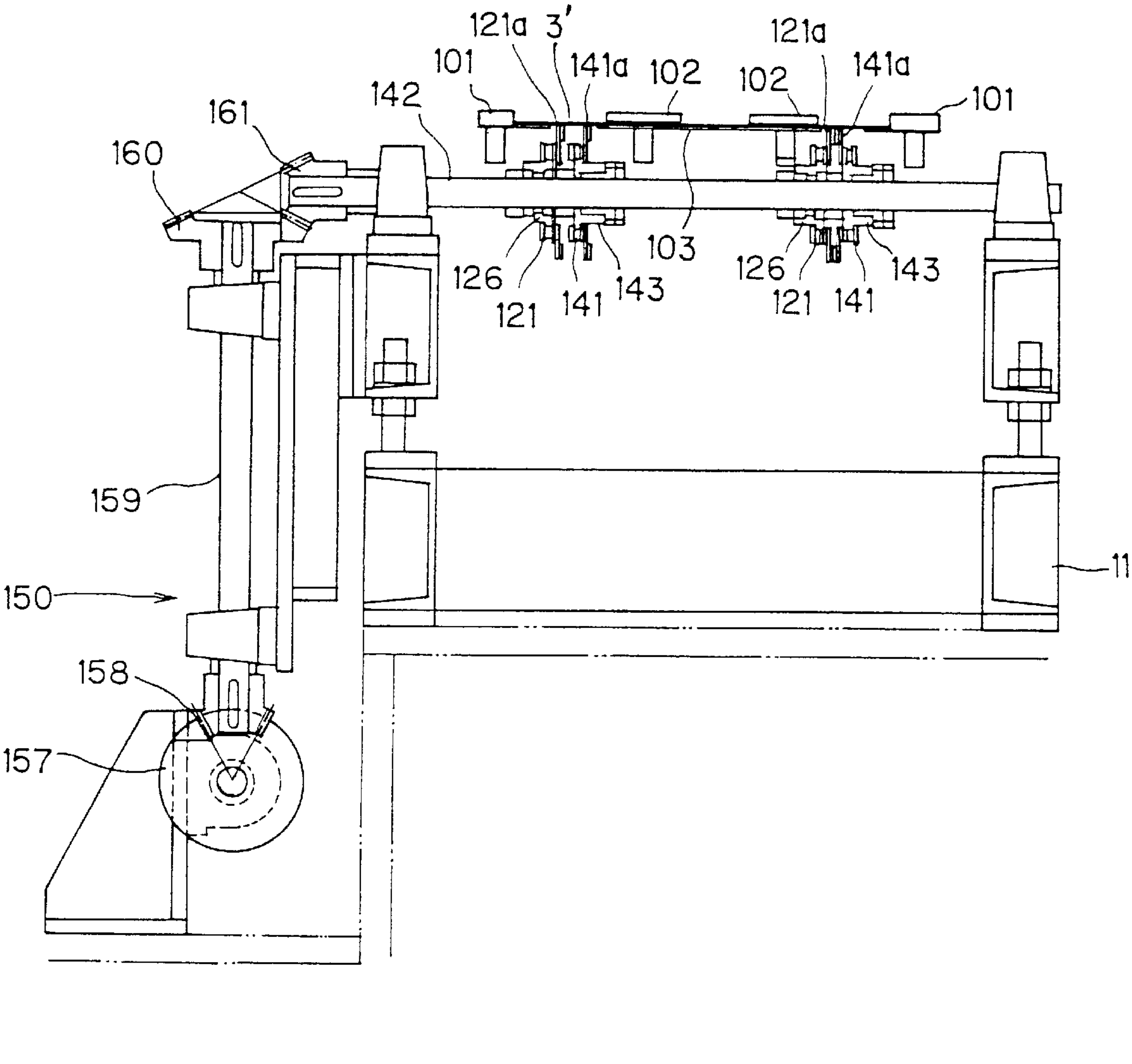
FIG. 13 is a sectional view of the blank-supplying device along the line XIII—XIII in FIG. 8.

As shown in FIG. 13, the first chain conveyor 120 is also equipped at the other end thereof with sprockets 126, 126. Each sprocket 126 is mounted on a sprocket shaft 142 so as to be relatively rotatable to the shaft 142 and the shaft 142 is rotatably supported by the main body 11 (refer to FIG. 7). Accordingly, the chains 121, 121 can travel in accordance with the rotation of the motor 130, whether the sprocket shaft 142 is rotating or not. In accordance with the traveling of the chains 121, 121, the blank 3' delivered on the rails 101, 101 by the blank delivering unit 110 is conveyed to the second chain conveyor 140.

The second chain conveyor 140 is equipped with sprockets 143, 143 attached to the sprocket shaft 142 so as to be rotatable with the shaft 142. The sprocket shaft 142 is connected with the drive shaft 2 la of the turn table 21 (refer to FIG.10) through a transmission mechanism 150. Accordingly, the chains 141, 141 travel a predetermined distance in accordance with the 45 degrees turn of the table 21. Thus, one sheet of the blank 3' is supplied below the mandrel 23 in the station A1, at the same time when the mandrel 23 is carried in the station A1. The transmission mechanism 150 transmits the rotation of a sprocket 21*b* mounted on the drive shaft 21*a* of the turn table 21 toward the side of the blank-supplying device 100 through a chain 151, a sprocket 152, an intermediate shaft 153, a pair of bevel gears 154, 155 and an intermediate shaft 156 (refer to FIGS. 7 and 8), and the mechanism 150 further transmits the rotation of the intermediate shaft 156 to the sprocket shaft 142 through a pair of bevel gears 157, 158, an intermediate shaft 159 and a pair of bevel gears 160, 161 (refer to FIGS. 13 and 14). The detail of the transmission mechanism 150 may be changed variously.

Figure 14:
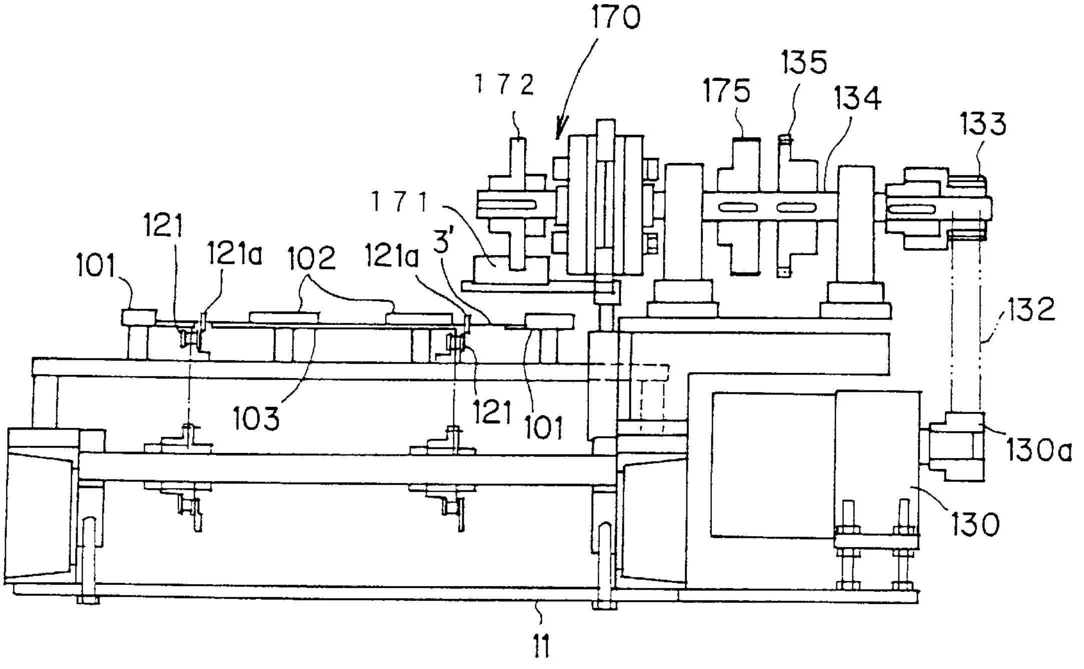
FIG. 14 is a sectional view of the blank-supplying device along the line XIV—XIV in FIG. 8.
Figure 15:
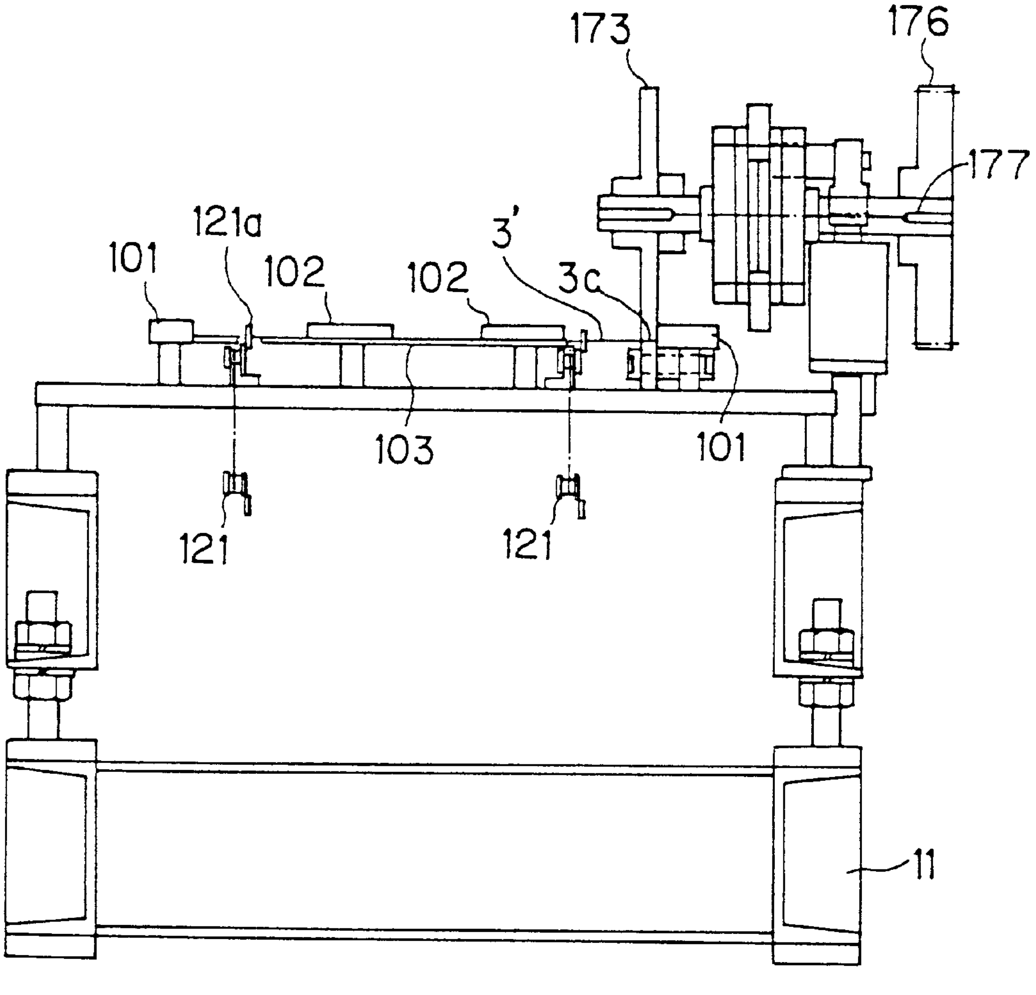
FIG. 15 is a sectional view of the blank-supplying device along the line XV—XV in FIG. 8.

As shown in FIGS. 7, 14 and 15, the adhesive applicator 170 comprises a pan 171 accommodating the adhesive agent in a liquid condition, a dip roller 172 dipped into the adhesive agent in the pan 171, an application roller 173 contacting the dip roller 172. The dip roller 172 is rotatable together with the intermediate shaft 134 of the first chain conveyor 120. The application roller 173 is connected with the intermediate roller 134 through a pair of gears 175, 176 and a gear shaft 177, and is rotatable together with the intermediate shaft 134. The application roller 173 is disposed in such manner that the outer circumferential surface thereof is capable of contacting the one end 3*c* of the blank 3' supported on the rails 101, 101. Accordingly, if the motor 130 is activated to start its rotation, the dip roller 172 and the application roller 173 rotate in accordance with the motor 130, so that the adhesive agent in the pan 171 is transferred to the one end 3*c* of the blank 3' through the outer circumferential surfaces of the dip roller 172 and the application roller 173.

Figure 16:
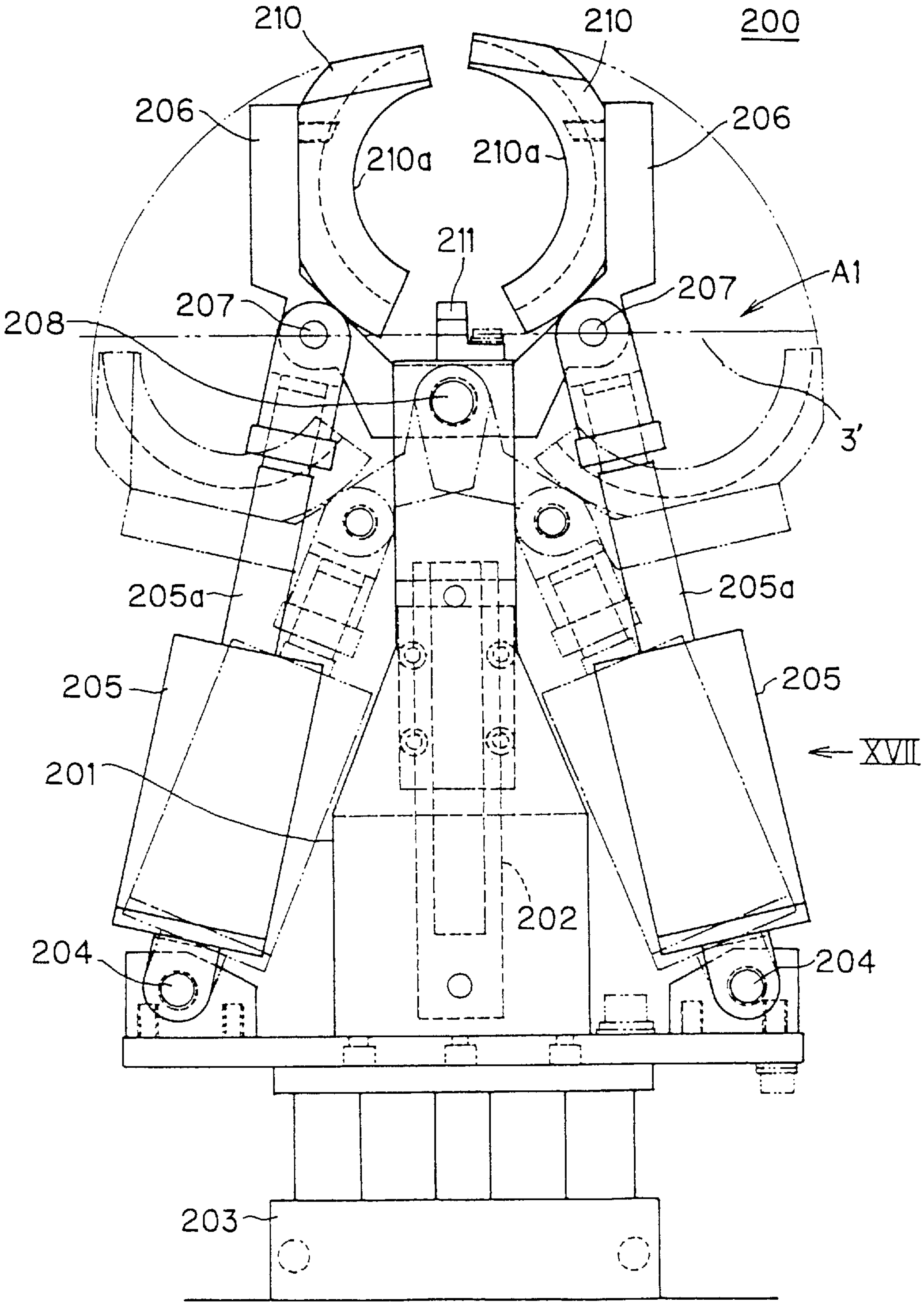
FIG. 16 is a view illustrating detailed structure of a curling device provided in the producing apparatus.
Figure 17:
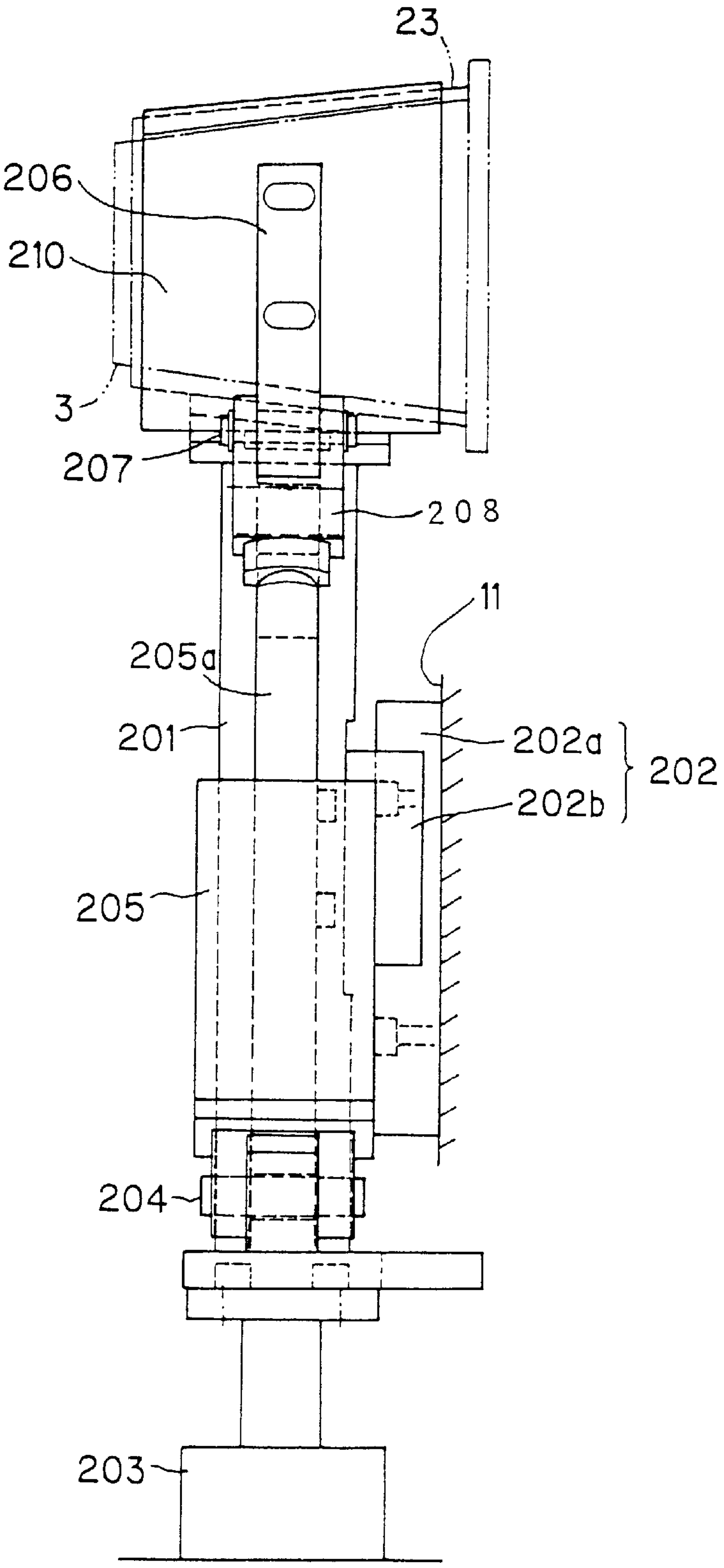
FIG. 17 is a view illustrating the structure of the curling device observed from one side thereof as indicated by an arrow XIII in FIG. 16.

FIGS. 16 and 17 show a detail of the curling device 200. The device 200 curls the blank 3' delivered to the station A1 by the blank-supplying device 100 so as to wrap the mandrel 23. The device 200 comprises a support member 201, a linear motion guide unit 202 for connecting the support member 201 with the main body 11 so as to be movable in the vertical direction, a pneumatic cylinder 203 for driving the support member 201 in the vertical direction, a pair of pneumatic cylinders 205, 205 mounted on the support member 201 so as to be pivotable with pins 204, 204 as fulcrums. The linear motion guide unit 202 is a well-know device having a linear rail 202*a* and a slider 202*b* slidable thereon.

At the end portion of a piston rod 205*a* of each pneumatic cylinder 205, there is provided an attachment 206 pivotable around a pin 207. The attachment 206 is connected with the support member 201 so as to be pivotable with a pin 208 as a fulcrum and is provided with a blank curling block 210. The block 210 is formed with a concave surface 210*a* curving along the outer circumferential surface of the mandrel 23.

The attachment 206 can pivot within a predetermined range around the pin 207 in accordance with a reciprocal motion of the piston rod 205*a* of the pneumatic cylinder 205. When the blank 3' is just delivered to the station A1 by the blank-supplying device 100, each piston rod 205*a* is held in its contracted position as indicated by imaginary lines in FIG. 16, and thus the attachments 206, 206 are kept away from each other. After the blank 3' is carried in the station A1, the support member 201, the pneumatic cylinders 205, the attachments 206 and so on are driven upward together, and thus a blank clamp block 211 mounted on the support member 201 contacts the blank 3' to thereby push the blank 3' onto the mandrel 23. Therefore, slippage, deviation and the like of the blank 3' against the mandrel 23 are prevented during the curling process. After this, the piston rods 205*a* of the pneumatic cylinders 205 are protruded as indicated by solid lines in FIG. 16, so that the attachments 206 pivot upward to come closer to each other. Therefore, the blank 3' carried in the station A1 engages with the blank curling blocks 210 to thereby be curled up and pressed onto the mandrel 23 (refer to FIG. 16). At this time, both ends 3*c*, 3*c* of the blank 3' overlap each other to form a joint line 3*d* (refer to FIG. 6). It is necessary to adjust each motion of each attachment 206 so as to dispose the one end 3*c*, on which the adhesive agent is applied, inside the other end 3*c*. Such adjustment is carried out by, for example, changing positions of the pins 207, 207 in such a manner that the one end 3*c* with the adhesive agent is pushed on the mandrel 23 at first and then the other end 3*c* is pressed thereon.

After finishing the curling process of the blank 3', the attachments 206 are driven by the pneumatic cylinders 205 to the position indicated by the imaginary lines in FIG. 16 to make preparation for the next turning of the table 21, and the support member 201, the pneumatic cylinders 205, the attachments 206 and so on are driven downward together by the pneumatic cylinder 203. After the table 21 turns again with carrying the next mandrel 23 in the station A1 and the new blank 3' is delivered to the station A1, the support member 201 and so on are again driven upward by the pneumatic cylinder 203 and the attachments 206 are driven upward to curl up the blank 3'. The blank curling blocks 210 are exchangeable in accordance with the size of the mandrel 23. The position of each attachment 206 in the vertical direction is adjusted by the pneumatic cylinder 203 as necessary.

The joint line 3*d* of the blank 3' curled up on the mandrel 23 is pressed onto the mandrel 23 and heated by the main-sealing device 220. As shown in FIG. 10, the main-sealing device 220 comprises a pneumatic cylinder 221 disposed above the mandrel 23, and a press block 222 attached to a movable portion 221*a* of the pneumatic cylinder 221. The pneumatic cylinder 221 is mounted on the turn table 21 through a bracket 223. Accordingly, the pneumatic cylinder 221 and the press block 222 can move together with the mandrel 23 in accordance with the turning of the table 21.

The movable portion 221*a* of the pneumatic cylinder 221 can be driven in the vertical direction. The press block 222 inclines along the outer circumferential surface of the mandrel 23, and a length of the block 222 is substantially equal to that of the mandrel 23. The press block 222 is equipped with a heater (not shown) therein, and is heated to a proper temperature, for example 100° C., to hasten adhesion between both ends 3*c*, 3*c* of the blank 3'.

When the curling device 200 curls up the blank 3' on the mandrel 23 in the station A1, the movable portion 221*a* is withdrawn upward, and the press block 222 is held at a position apart from the mandrel 23. After the curling device 200 curls up the blank 3' with the blank curling blocks 210 on the mandrel 23, the movable portion 221*a* of the pneumatic cylinder 221 moves downward and the heated press block 222 is pressed onto the joint line 3*d* of the blank 3' before the blank curling blocks 210. move away from the mandrel 23. Therefore, the joint line 3*d* is pressed and heated to thereby hasten adhesion thereof.

The heating and pressing by the press block 222 is continued until the mandrel 23 reaches the station A7. After the mandrel 23 reaches the station A7, the movable portion 221*a* of the pneumatic cylinder 221 moves upward and the press block 222 moves away from the mandrel 23.

The blank 3', the joint line 3*d* of which is pressed by the main-sealing device 200, is fed from the station A1 to the station A2 in accordance with the turning of the table 21, and is carried in the assist-sealing device 240 (refer to FIGS. 7, 18 and 19) in accordance with the next turning of the table 21.

The assist-sealing device 240 is provided to press and heat one end portion of the joint line 3*d* projecting from the mandrel 23 to thereby hasten the adhesion thereof. Namely, in the producing apparatus 10 of this embodiment, the body 23*a* of the mandrel 23 is shorter than the blank 3' curled up thereon. The reason of such arrangement is to curl the blank 3' and form the curled portion 3*a* (refer to FIG. 6) on the lower end of the sleeve 3 without changing the mandrel 23. If the length of the body 23*a* of the mandrel 23 is equal to or greater than that of the blank 3', the body 23*a* projects from the end of the curled blank 3', so that the curled portion 3*a* can not be formed without removing the blank 3' from the mandrel 23. On the other hand, in case that the mandrel 23 is shorter than the blank 3', one end portion 3*e* of the blank 3' projects from the mandrel 23, and it is not possible to press the portion 3*e* by the press block 222 of the main-sealing device 220. Accordingly, the assist-sealing device 240 is added only to press and heat the joint line 3*d* in the projecting portion 3*e*.

Figure 18:
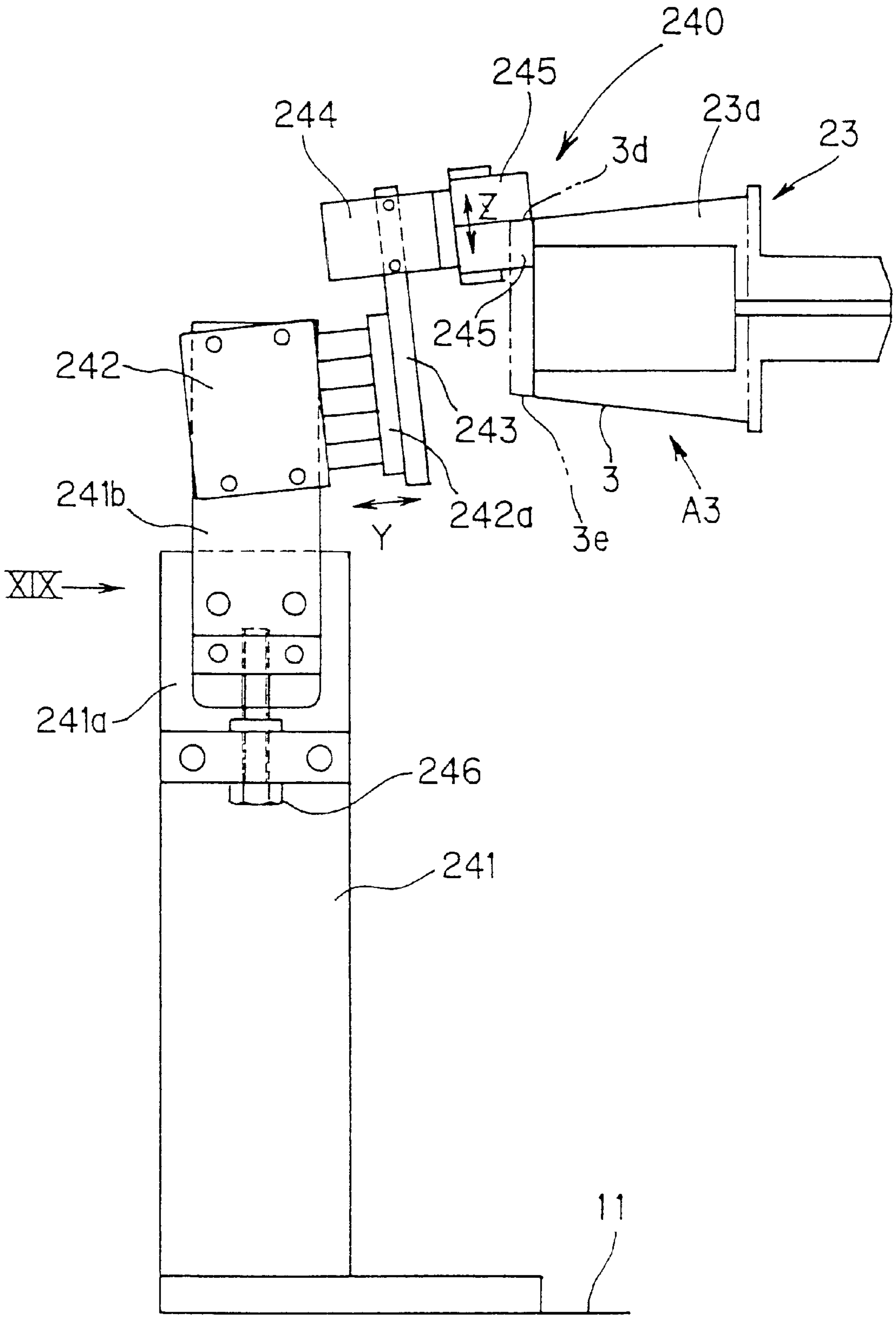
FIG. 18 is a view illustrating detailed structure of an assist-sealing device provided in the producing apparatus.
Figure 19:
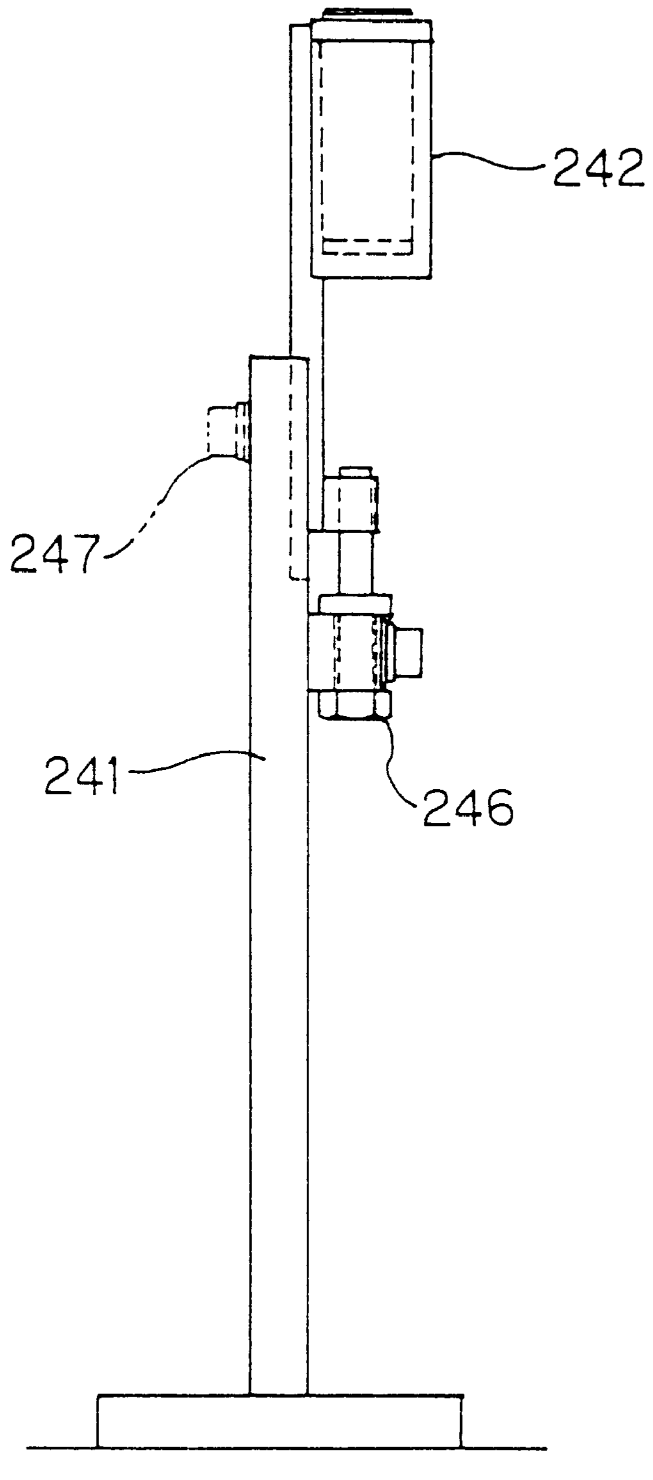
FIG. 19 is a view illustrating the structure of the assist-sealing device observed from one side thereof as indicated by an arrow XIX in FIG. 18.

As shown in FIGS. 18 and 19, the assist-sealing device 240 comprises a base 241 mounted on the main body 11 of the producing apparatus 10, a pneumatic cylinder 242 mounted on the base 241, a support member 243 attached to a movable portion 242*a* of the pneumatic cylinder 242, a pneumatic cylinder 244 mounted on the upper end of the support member 243, and a pair of nippers 245, 245 attached to a movable portion (not shown) of the pneumatic cylinder 244. The movable portion 242*a* of the pneumatic cylinder 242 can reciprocally move in a direction slightly inclined from the horizontal direction as indicated by an arrow Y. The inclination of the moving direction of the movable portion 242*a* from the horizontal plane substantially accords with the inclination of the outer circumferential surface of the body 23*a* from the center axis thereof. On the other hand, the nippers 245, 245 are driven counter to each other by the pneumatic cylinder 244 in a direction slightly inclined from the vertical direction as indicated by an arrow Z. Each nipper 245 is heated to a proper temperature by a heater (not shown) housed therein. The heat temperature of the nipper 245 is higher than that of the press block 222 of the main-sealing device 220. For example, the nipper 245 is heated to about 180° C. while the press block 222 is heated to about 100° C.

Figure 20A:
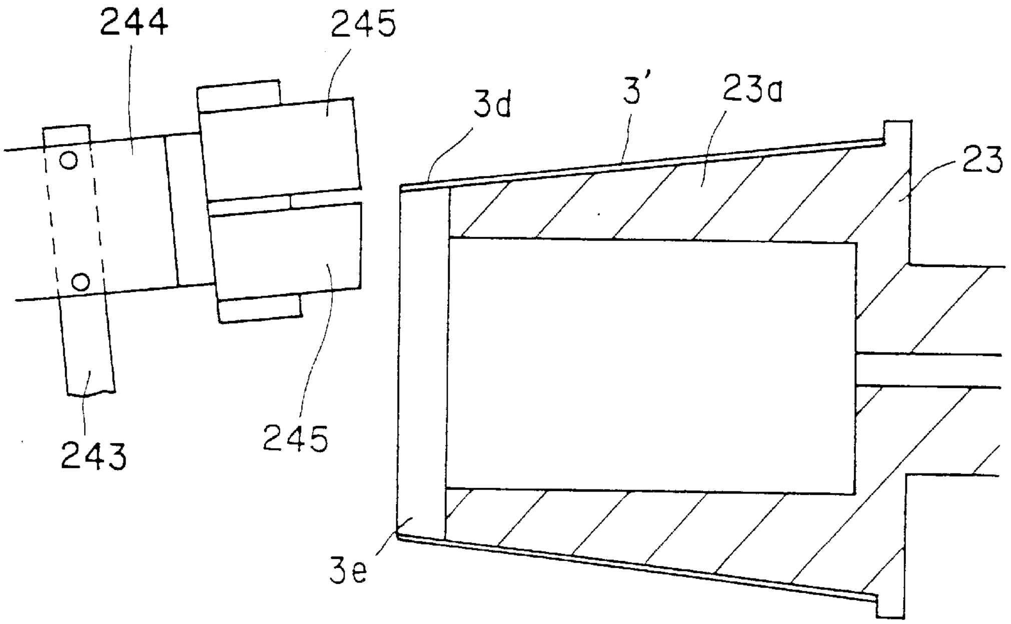
FIGS. 20A and 20B are views illustrating the sealing action of the assist-sealing device.
Figure 20B:
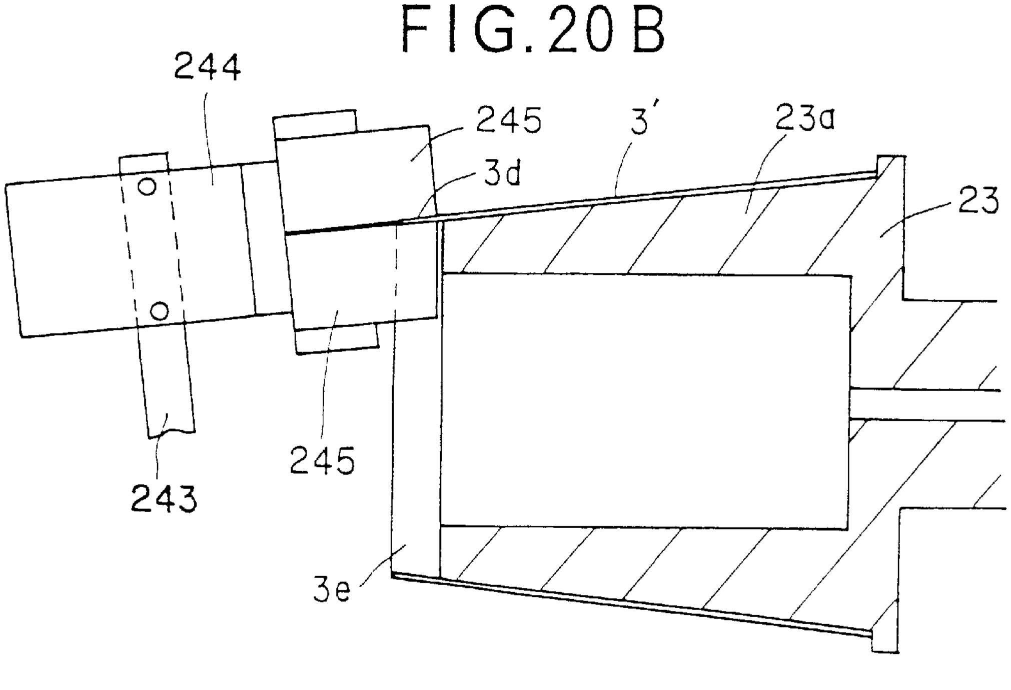

FIGS. 20A and 20B show an operation of the nippers 245. When the table 21 turns, the movable portion 242*a* of the pneumatic cylinder 242 shown in FIG. 18 is in a withdrawn position, and each nipper 245 is held in a position illustrated in FIG. 20A. At this time, there is a space capable of receiving the joint line 3*d* of the blank 3' between the nippers 245, 245. After the table 21 turns and the mandrel 23 moves from the station A2 to the station A3, the movable portion 242*a* moves toward the turn table 21 and each nipper 245 moves to a position in which the joint line 3*d* of the blank 3' overlaps thereto. Next, the nippers 245, 245 are driven by the pneumatic cylinder 244 to close to each other, so that the joint line 3*d* is nipped between the nippers 245, 245 as shown in FIG. 20B. Therefore, the adhesive agent applied to the joint line 3*d* is heated to thereby hasten the adhesion thereof. After the joint line 3*d* is pressed and heated by the nippers 245, 245 for a predetermined time, the nippers 245, 245 returns to the positions illustrated in FIG. 20A to allow the next turn of the table 21.

As shown in FIGS. 18 and 19, the base 241 is provided with a fixed portion 241*a* and a movable portion 241*b* attached to the fixed portion 241*a* so as to be movable in the vertical direction to adjust positions of the nippers 245 in accordance with a position of the joint line 3*d* of the blank 3' in the vertical direction. A vertically extending adjust bolt 246 is rotatably attached to the fixed portion 241*a*, and the upper portion thereof is screwed into the movable portion 241*b*. If bolts 247 connecting the fixed portion 241*a* and the movable portion 241*b* together are loosened, and then the adjust bolt 246 is rotated, the movable portion 241*b* moves in the vertical direction and therefore the vertical positions of the nippers 245 are changed.

The blank 3' processed by the assist-sealing device 240 is carried in the end curling device 260 of the station A4 in accordance with the next turn of the table 21, and is carried in the end curling device 260 of the station A5 in accordance with the further turn of the table 21. Each device 260 is provided for forming the curled portion 3*a* of the sleeve 3 (refer to FIG. 6).

Figure 21:
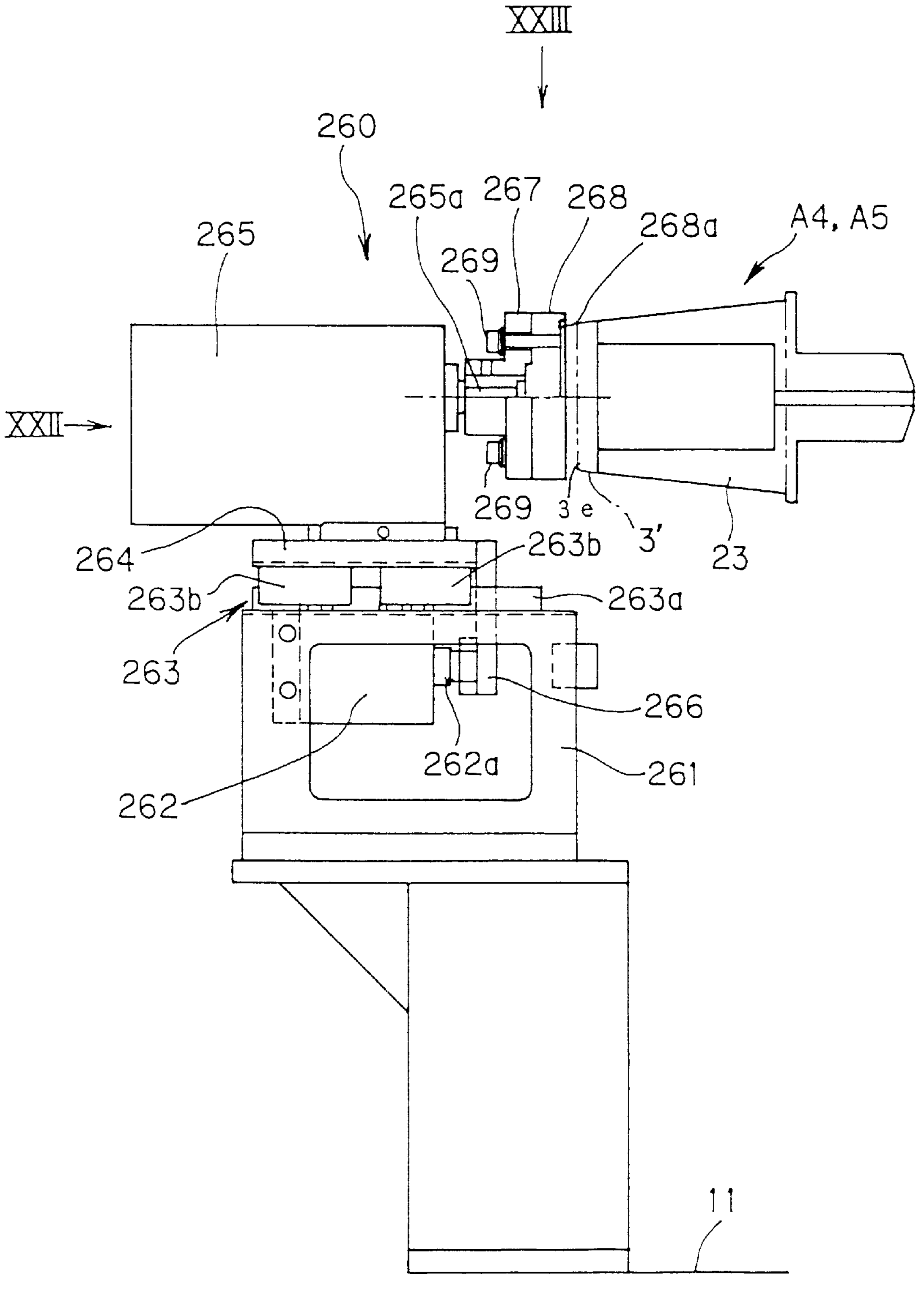
FIG. 21 is a view illustrating detailed structure of a curling device provided in the producing apparatus.
Figure 22:
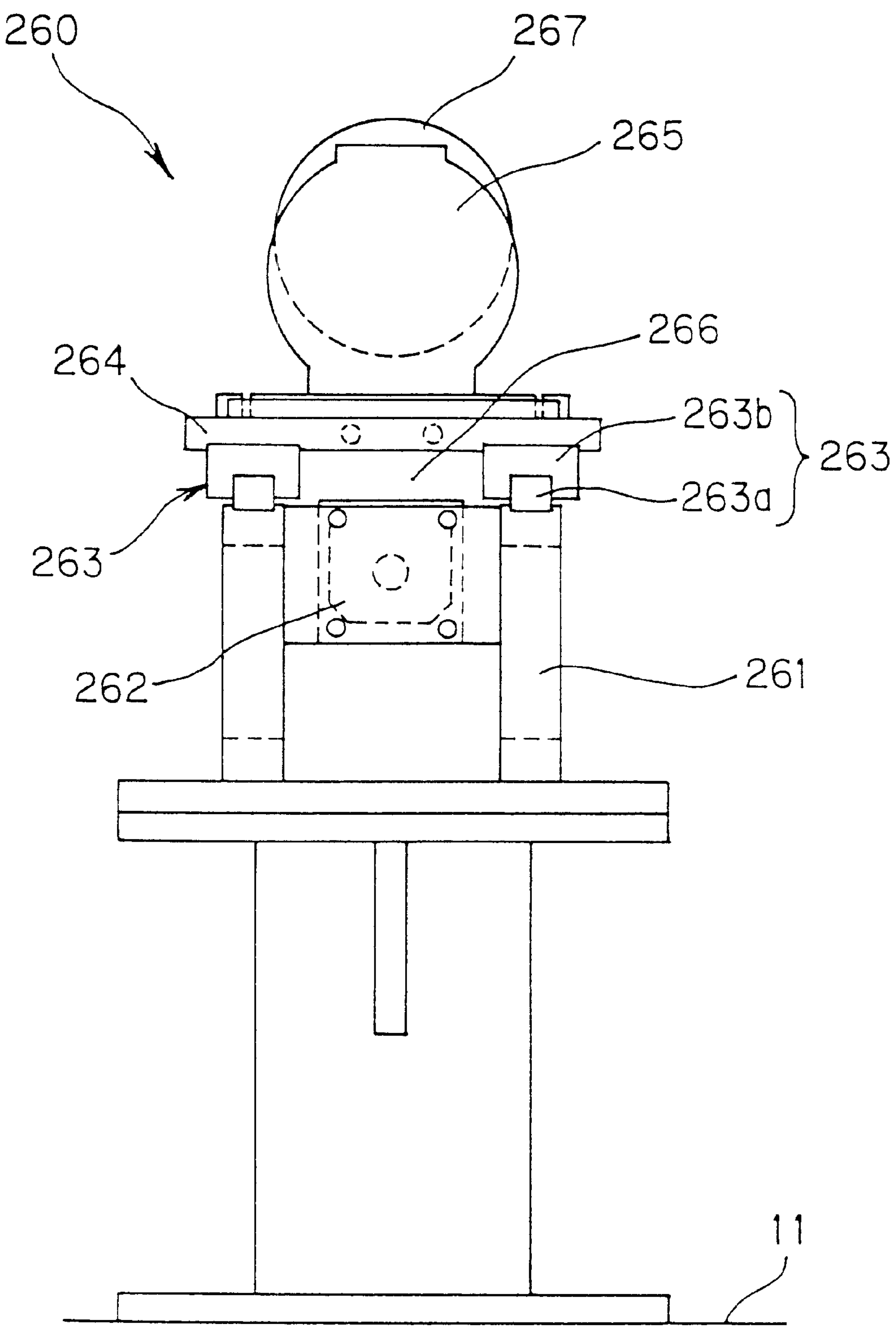
FIG. 22 is a view illustrating the structure of the curling device observed from one side thereof as indicated by an arrow XXII in FIG. 21.
Figure 23:
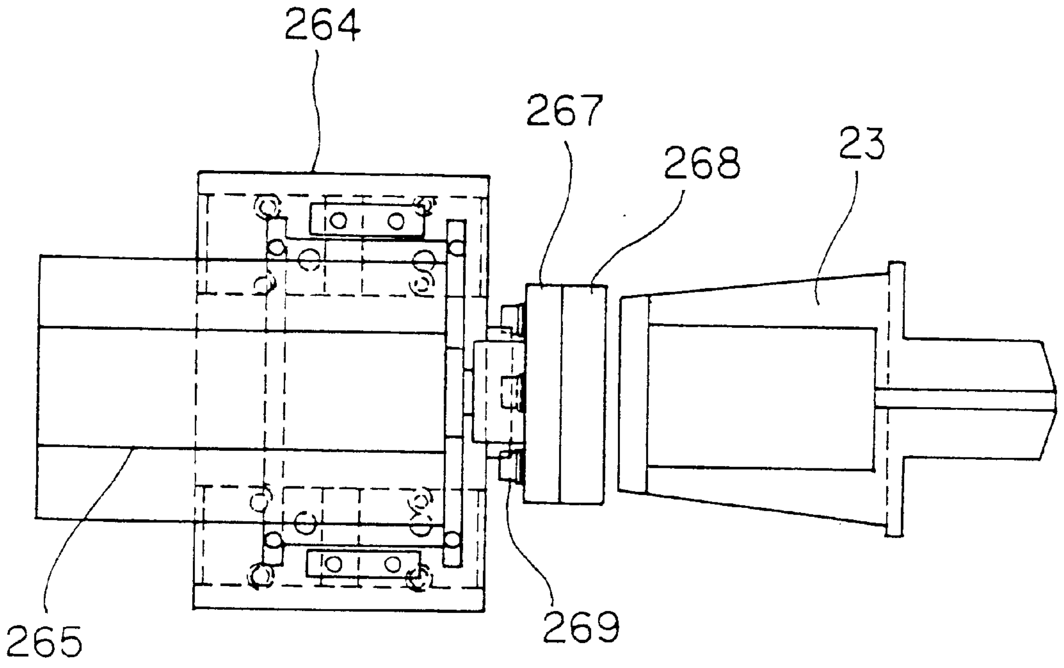
FIG. 23 is a view illustrating the structure of the curling device observed from the top thereof as indicated by an arrow XXIII in FIG. 21.

As shown in FIGS. 21 to 23, the end curling device 260 comprises a base 261 mounted on the main body 11 of the producing apparatus 10, a pneumatic cylinder 262 mounted on the base 261, a movable plate 264 mounted on the upper end of the base 261 through a pair of linear motion guide units 263, 263, and a motor 265 mounted on the upper surface of the movable plate 264. The piston rod 262*a* of the pneumatic cylinder 262 can move in a direction parallel to the center axis of the mandrel 23 of the station A4 or A5, and rails 263*a* of the linear motion guide units 263 extend in a direction parallel to the moving direction of the piston rod 262*a*. The movable plate 264 is supported on sliders 263*b*. . . 263*b* of the liner guide units 263, and is connected to the piston rod 262*a* of the pneumatic cylinder 262*a* through a connection plate 266.

On an output shaft 265*a* of the motor 265, there is mounted an adapter 267 so as to rotate therewith, and a disk-like die 268 is detachably mounted on the end surface of the adapter 267 by using bolts 269 . . . 269. The die 268 is coaxial with the output shaft 265*a*, and on the end surface thereof is formed a groove 268*a* for forming the curled portion 3*a* so as to encircle the die 268 around its axis. These die 268 and the output shaft 265*a* are also coaxial with the mandrel 23.

The die 268 moves in a direction of the center axis of the mandrel 23 in accordance with the motion of the piston rod 262*a* of the pneumatic cylinder 262. When the table 21 turns, the piston rod 262*a* of the pneumatic cylinder 262 is retracted and the die 268 is held in a position away from the projecting portion 3*e* of the blank 3' as shown in FIG. 21. The motor 265 are driven, whether the table 21 is turning or not.

When the table 21 stops, the piston rod 262*a* of the pneumatic cylinder 262 moves toward the mandrel 23, and the die 268 contacts the projecting portion 3*e* of the blank 3' with rotating about its axis. At this time, the projecting portion 3*e* is inserted into the groove 268*a* of the die 268 and is curled inward along the profile of the groove 268*a*. After the die 268 contacts the blank 3' for a predetermined time, the piston rod 262*a* of the pneumatic cylinder 262 goes back and the die 268 returns to the position illustrated in FIG. 21. Every time the mandrels 23 are carried in both of the stations A4 and A5, the dies 268, 268 are repeatedly driven forward and backward to form the projecting portion 3*e* into the curled portion 3*d* of the sleeve 3.

Note that the curled portion 3*a* is formed halfway in the station A4 and fully formed in the station A5. The reason why the curled portion 3*d* is formed in two steps is to form the large curled portion 3*d* without processing forcibly. The moving amounts of the dies 268 and the profiles of the grooves 268*a* in the stations A4, A5 are different from each other.

The sleeve 3 is thus prepared through the above mentioned processing in the stations A1 to A6. The prepared sleeve 3 is transferred to the assembling section 30 by the sleeve-ejecting device 280 in the station A7.

Figure 24:
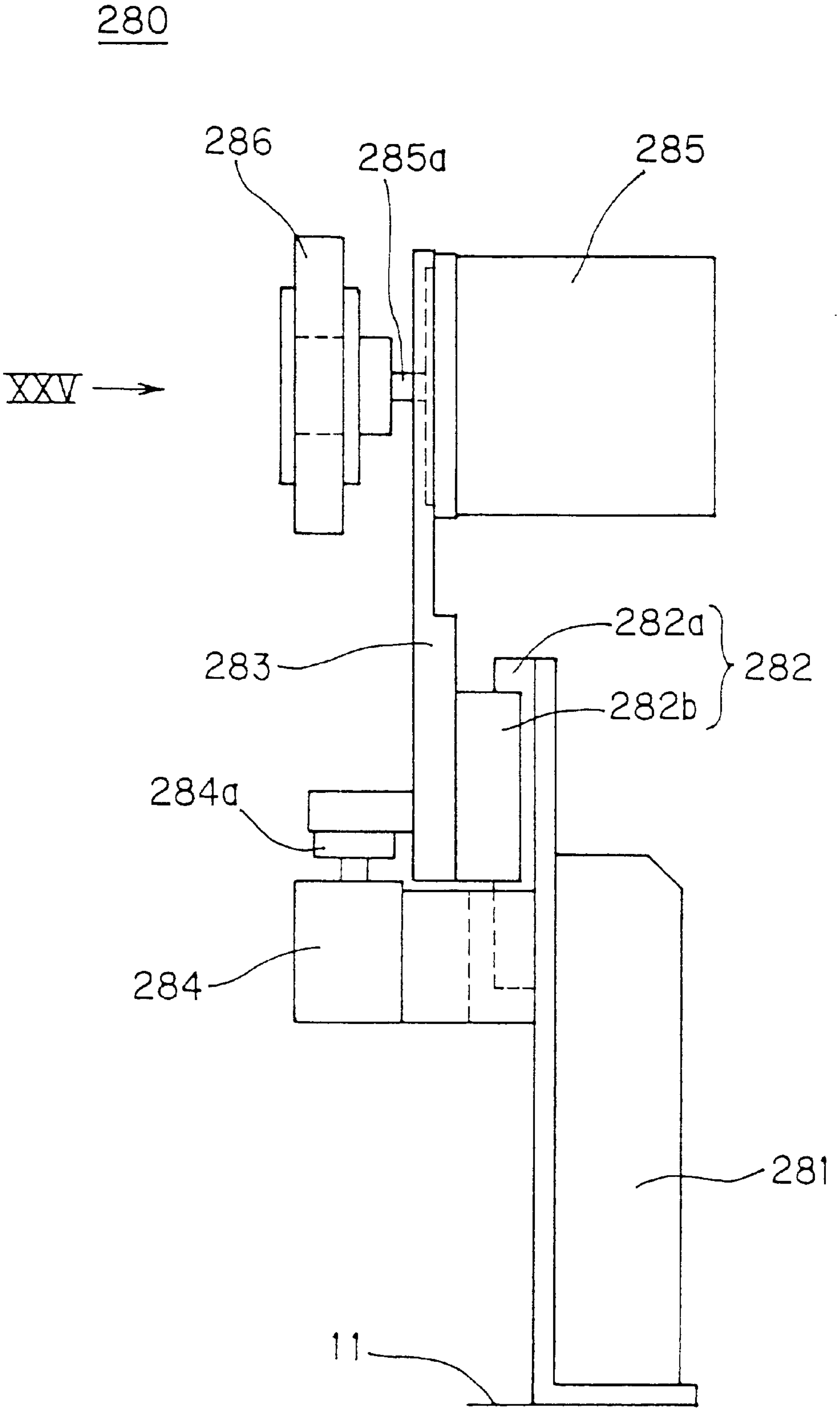
FIG. 24 is a view illustrating detailed structure of a sleeve-ejecting device provided in the producing apparatus.
Figure 25:
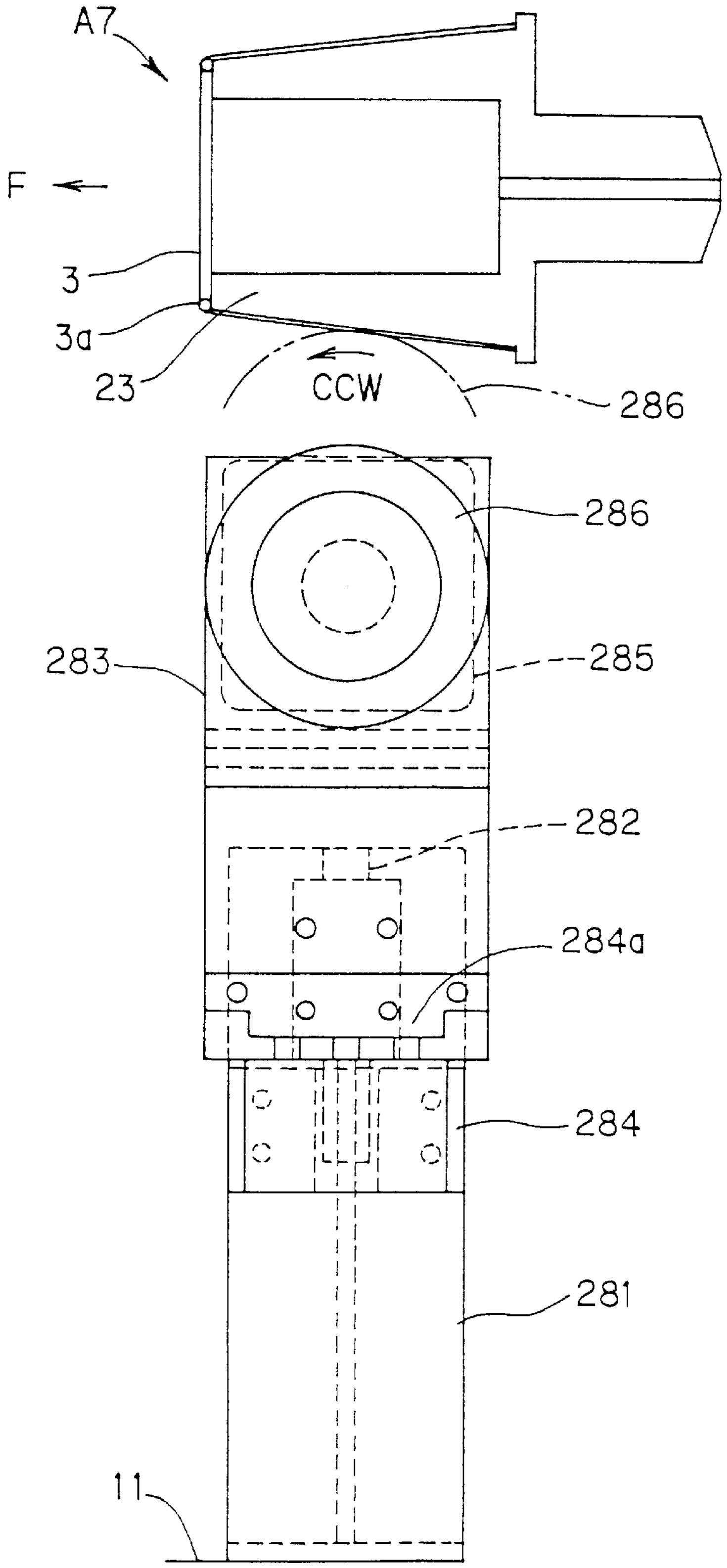
FIG. 25 is a view illustrating the structure of the sleeve-ejecting device observed from one side thereof as indicated by an arrow XXV in FIG. 24.

As shown in FIGS. 24 and 25, the sleeve-ejecting device 280 comprises a support member 281 fixed on the main body 11 of the apparatus 10, a motor base 283 mounted on the support member 281 through a linear motion guide unit 282, a pneumatic cylinder 284 mounted on the support member 281, a motor 285 mounted on the upper end of the motor base 283, and a roller 286 mounted on an output shaft 285*a* of the motor 285. The linear motion guide unit 282 is provided with a rail 282*a* extending vertically, and the motor base 283 is connected to a slider 282*b* of the liner guide unit 282. The pneumatic cylinder 284 is provided with a movable portion 284*a* connected to the lower end of the motor base 283, and thus the motor base 283 can move in the vertical direction in accordance with the motion of the movable portion 284*a* of the pneumatic cylinder 284. The output shaft 285*a* of the motor 285 extends in a direction perpendicular to the axial direction of the mandrel 23 in the station A7.

While the table 21 is turning, the movable portion 284*a* of the pneumatic cylinder 284 is withdrawn downward, and the roller 286 moves away from the mandrel 23. The output shaft 285*a* of the motor 285 rotates in a counter-clockwise direction in FIG. 25 as indicated by an arrow CCW, whether the table 21 is turning or not. After the table 21 turns and the sleeve 3 on the mandrel 23 is carried in the station A7, the press block 222 moves away from the mandrel 23 as mentioned above and the movable portion 284*a* of the pneumatic cylinder 284 is driven upward to press the outer circumferential surface of the roller 286 onto the sleeve 3 on mandrel 23 as illustrated by an imaginary line in FIG. 25. Therefore, the sleeve 3 is removed from the mandrel 23 in accordance with the rotation of the roller 286 and ejected toward the assembling section 30 as indicated by an arrow F. The ejected sleeve 3 is received by the sleeve-delivering device 360. The detail thereof will be explained later. After the roller 286 is kept in the lifted up position for a predetermined time, the movable portion 284*a* of the pneumatic cylinder 284 returns to the position indicated by a solid line in FIG. 25 to allow the next turn of the table 21.

Figure 26:
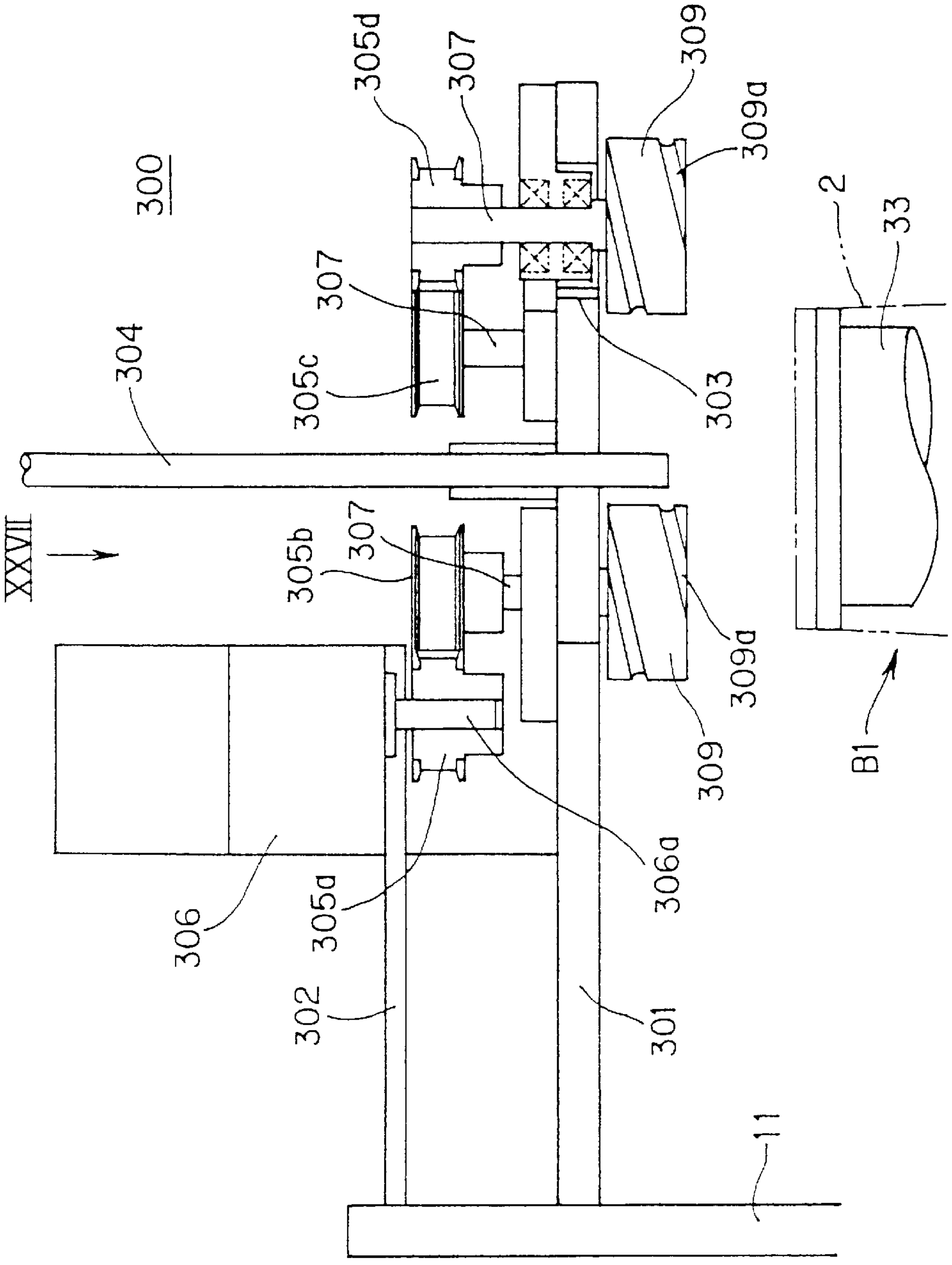
FIG. 26 is a view illustrating detailed structure of a cup body supplying device provided in the producing apparatus.
Figure 27:
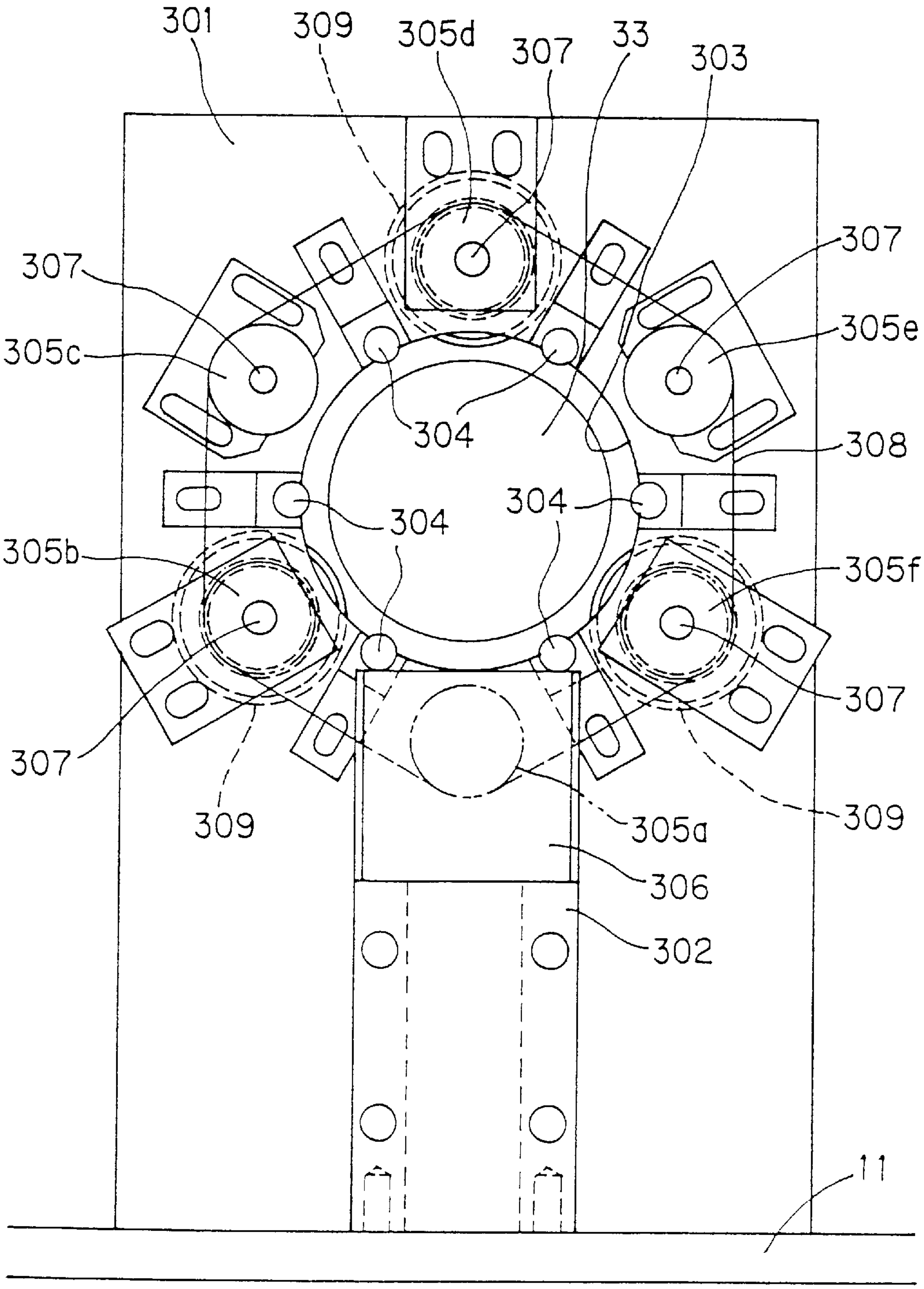
FIG. 27 is a view illustrating the detailed structure of the cup body supplying device observed from the top thereof as indicated by an arrow XXVII in FIG. 26.

FIGS. 26 and 27 show a detail of the cup body supplying device 300. The device 300 is provided for delivering the cup body 2 to the cup holder 33 in the station B1 in a reversed posture, and comprises a base plate 301 disposed above the station B1 so as to be supported horizontally on the main body 11 of the producing apparatus 10 and a motor base 302 disposed above the plate 31 so as to be parallel thereto. The base plate 301 is formed with a through hole 303 coaxial with the axis of the cup holder 33 in the station B1, and the inner diameter of the through hole 303 is greater than the outer diameter of the cup body 2 at the curled portion 2*c*. Around the through hole 303, there are provided six rods 304 . . . 304 with leaving certain intervals therebetween in a circumferential direction of the hole 303 (refer to FIG. 9). The rods 304 surround a space in which a plurality of the cup bodies 2 is stocked in the reversed posture in the vertical direction. The cup body 2 stocked in the space has been formed with all elements except for the ribs 2*e*, 2*f*.

On the base plate 301, there are provided six pulleys 305*a*, 305*b*, . . . 305. A motor 306 is mounted on the motor base 302 and the pulley 305*a* is fitted on an output shaft 306*a* of the motor 306 so as to be rotatable therewith. The other pulleys 305*b*. . . 305*f* are fitted to the pulley shafts 307. . . 307 so as to be rotatable therewith, and each pulley shaft 307 is rotatably supported by the base plate 301. Between the pulleys 305*a* to 305*f*, there is stretched a belt 308 to rotate the pulleys 305*a* to 305*f* together in accordance with the rotation of the output shaft 306*a* of the motor 306. The two pulleys 305*b* and 305*f*, each of which adjoins the pulley 305*a*, and the pulley 305*d* which is disposed on an opposite side of the through hole 33 to the pulley 305*a* are connected with rollers 309 . . . 309 through the pulley shafts 307, respectively. Each roller 309 is formed with a helical groove 309*a* on its outer circumferential surface.

The roller 309 slightly protrudes inward from the outer circumference of the hole 303 in a radial direction thereof and the plurality of the cup bodies 2 stocked between the rods 304 are supported from the lower side by the rollers 309. When the output shaft 306*a* of the motor 306 is driven in a predetermined direction, the curled portion 2*c* of the cup body 2 disposed at the lowest position within all of the cup bodies 2 . . . 2 engages with the grooves 309*a* of the rollers 309 and is fed downward in accordance with the rotations of the rollers 309. Therefore, one of the cup bodies 2 is ejected from the space between the rods 304 and is put on the cup holder 33. Every time the table 31 turns 45 degrees, the rollers 309 are repeatedly driven a predetermined angle to supply the cup body 2 to the cup holder 33 carried in the station B1.

The cup body 2 put on the cup holder 33 moves to the rib-processing device 320 in the station B2 in accordance with the next turn of the table 31 and further moves to the rib-processing device 320 in the station B3 in accordance with the further turn of the table 31.

Figure 28:
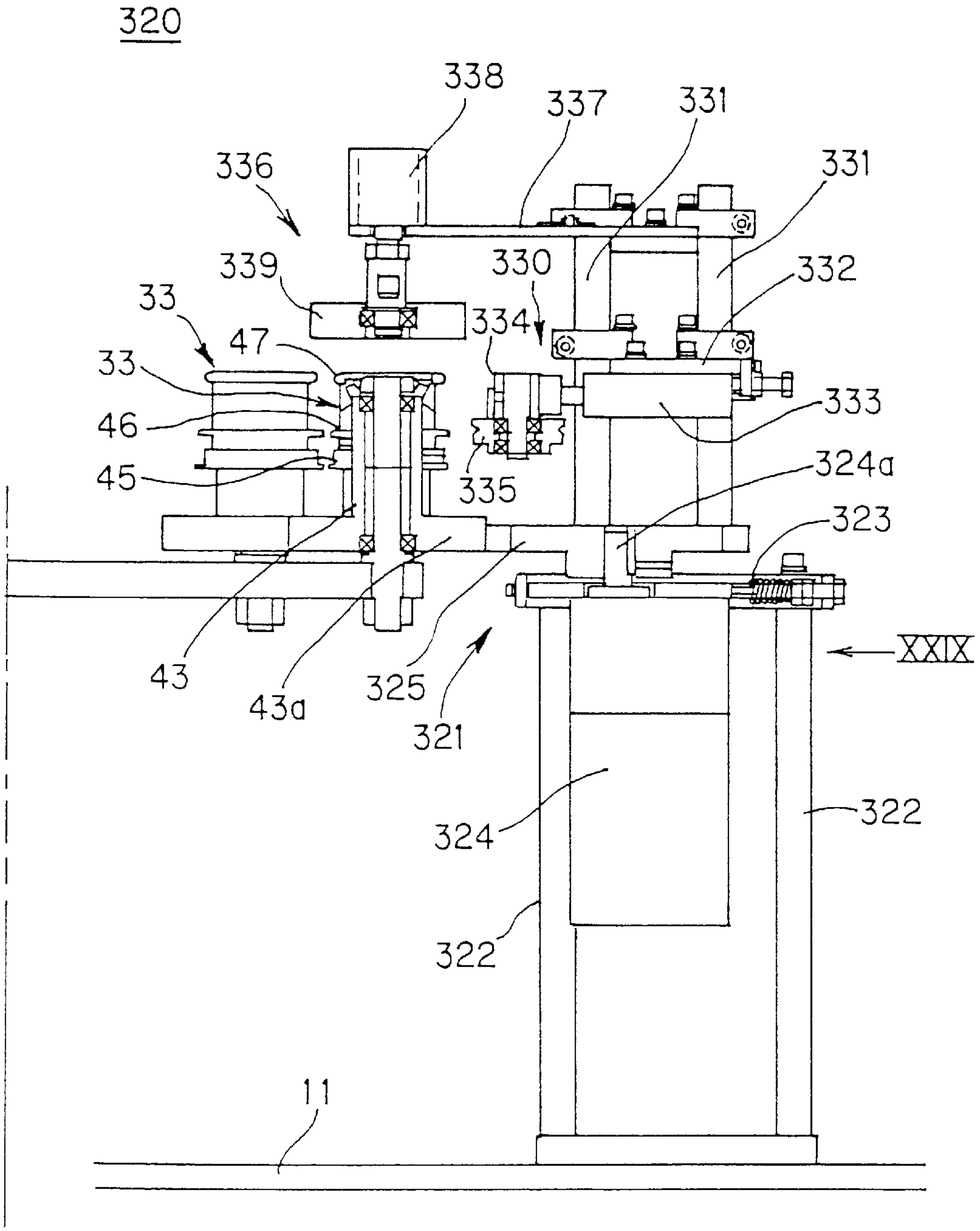
FIG. 28 is a view illustrating detailed structure of a rib-processing device provided in the producing apparatus.
Figure 29:
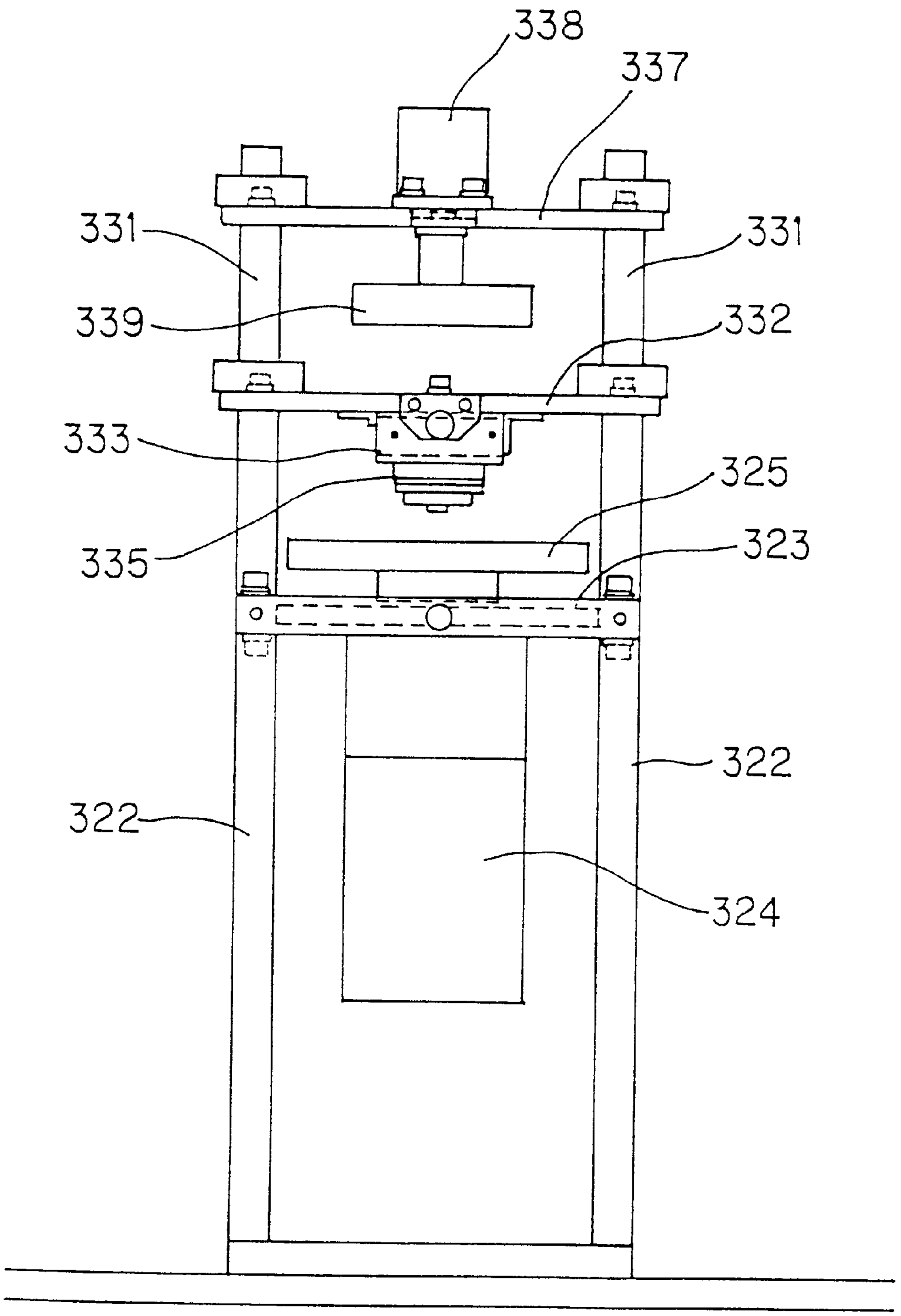
FIG. 29 is a view illustrating the detailed structure of the rib-processing device observed from one side thereof as indicated by an arrow in FIG. 28.
Figure 30:
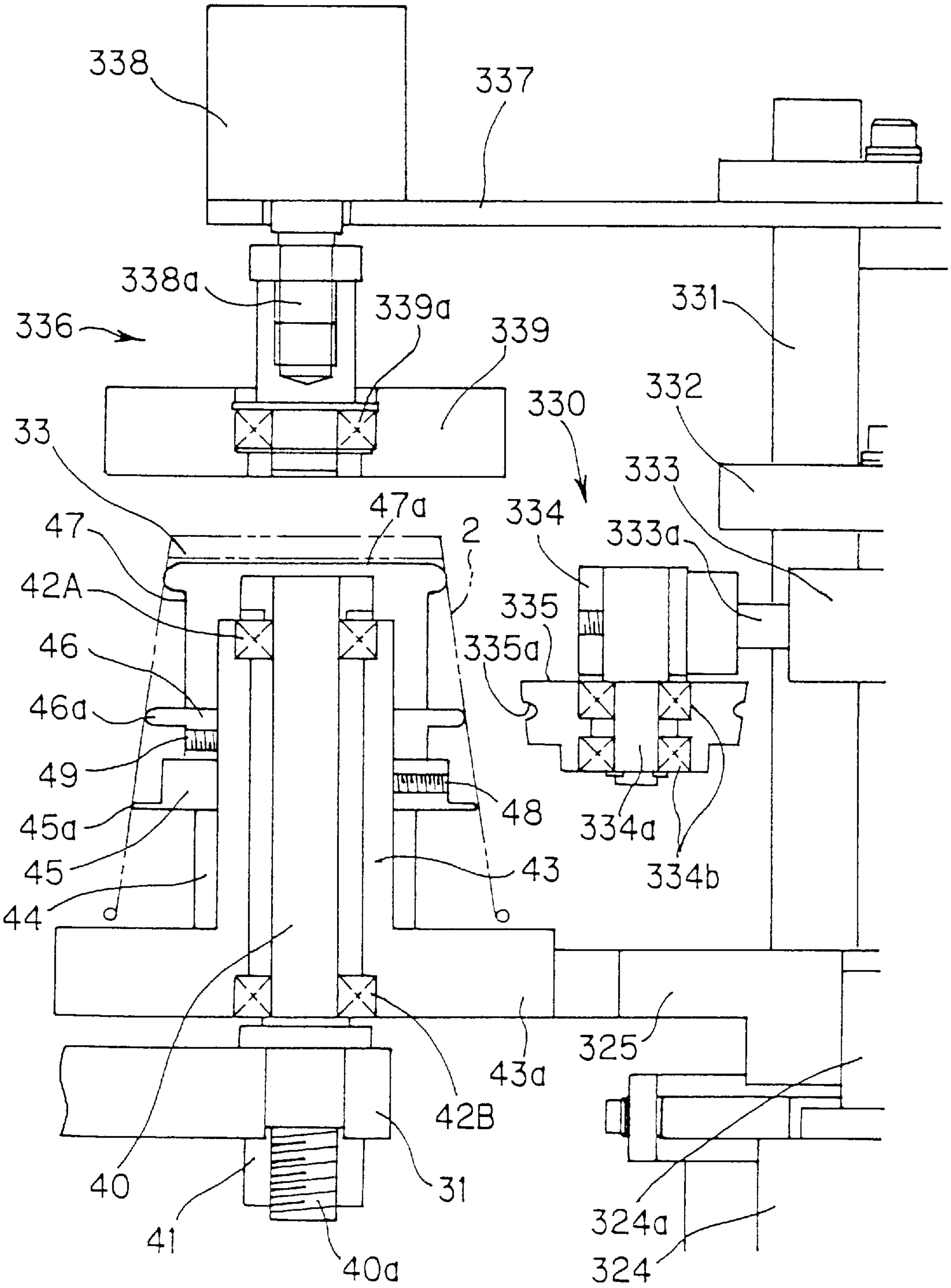
FIG. 30 is an enlarged view illustrating a major part of the rib-processing device.

FIGS. 28 and 29 show a detail of the rib-processing device 320. Each device 320 forms the rib 2*f* or 2*e* in cooperation with the cup holder 33. As shown in FIG. 30, the cup holder 33 comprises a vertically extending support shaft 40 mounted on the outer periphery of the table 31, a nut 41 fitted on a screw portion 40*a* of the support shaft 40 to retain the shaft 40 on the table 31, a rotary cylinder 43 as a rotary portion rotatably fitted on the outer periphery of the support shaft 40 through bearings 42A, 42B, a spacer 44 fitted on the outer periphery of the rotary cylinder 43 so as to be coaxial therewith, model members 45, 46 and a cap 47. The rotary cylinder 43 is formed at its lower end with a driven wheel 43*a* as a rotation input portion coaxial with the support shaft 40. The spacer 44, the model members 45, 46 and the cap 47 are detachable from the rotary cylinder 43, and the model members 45, 46 are especially associated with the rotary cylinder 43 so as to be rotatable therewith by using set screws 48, 49, respectively.

The model members 45, 46 are provided to form the ribs 2*f*, 2*e*, and are formed with flanges 45*a*, 46*a* on their outer peripheries. Each of the flanges 45*a*, 46*a* functions as an abutment portion and is coaxial with the rotary cylinder 43, and each outer peripheral portion thereof is formed into a round shape in its section. The cap 47 is formed on its upper end with a bottom support portion 47*a* to support the bottom 2*b* of the cup body 2 from the inside thereof. When the bottom 2*b* is brought into contact with the bottom support portion 47*a*, the flanges 45*a*, 46*a* almost contact the inner surface of the side wall 2*a* at positions to which the ribs 2*f*, 2*e* are formed, respectively. The outer periphery of each of the flanges 45*a*, 46*a* thus functions as an abutment portion. The thickness of each of the flanges 45*a*, 46*a*, that is, the dimension in the vertical direction in FIG. 30 is adjusted in accordance with the width of each of the ribs 2*f*, 2*e*. The vertical positions of the flanges 45*a*, 46*a* can be adjusted by changing the thickness of the spacer 44. If the width of the rib is changed in accordance with the type of the cup body 2, it is preferable to prepare a plural types of the model members, each of which corresponding to different types of the ribs, and the one type of the model member proper to rib to be processed on the cup body 2 may be fitted on the rotary cylinder 43.

As shown in FIGS. 28 and 29, the rib-processing device 320 is provided with a rotary drive mechanism 321 for rotating the cup body 2 and the cup holder 33, a press mechanism 330 for forming the ribs 2*e*, 2*f* by pressing the cup body 2 onto the model members 45, 46 during its rotation, and a restraining mechanism 336 for preventing upward motion of the cup body 2 during the process.

The rotary drive mechanism 321 comprises four rods 322 . . . 322 mounted on the main body 11 of the apparatus 10, a motor base 323 mounted on the upper ends of the rods 322, and a motor 324 mounted on the motor base 323. The motor 324 is provided with an output shaft 324*a* projecting upward, and a drive wheel 325 as a rotation output portion is mounted on the shaft 324*a*. When the cup holder 33 is carried in the station B2 or B3 in accordance with the turn of the table 31, the drive wheel 325 contacts the driven wheel 43*a* of the cup holder 33 to allow the rotary cylinder 43 to be rotated in accordance with the rotation of the output shaft 324*a* of the motor 342. When the table 31 turns, the driven wheel 43*a* moves away from the drive wheel 325 to thereby break the rotation transmission between the wheels 325, 43*a*. When the table 31 stops after turning predetermined angle, i.e. 45 degrees, the driven wheel 43*a* of the next cup holder 33 contacts the drive wheel 325 to thereby allow the rotation transmission therebetween.

As minutely shown in FIG. 30, the press mechanism 330 comprises four rods 331 . . . 331 extending vertically from the motor base 323, a bracket 332 installed on the rods 331, a pneumatic cylinder 333 as a drive power source mounted on the bracket 332, a holder 334 attached to a piston rod 333*a* of the pneumatic cylinder 333, and a press roller 335 rotatably mounted on a shaft portion 334*a* of the holder 334 through bearings 334*a*, 334*a*. The outer circumferential surface of the roller 335 is formed as a tapered surface inclining along the side wall 2*a* of the cup body 2 (refer to FIG. 6), and is formed with a groove 335*a* having a generally semi-circular profile in its section. In the station B2, the profile of the groove 335*a* of the press roller 335 is complementary to the outer periphery of the flange 45*a*, and the profile of the groove 335*a* of the press roller 335 in the station B3 is complementary to the outer periphery of the flange 46*a*.

The bracket 332 is mounted on the rods 331 in such a manner that the vertical position thereof can be adjusted along the rods 331. In the station B2, the position of the bracket 332 is adjusted so as to locate the groove 335*a* of the press roller 335 and the flange 45*a* on the same position in the vertical direction, and in the station B3, the position of the bracket 332 is adjusted so as to locate the groove 335*a* of the press roller 335 and the flange 46*a* on the same position in the vertical direction.

The restraining mechanism 336 comprises a bracket 337 mounted on the upper ends of the rods 331, a pneumatic cylinder as a drive power source mounted on the end portion of the bracket 337 so as to be oriented downward, and a restrain plate 339 rotatably connected to a piston rod 338*a* of the pneumatic cylinder 338 through a bearing 339. When the piston rod 338*a* of the pneumatic cylinder 338 moves downward, the restrain plate 339 contacts the bottom 2*b* of the cup body 2 to thereby prevent the lift-up of the cup body 2 during the process of forming the ribs 2*f*, 2*e*.

Figure 31A:
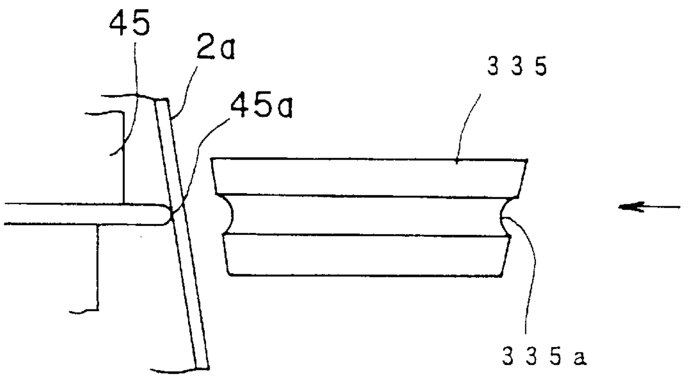
FIGS. 31A to 31C are views illustrating a manner for processing the rib as the Peter line by the rib-processing device of FIG. 28.
Figure 31B:
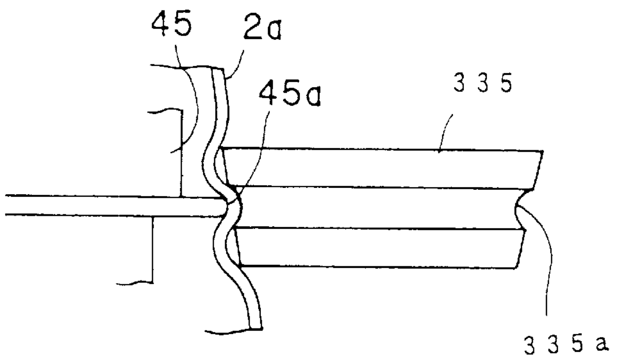

The operation of the rib-processing device 320 in the station B2 is as follows. When the table 31 stops after turning a predetermined angle and the cup body 2 is supplied to the station B2, the drive wheel 325 and the wheel 43*a* of the cup holder 33 contact each other, so that the rotary cylinder 43 of the holder 33 and the cup body 2 are rotatably driven around the axis of the holder 33. Under this condition, the pneumatic cylinder 338 of the restraining mechanism 336 is activated to bring the restrain plate 339 into contact with the bottom 2*b* of the cup body 2, and at the same time, the piston rod 333*a* is protruded to move the press roller 335 toward the side wall 2*a* as indicated by an arrow in FIG. 31A. As a result, the press roller 335 contacts the side wall 2*a*, and the side wall 2*a* is pushed inward as indicated in FIG. 31B. Therefore, the side wall 2*a* is sandwiched between the groove 335*a* and the flange 45*a*, and the side wall 2*a* is resiliently deformed to produce the rib 2*f* as the Peter line. At this time, since the cup body 2 and the flange 45*a* are rotating, the position at which the press roller 335 and the side wall 2*a* contact each other is sequentially changed in accordance with the rotation thereof, so that the rib 2*b* is gradually formed in the circumferential direction of the cup body 2. Therefore, it is possible to reduce force necessary for forming the rib on the cup body 2 excessively in comparison with a case in which the entire rib is formed at one time. Also, since the roller 335 rotates about its axis in accordance with the rotation of the cup body 2, it is possible to reduce friction between the roller 335 and the side wall 2*a* to thereby reduce the load which is added on the cup body 2 during the production of the rib.

Figure 31C:
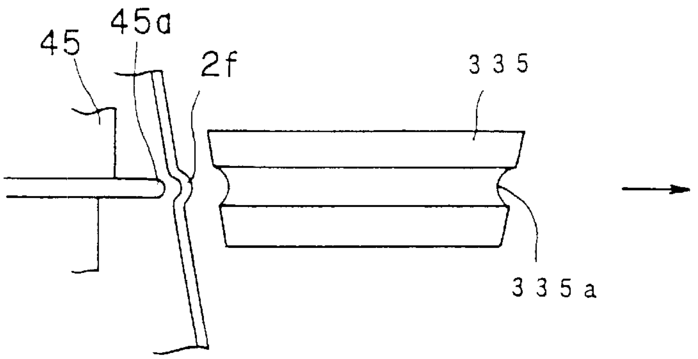

After the press roller 335 relatively revolves around the cup body 2 one time or more, the piston rod 333*a* is retracted to detach the press roller 335 from the side wall 2*a* as shown in FIG. 31C. The side wall 2*a* except for the portion which was sandwiched between the groove 335*a* and the flange 45*a* returns to its original shape by resilience thereof, and thus the rib 2*b* as the Peter line projects outward from the side wall 2*a* all around the cup body 2. The restrain plate 339 of the restraining mechanism 336 is pulled up simultaneously with the detachment motion of the press roller 335. Thus, the press mechanism 330 functions as a radial direction driving device, the press roller 335 functions as a female model member, each of the flanges 45*a*, 46*a* functions as a male model member, the restraining mechanism 33 functions as a restraining device.

The cup body 2 on which the rib 2*b* is formed is fed to the station B3 in accordance with the next turn of the table 31. In the station B3, the press mechanism 330 and the restraining mechanism 336 are driven to form the rib 2*e* on the side wall 2*a* in the same manner as mentioned above. The operations of the press roller 335 and the flange 46*a* against the side wall 2*a* are similar to the illustrations of FIGS. 31A to 31C, so that the detailed description thereof is omitted.

The cup body 2 on which the rib 2*e* is formed is carried in the adhesive applying device 340 (refer to FIG. 7) in the station B4. While the cup body 2 is moving from the station B3 to the station B4, the wheel 43*a* is apart from the drive wheel 325 and the rotation transmission therebetween is broken. However, the rotary cylinder 43 keeps its rotation for a while in the station B4 due to inertia thereof.

Figure 32:
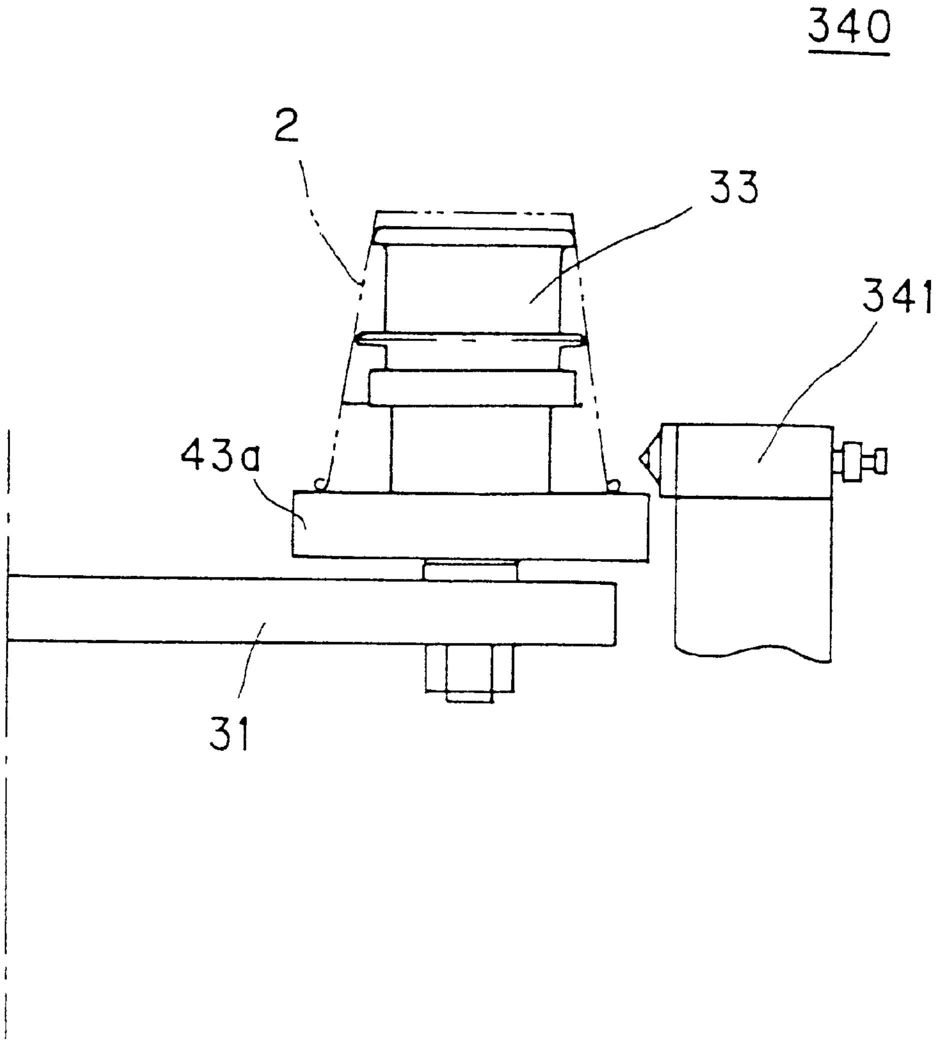
FIG. 32 is a view illustrating detailed structure of an adhesive agent applying device provided in the producing apparatus.

As shown in FIG. 32, the adhesive applying device 340 is provided with a nozzle gun 341 capable of spraying the adhesive agent 4 (refer to FIG. 6) toward the side wall 2*a*. Every time the cup body 2 is fed to the station B4 by the table 31, the nozzle gun 341 ejects the adhesive agent 4 for a predetermined time. Due to the rotation of the cup body 2 in the station B4, the adhesive agent 4 ejected from the nozzle gun 341 is uniformly applied on the bonding area BD of the cup body 2 (refer to FIG.6).

Figure 33:
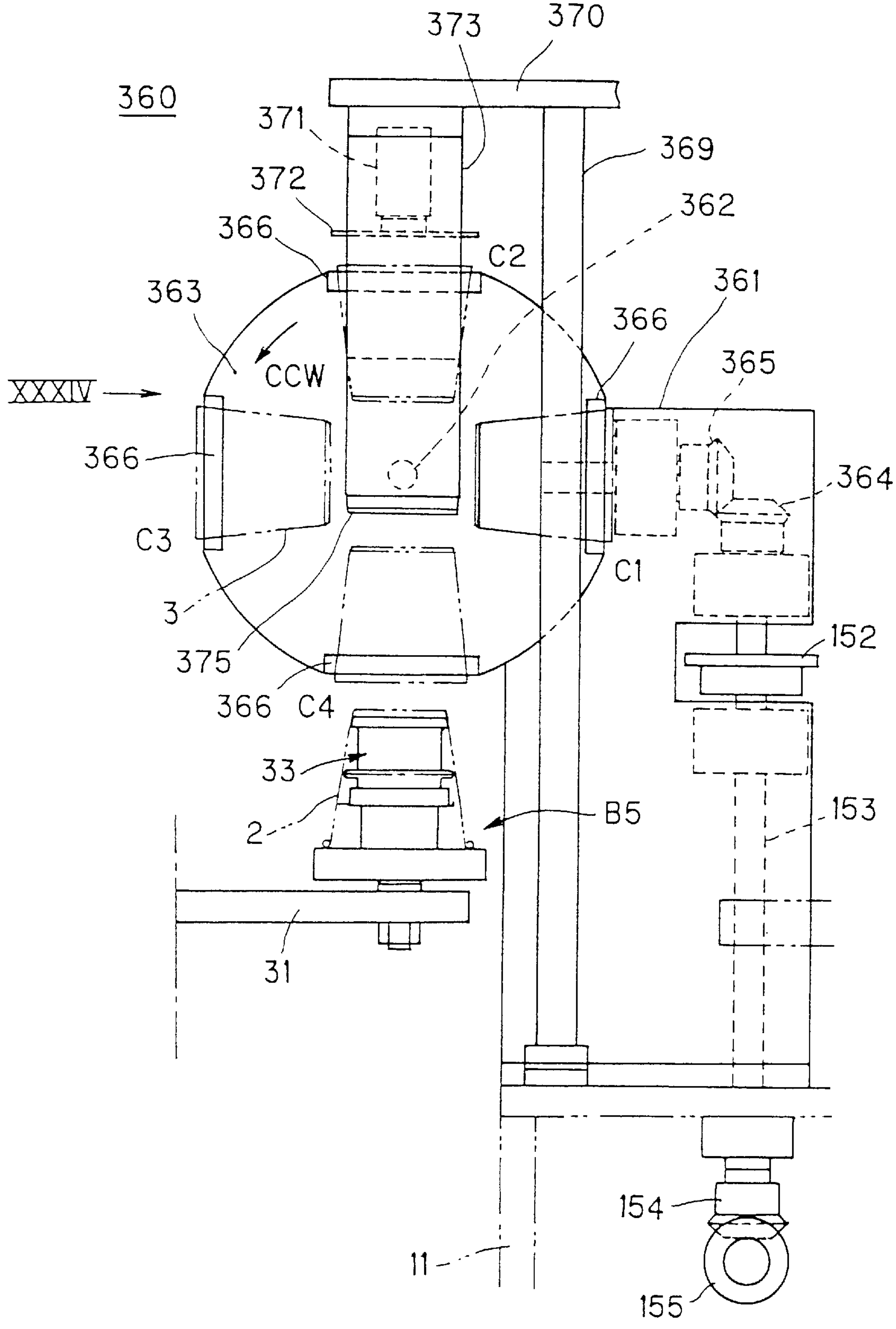
FIG. 33 is a view illustrating detailed structure of a sleeve-delivering device provided in the producing apparatus.
Figure 34:
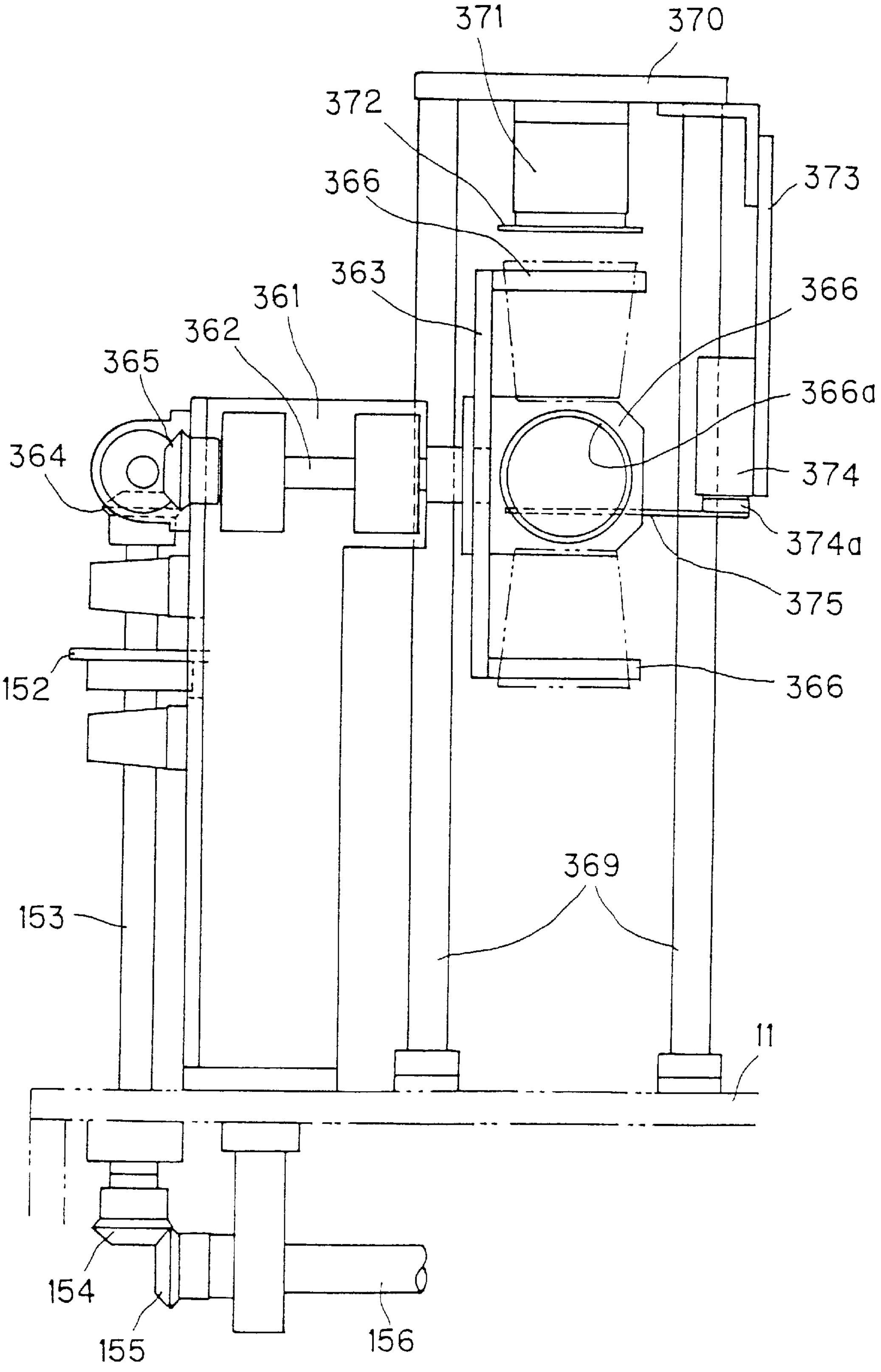
FIG. 34 is a view illustrating the detailed structure of the sleeve-delivering device observed from one side thereof as indicated by an arrow XXXIII in FIG. 33.

The cup body 2 on which the adhesive agent 4 is applied in the station B4 is fed to the sleeve-delivering device 360 provided in the station B5. FIGS. 33 and 34 show a detail of the device 360. The sleeve-delivering device 360 is provided for receiving the sleeve 3 ejected from the sleeve forming section 20 and delivering it on the cup body 2. The device 360 comprises a support member 361 mounted on the main body 11 of the apparatus 10, a drive shaft 362 supported on the support member 361 so as to be rotatable about the horizontal axis and an index table 363 attached to one end of the drive shaft 362. The drive shaft 362 is connected through a pair of bevel gears 364, 365 to the intermediate shaft 153, which transmits the rotation from the turn table 21 to the blank-supplying device 100. When the tables 21, 31 turn 45 degrees, the drive shaft 362 and the index table 363 are rotatably driven 90 degrees in the counter-clockwise direction in FIG. 33 as indicated by an arrow CCW.

The index table 363 is provided on its outer periphery with four holding plates 366 . . . 366. Each holding plate 366 is formed with a through hole 366*a* to which the sleeve 3 is fitted. The axis of the hole 366*a* extends in the radial direction of the index table 363, and the hole 366*a* is tapered in such a manner that the diameter thereof gradually reduces toward the center of the index table 363.

Every time the index table 363 rotates 90 degrees, each holding plate 366 moves 90 degrees around the center of the index table 363, so that each holder 366 stops at positions C1 to C4 one by one. The positions C1 to C4 are arranged at the right hand side, the upper end, the left hand side and the lower side of the index table 363. At the position C1, the through hole 366*a* of the holding plate 366 is arranged so as to be coaxial with the mandrel 23 located in the station A7 of the sleeve forming section 20, and at the position C4, the hole 366*a* is arranged so as to be coaxial with the cup holder 33 in the station B5. Therefore, the sleeve 3 removed from the mandrel 23 by the roller 286 (refer to FIG. 25) in the station A7 is inserted into the hole 366*a* of the holding plate 366 at the position C1. Also, the sleeve 3 carried to the position C4 falls off from the holding plate 366 to the cup holder 33 located below the holder 366 and is put on the outer periphery of the cup body 2.

As is clear from FIG. 34, in the vicinity of the index table 363, there are provided pneumatic cylinders 371, 374. The pneumatic cylinder 371 is supported on the main body 11 through rods 369 . . . 369 and a bracket 370, and the pneumatic cylinder 374 is supported by the bracket 370 through a sub bracket 373. The pneumatic cylinders 371, 374 have movable portions 371*a*, 374*a*, each of which is capable of protruding downward, and the push plates 372, 375 are attached to the movable portions 371*a*, 374*a*, respectively. Every time the index table 363 turns 90 degrees, each of the movable portions 371*a*, 374*a* is driven downward at least one time to thereby press down the sleeves 3 in the positions C2, C4. Therefore, the sleeve 3 in the position C2 is pushed into the hole 366*a* of the holding plate 366 to align the sleeve 3 with the center axis of the hole 366*a*, and the sleeve 3 in the position C4 is surely ejected from the hole 366*a*.

Figure 35:
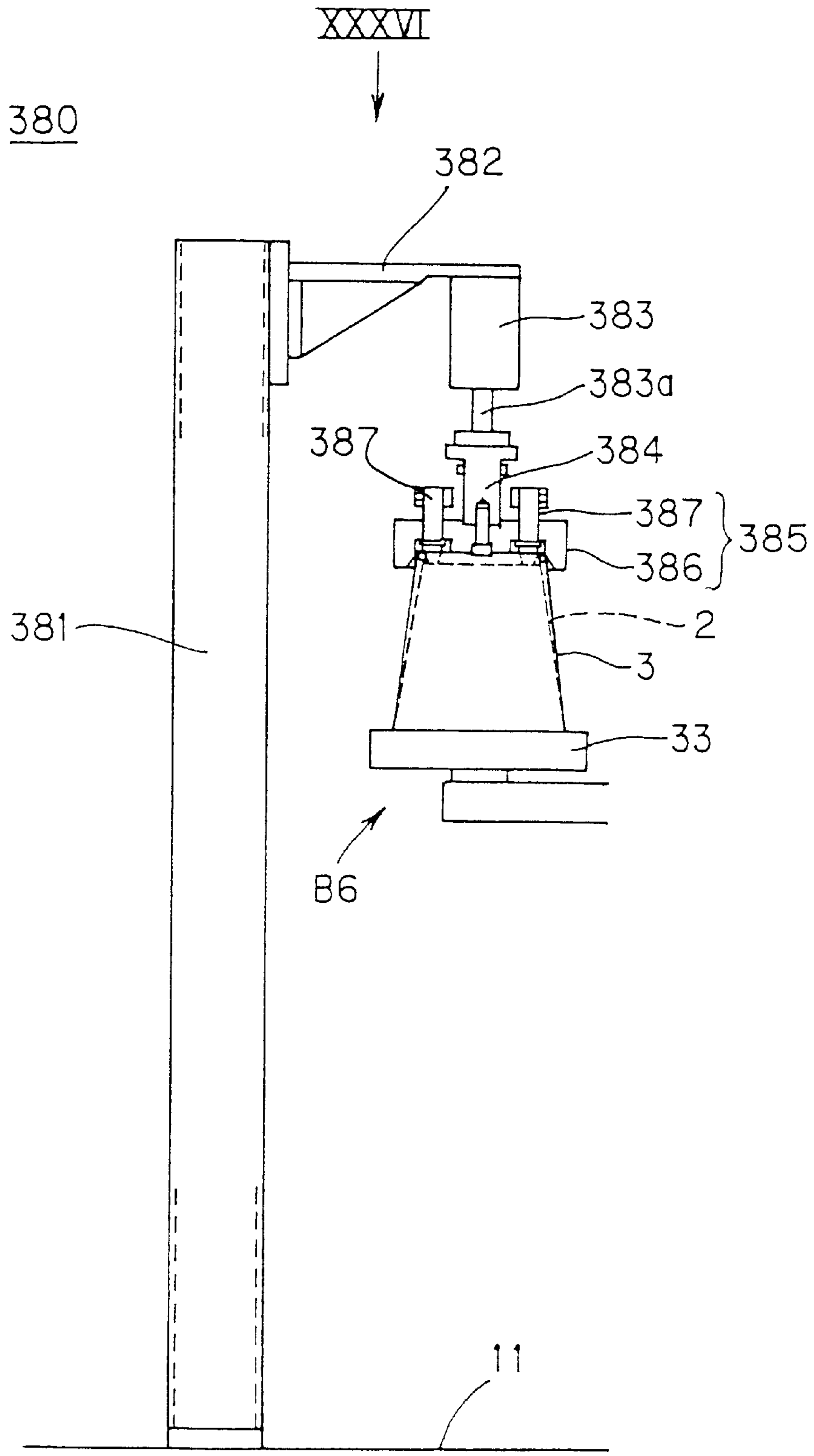
FIG. 35 is a view illustrating detailed structure of a sleeve-fitting device provided in the producing apparatus.
Figure 36:
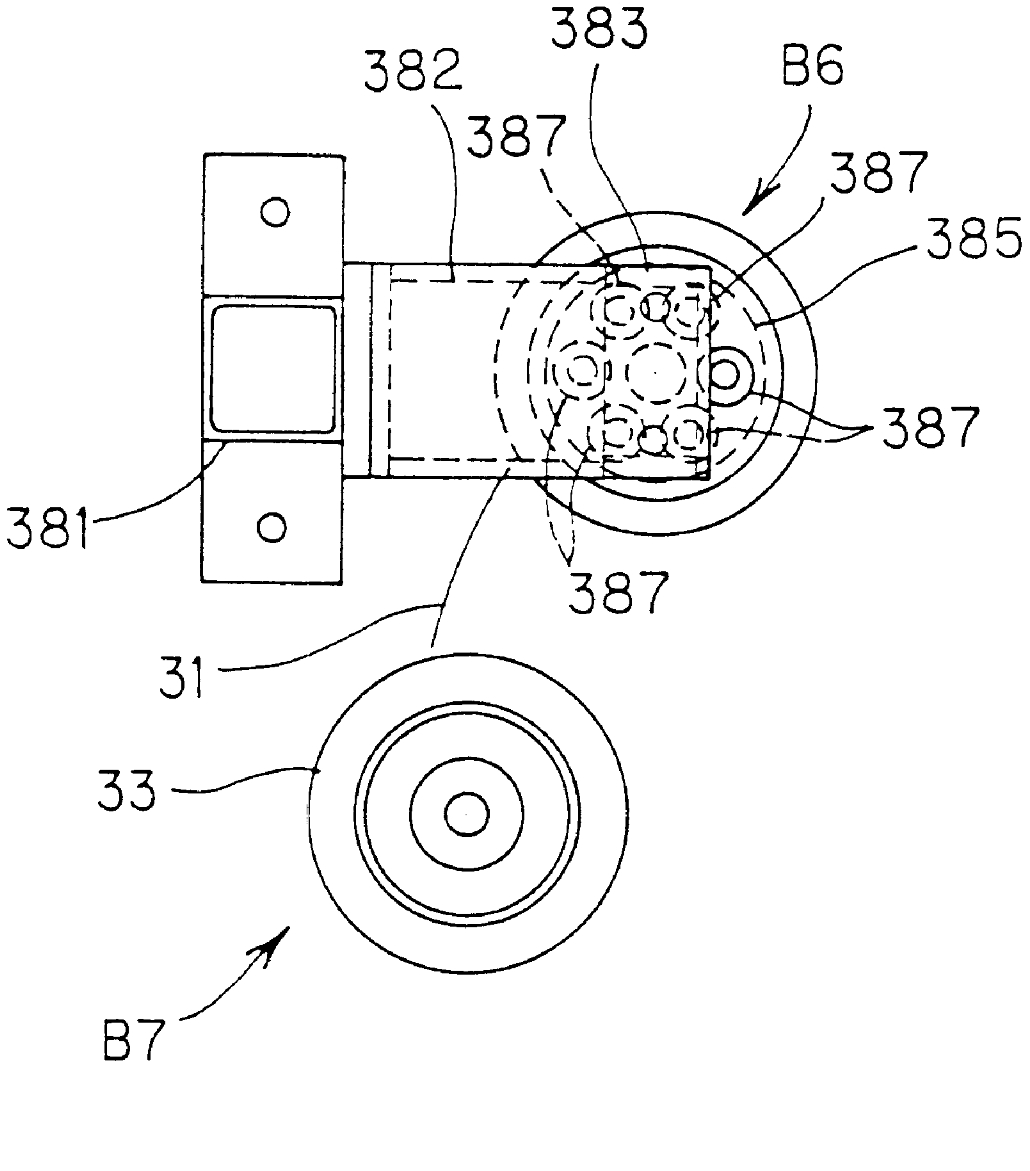
FIG. 36 is a view illustrating the detailed structure of the sleeve-fitting device observed from the top thereof as indicated by an arrow XXXVI in FIG. 35.

The cup body 2 surrounded with the sleeve 3 is fed to the sleeve-fitting device 380 in the station B6 in accordance with the next turn of the table 31. FIGS. 35 and 36 show a detail of the device 380. The sleeve-fitting device 380 comprises a column 381 mounted on the main body 11, a bracket 382 mounted on the upper end of the column 381, a pneumatic cylinder 383 suspended from the end portion of the bracket 382, and a fitting jig 385 connected to a piston rod 383*a* of the pneumatic cylinder 383 through a support rod 384.

Figure 37A:
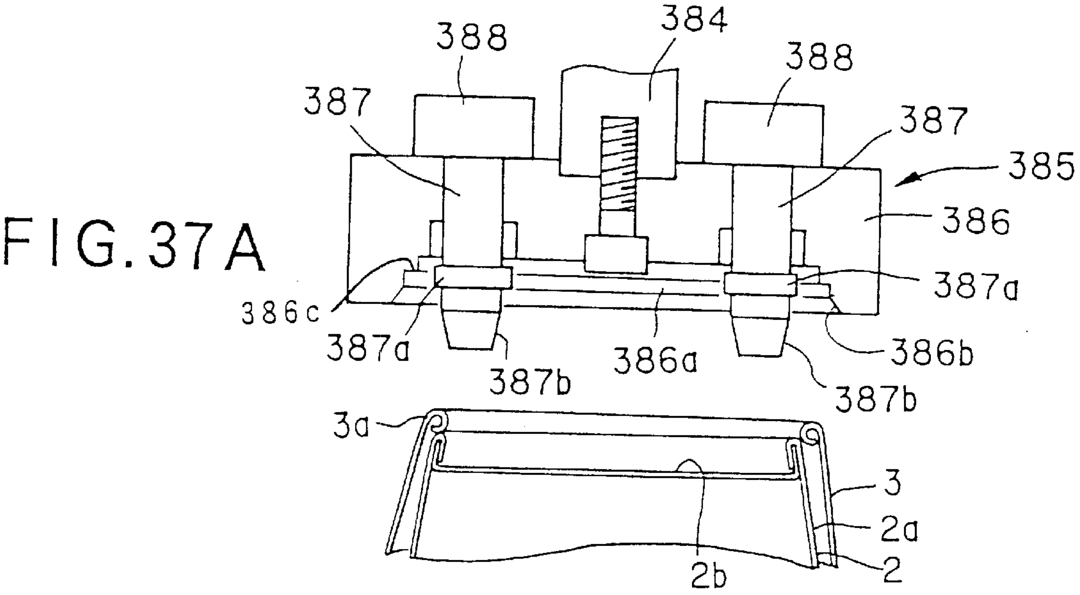
FIGS. 37A to 37C are views illustrating a process in which the sleeve and the cup body are aligned with each other by a jig provided in the sleeve-fitting device.
Figure 37B:
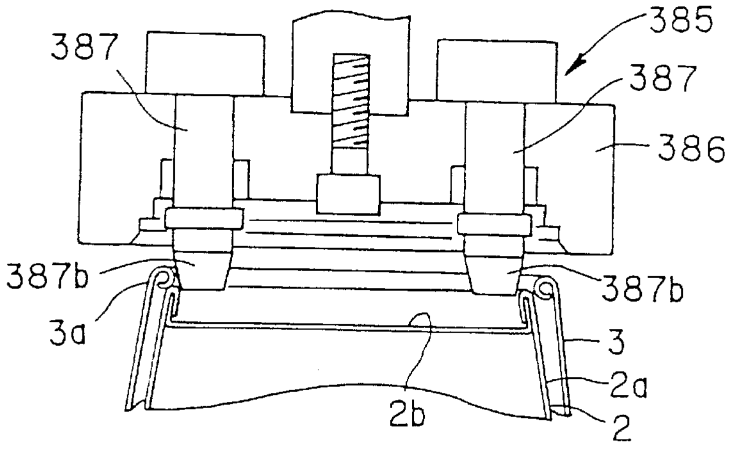

As shown in detail in FIG. 37A, the fitting jig 385 comprises a dish-like jig body 386 and six pins 387 . . . 387 arranged around the center axis of the jig body 386. The combination of the pins 387 functions as an alignment equipment. The jig body 386 is held so as to be coaxial with the cup holder 33 in the station B6. The body 386 is formed on its lower portion with a recess 386*a*, and a tapered surface 386*b* and a stepped portion 386*c* are formed on the periphery of the recess 386*a*. The pins 387 are attached to the jig body 386 so as to be movable in the vertical direction. On the upper end of each pin 387, there is provided a ring 388 to prevent the-pin 387 from falling off from the jig body 386, and the pin 387 is formed with a flange 387*a* to prevent the pin387 from being ejected upward through the jig body 386. On the lower end of the pin 387 is formed with a tapered portion 387*b*. It is possible to round the lower end of the pin 387 instead of forming the tapered portion 387*b*.

While the table 21 is turning, the jig body 386 is kept in a position above the pneumatic cylinder 383 as illustrated in FIG. 35. At this time, the pins 387 are kept in positions lowered by their weight as illustrated in FIG. 37A, and the tapered portions 387*b* thereof protrude downward from the jig body 386, respectively. After the cup body 2 surrounded with the sleeve 3 is fed to the station B6 from the station B5 by the table 31, the jig body 385 is reciprocally driven in the vertical direction by the pneumatic cylinder 383 at least one time. Therefore, if the sleeve 3 is put on the cup body 2 in a miss alignment manner as shown in FIG. 37A, the tapered portions 387*b* of the pins 387 contact the curled portion 3*a* from the inside thereof in accordance with the downward motion of the jig 385, and thus the curled portion 3*a* is moved in its radial direction by the pins 387 to thereby align the sleeve 3 and the cup body 2 surely with each other.

Figure 37C:
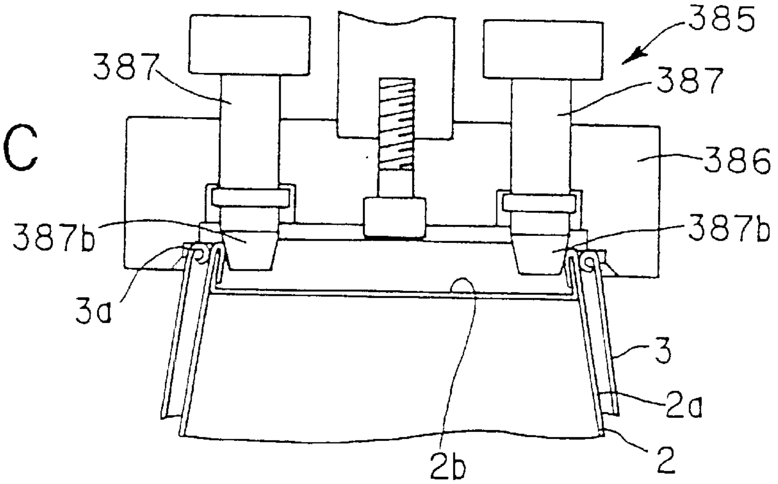

When the jig 385 goes down to a predetermined position, the tapered portions 387*a* contact the inner surface of the side wall 2*a* at the lower end thereof (upper end in FIG. 37C). Under this condition, even if the jig 385 is further driven downward, the pins 387 can not move inside the side wall 2*a* due to resistance of the side wall 2*a*, and thus the pins 387 relatively moves upward against the jig body 386. On the other hand, the curled portion 3*a* of the sleeve 3 contacts the tapered surface 386*b* of the jig body 386 to thereby be aligned and is pressed down by the stepped portion 386*c*. As a result, the inner surface of the upper end portion 3*f* of the sleeve 3 contacts the bonding area BD (refer to FIG. 6), and thus the sleeve 3 and the cup body 2 are surely bonded with each other.

The fitting jig 385 lowered to a position illustrated in FIG. 37C is pulled up again by the pneumatic cylinder 383 to make preparation for the next turn of the table 31. At the start of pulling up the jig 385, the pins 387 merely contact the lower end of the side wall 2*a* and are not pressingly inserted into the inner side of the side wall 2*a*. Accordingly, there is no fear that the cup body 2 is pulled up from the cup holder 33 together with the pins 387.

The sleeve 3 and the cup body 2 are thus assembled through the above processing, and the production of the container 1 is finished. The prepared container 1 is fed to the station B7 in accordance with the next turn of the table 31, and is fed to the station B8 in accordance with the further turn thereof. As shown in FIG. 7, a duct 50 is provided above the cup holder 33 in the station B8. The container 1 is carried into the duct 50 by compressed air blown out from holes (not shown) provided on the upper end of the cup holder 33.

Figure 38A:
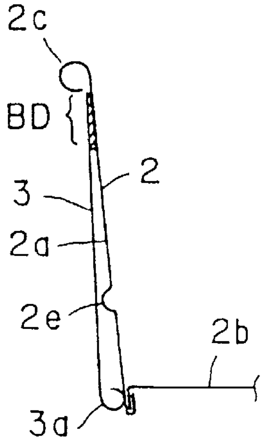
FIGS. 38A to 38H are views illustrating variations of the container of FIG. 5.
Figure 38B:
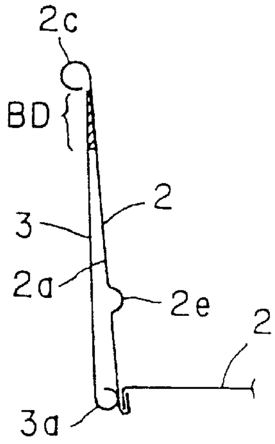
Figure 38C:
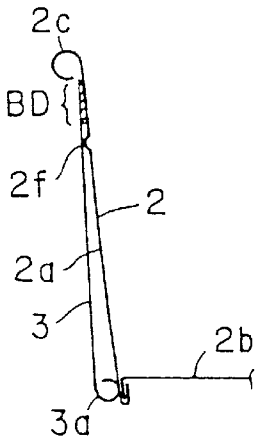
Figure 38D:
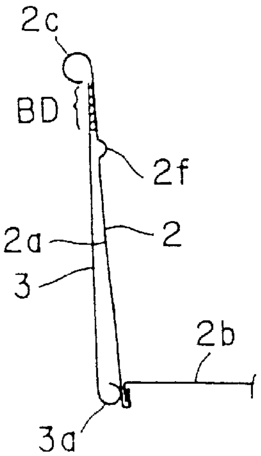
Figure 38E:
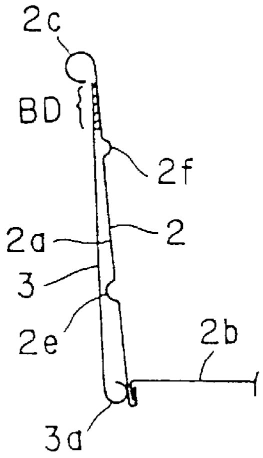
Figure 38F:
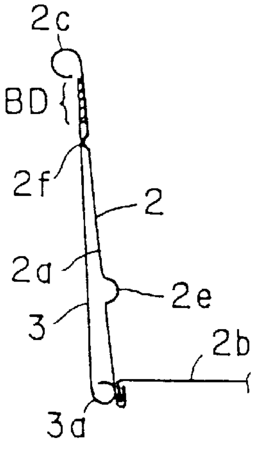
Figure 38G:
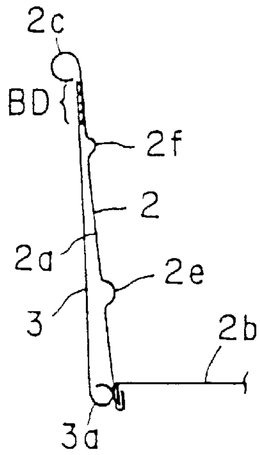
Figure 38H:
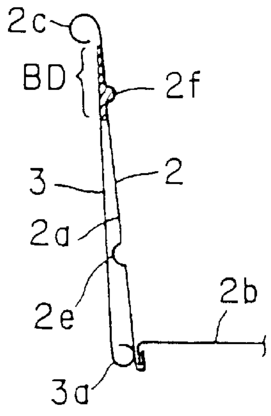

The present invention is not limited to the above embodiments, and various modifications can be applied. For example, the container 1 can be modified as shown in FIGS. 38A to 38H. FIG. 38A shows an example in which the rib 2*f* as the Peter line is omitted from the cup of FIG. 5, FIG. 38B shows an example in which the rib 2*e* is changed from that of FIG.38A so as to be projected inward, FIG. 38C shows an example in which the rib 2*e* is omitted from the cup 1 of FIG. 5, and FIG. 38D shows an example in which the rib 2*f* of FIG. 38C is changed so as to be projected inward. A1so, FIG. 38E shows an example in which the rib 2*f* as the Peter line is changed from that of FIG. 5 so as to be projected inward, FIG. 38F shows an example in which the rib 2*e* is changed from that of FIG. 5 so as to be projected inward, and FIG. 38G shows an example in which the ribs 2*f*, 2*e* are projected inward. Further, FIG. 38H shows an example in which the bonding area BD is extended from that of FIG. 5 so as to include the rib 2*f* as the Peter line. The Peter line may be located close to the curled portion 2*c* of the cup body 2, and in this case, it is difficult to keep the bonding area BD sufficiently without including the rib 2*f* as the Peter line. The arrangement of FIG. 34H is effective to this case. It may also be possible to set the bonding area BD including the Peter line in the cases of FIGS. 34D and 34G.

In the above mentioned embodiment, no process is performed in each of the station A6 of the sleeve forming section 20 and the station B7 of the assembling section 30. However, it is possible to perform proper process in each of the stations A6 and B7 as necessary. For example, it is preferable to check the container 1 at the station B7, and to eject a defective container from a non-defective container at the station B8. The number of the stations can be changed. For example, if the curled portion 3*a* of the sleeve 3 can be completely formed in one step, one of the devices 260 can be omitted and the number of the stations in the sleeve forming section 20 can be reduced. If the ribs 2*e*, 2*f* are formed in the common station, it is possible to reduce the number of the stations in the assembling section 30. On the contrary, it is possible to increase the number of the stations to add another process necessary for producing the container 1. As long as the supply of the sleeve 3 to the sleeve-delivering device 360 and the supply of the cup body 2 thereto are synchronized with each other, it is not always necessary to accord indexing angles i.e. driving angles of the tables 21, 31 with each other.

Figure 39:
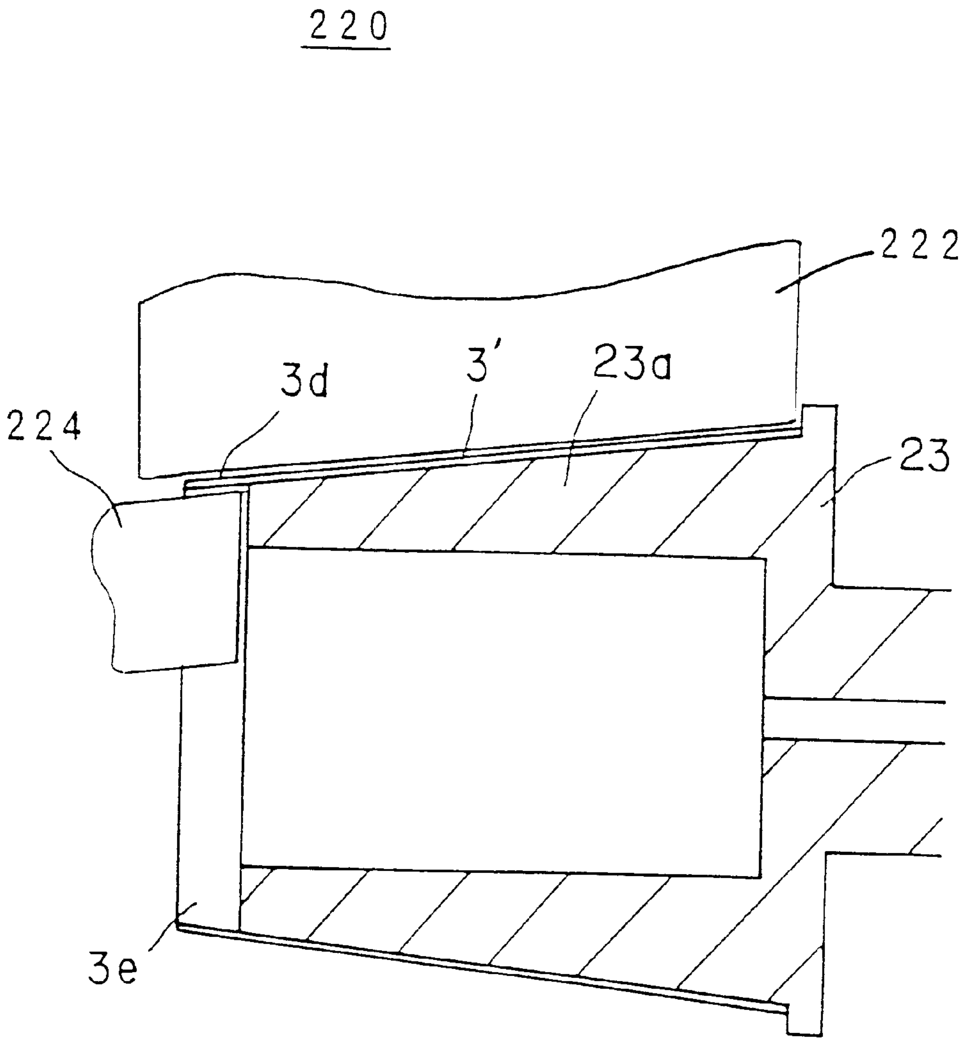
FIG. 39 is a view illustrating another embodiment of the producing apparatus in which the main-sealing device and the assist-sealing device are integrated into one device.

In the above embodiment, the turn table 21 functions as the conveyor for the sleeve, and the sleeve forming section 20 functions as the sleeve forming apparatus. The conveyor for the sleeve is not limited to the turn table, and may be changed to various structures, which can circulate the mandrel along a certain path. The sleeve forming apparatus is not limited to the embodiment integrated with the assembling apparatus. The sleeve forming section 20 and the assembling section 30 are constructed as apparatuses independent of each other. If the curled portion 3*a* is not necessary for the sleeve 3, it is possible to extend the body 23*a* of the mandrel 23 to a length equal to or greater than the length of the sleeve 3, thereby omitting the assist seal device 240. The main-sealing device 220 and the assist-sealing device 240 may be integrated together, such as shown in FIG. 39. In the device 220 of FIG. 39, the press block 222 is formed with a length equal to or greater than that of the joint line 3*d* of the blank 3'. When the press block 222 is pressed on the joint line 3*d*, the joint support 224 is disposed inside the projecting portion 3*e* to support the joint line 3*d* from the inside thereof. The joint support 224 can be driven by a mechanism similar to that for driving the nipper 245 of FIG. 20.

In the above embodiment, the turn table 31 functions as the conveyor for the cup body, the assembling section 30 functions as the assembling apparatus, and the rotary drive mechanism 321 functions as the holder driving device. The conveyor for the cup body is not limited to the turn table, and may be changed to various structures, which can circulate the cup holder along a certain path. The assembling apparatus is not limited to the above embodiment integrated with the sleeve forming apparatus. Various processing besides the processing of the ribs 2*e*, 2*f* may be performed with using the rotation of the cup body given by the holder driving device.

Figure 40:
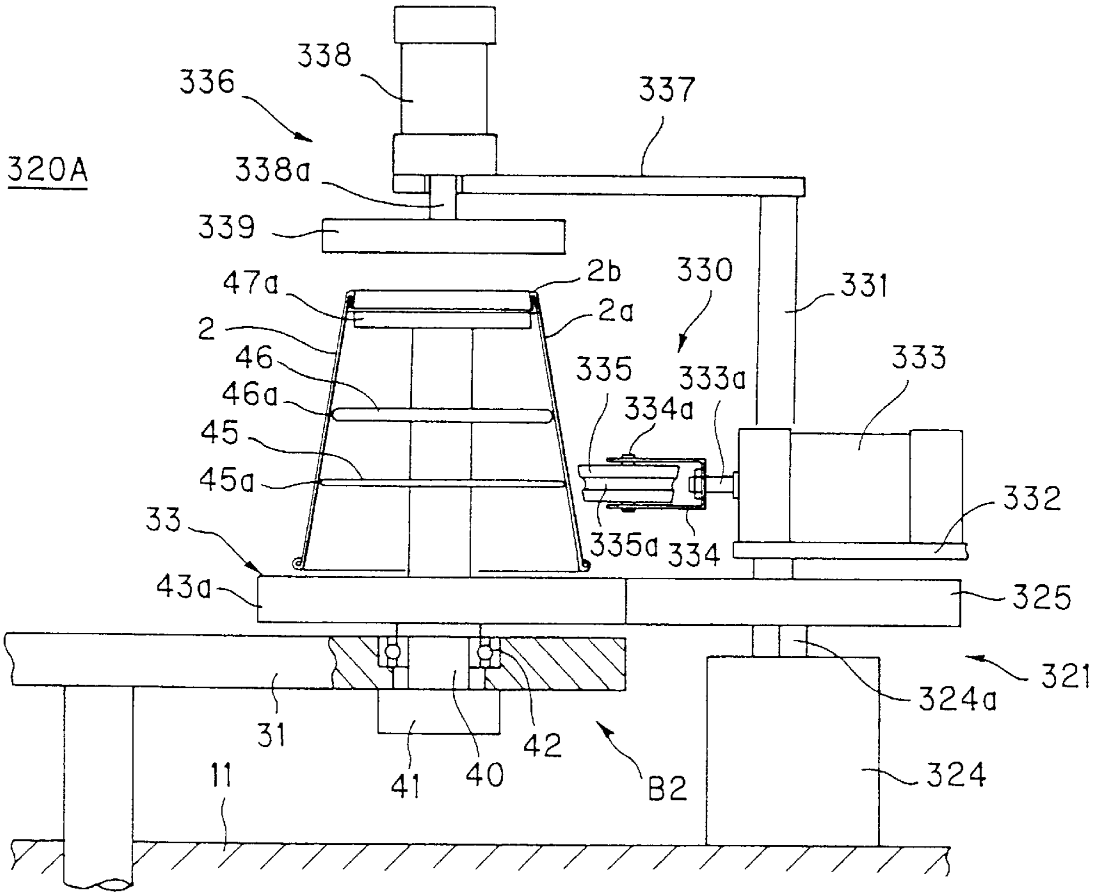
FIGS. 40 and 41 are views illustrating variations of the rib-processing device.
Figure 41:
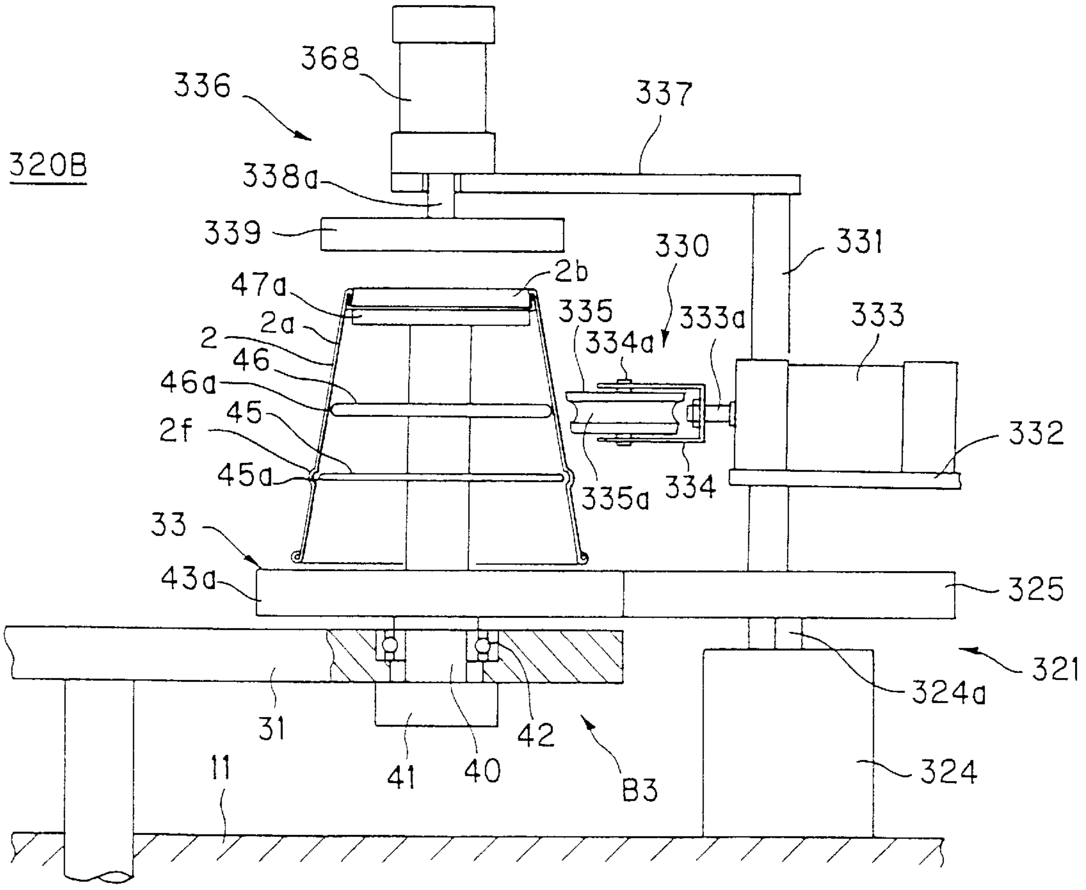

FIGS. 40 and 41 show a variation of the rib-processing device 320. In these figures, the element corresponding to that in FIGS. 28 to 30 is designated by the same numeral as is used therein. The devices 320A, 320B illustrated in FIGS. 40 and 41 are identical to each other except for the vertical position of the press mechanism 330. Namely, the mechanism 330 in FIG. 40 is located to form the rib 2*f*, and the mechanism 330 in FIG. 41 is located to form the rib 2*e*, respectively. The support shaft 40 is rotatably attached to the turn table 31 through a bearing 42. The flanges 45*a*, 46*a* and the bottom support portion 47*a* are integrally formed on the support shaft 40.

Figure 42:
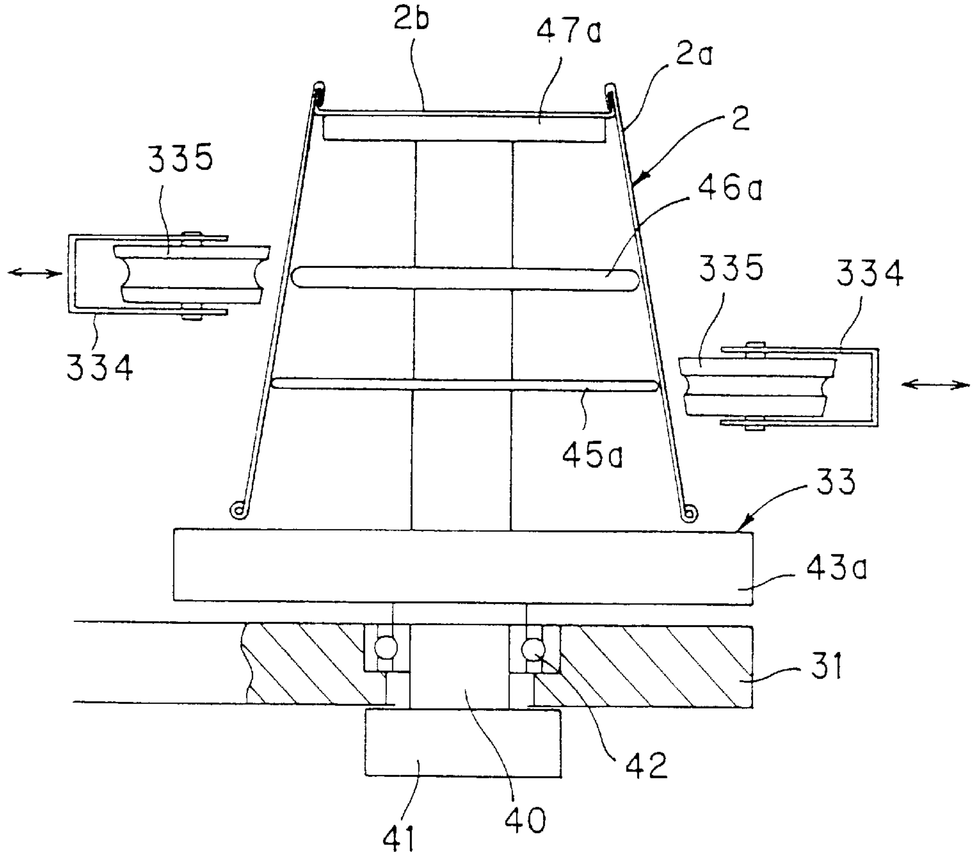
FIG. 42 is a view illustrating further variation of the rib-processing device.

FIG. 42 shows another variation of the rib-processing device 320. In FIG. 42, the two press rollers 335, 335 are disposed at opposite sides of the cup body 2 in the radial direction thereof to counterbalance the pressing force from the rollers 335 to the cup body 2 with each other in the radial direction, thereby preventing bias or deviation of the cup body 2.

If the groove 335*a* is formed on the outer periphery of the flange 45*a* or 46*a*, and a projection complementary to the groove 335*a* is formed on the outer circumferential surface of the roller 335, it is possible to project the rib 2*f* or 2*e* inward as shown in FIG. 38B and FIGS. 38D to 38H. If the space in the cup body 2 is sufficient, it is possible to dispose the press roller 335 inside the cup body 2, while disposing a model member outside the cup body 2. In this case, the rib projecting inward can be processed by forming the groove 335*a* on the roller 335 while forming a projection complementary to the groove 335*a* on the model member disposed outside the cup body 2. On the contrary, the rib projecting outward can be processed by forming the groove 335*a* on the model member disposed outside the cup body 2 while forming a projection complementary to the groove 335*a* on the roller 335.

The rib-processing device of the present invention can be used to form various containers with the rib. The rib formed by the device of the present invention is not limited to that encircling the container, a rib partially extending along the circumferential direction thereof as shown in FIG. 2B can be formed by the device of the present invention. Such partial rib can be formed, for example, by detaching the roller 335 from the cup body 2 intermittently during the roller 335 relatively revolves around the cup body 2.

INDUSTRIAL APPLICABILITY

The heat-insulating container according to the present invention can be used as a container for taking an instant dried food or the like to the market. The producing apparatus, the sleeve-forming apparatus, the assembling apparatus, the rib-processing apparatus and the process of the present invention can be used for preparing various containers.

What is claimed is:

1. A heat-insulating container comprising:

a paper cup body with a bottom, which has an inner surface coated with a polyolefin resin and is provided with an outward curled portion formed at an upper opening end of the cup body and at least one horizontal rib formed on a side wall of the cup body so as to project outward therefrom; and an inverse-frustoconical paper sleeve provided with an inward curled portion formed at a lower end of the sleeve;

the cup body and the sleeve being integrally combined with each other so that an upper end on the sleeve is bonded to an outer periphery of the side wall of the cup body at a position adjacent to the outward curled portion of the cup body, and an inner surface of the inward curled portion of the sleeve contacts an outer periphery of a lower portion of the side wall of the cup body so that a space increasing gradually from an upper portion of the container toward the bottom for heat-insulating is formed between the side wall of the cup body and the sleeve, the horizontal rib being projected into the space.

2. A heat-insulating container according to claim 1, wherein a plurality of horizontal ribs is provided at a predetermined distance.

3. A heat-insulating container according to claim 1, wherein said at least one horizontal rib extends continuously over an entire periphery of the side wall of the cup body.

4. A heat-insulating container according to claim 1, wherein said at least one horizontal rib extends intermittently in a circumferential direction of the side wall of the cup body.

5. A heat-insulating container according to claim 1, wherein a heat-insulating corrugated member is arranged between the sleeve and an upper portion of the side wall of the cup body.

6. A heat-insulating container comprising:

a cup body having a side wall and a bottom disposed at a lower end of the side wall, and an outward curled portion disposed at an upper end of the side wall;

a sleeve disposed outside the side wall of the cup body and having an inward curled portion contacting an outer periphery of the lower end portion of the cup body so as to maintain a space, for heat-insulation, increasing gradually from an upper portion of the container toward the bottom in a state wherein an upper end of the sleeve is bonded to an area at an upper position of the side wall of the cup body and adjacent to the outward curled portion;

the side wall of the cup body being provided with at least one outward projecting rib extending in a circumferential direction thereof, the outward projecting rib being disposed separately downward from the bonding area so as to project outward from a portion of the side wall specifically manufactured as being flat.

7. A heat-insulating container according to claim 6, wherein the outward projecting rib being provided at a position for indicating an appropriate level of liquid to be poured into the container.

8. A heat-insulating container according to claim 6, wherein the side wall of the cup body is provided with an inward projecting rib extending in the circumferential direction thereof near the bonding area in addition to the at least one outward projecting rib.

9. A heat-insulating container according to claim 8, wherein the inward projecting rib functions as a line indicating a proper level of liquid poured into the container.

10. A heat-insulating container used for an instant dried food such as Chinese noodles comprising:

a cup body having a side wall and a bottom disposed on one end of the side wall; and a sleeve disposed outside the side wall of the cup body and having an inward curled portion contacting an outer periphery of the lower end portion of the cup body so as to maintain a space, for heat-insulation, increasing gradually from an upper portion of the container toward the bottom in a state wherein an upper end of the sleeve is bonded to an area at an upper position of the side wall of the cup body and adjacent to the outward curled portion;

wherein a rib indicating a proper level of boiled water poured into the cup body is provided on the side wall so as to project inward from a flat portion of the side wall.

11. A heat-insulating container according to claim 10, wherein the inward projecting rib is included in the bonding area and indicates a proper level of boiled water poured into the cup body, the rib being projected flat from a flat portion of the side wall.

12. A producing apparatus for combining a sleeve on an outer periphery of a cup body to produce a heat-insulating container comprising:

a sleeve forming section for forming the sleeve by curling a blank sheet cylindrically and joining both ends thereof; and an assembling section for combining the sleeve on the outer periphery of the cup body;

wherein the sleeve forming section comprises:

a blank-supplying device for feeding the blank sheet to a sleeve holder, and an end curling device for forming a curled portion at an end of the sleeve; and a rib-processing device for processing a rib extending in its circumferential direction on a side wall of the container;

an adhesive-applying device for applying an adhesive agent on the side wall of the cup body formed with the rib; and a sleeve-delivering device for putting the sleeve formed by the sleeve forming section on the outer periphery of the cup body on which the adhesive agent is applied.

13. A producing apparatus for combining a sleeve on an outer periphery of a cup body to produce a heat-insulating container comprising:

a sleeve holder capable of holding the sleeve;

a cup holder capable of holding the cup body; and a driving device for circulating the sleeve holder and the cup holder along respective certain circulation paths, wherein the apparatus is provided along the circulation path of the sleeve holder with a curling device for curling up a blank on the sleeve holder and for joining both ends of the curled blank to each other and a sleeve-ejecting device for removing the sleeve from the sleeve holder;

the apparatus is also provided along the circulation path of the cup holder with a cup-body-supplying device for supplying the cup body to the cup holder, a rib-processing device for forming a rib extending in its circumferential direction on a side wall of the cup body set on the cup holder, an adhesive-applying device for applying an adhesive agent to the side wall of the cup body formed with the rib, and a sleeve-delivering device for receiving the sleeve ejected by the sleeve-ejecting device and for putting the received sleeve on the outer periphery of the cup body on which the adhesive agent is applied; and the driving device drives the sleeve holder and the cup holder in such a manner that the cup body on which the adhesive agent is applied is carried in the sleeve-delivering device when the sleeve on the sleeve holder is carried in the sleeve-ejecting device.

14. A producing apparatus according to claim 13, wherein an end-curling device for processing a curled portion on one end of the sleeve is provided on the circulation path of the sleeve holder.

15. A producing apparatus according to claim 13, wherein a sleeve-fitting device for pressing the sleeve which is put on the cup body by the sleeve-delivering device toward the cup body with aligning the sleeve with respect to the cup body is provided on the circulation path of the cup holder.

16. A producing apparatus according to claim 13, further comprising a blank-supplying device for supplying the blank to the curling device, the blank-supplying device being provided with an adhesive applicator for applying an adhesive agent to one end of the blank.

17. A producing apparatus according to claim 16, wherein a sealing device for pressing both ends of the blank overlapped by the curling device to each other is provided on the circulation path of the sleeve holder.

18. An assembling apparatus for combining a sleeve on an outer periphery of a cup body to produce a heat-insulating container, comprising:

a conveyor capable of circulating along the circulation path of the cup body;

a cup holder mounted on the conveyor and having a rotary portion capable of rotating about an axis thereof with holding the cup body thereon;

a driving device for moving the conveyor to feed the cup body step by step with respect to stations defined along the circulation path;

a holder driving device provided in a driving station which is selected from the stations and capable of being connected with the rotary portion of the cup holder in the driving station to rotate the cup holder;

an adhesive-applying device provided in an applying station which is selected from the stations and is located forward from the driving station in a circulation direction of the conveyor and capable of applying an adhesive agent on an outer periphery of the cup body during rotation of the cup body mounted on the rotating cup holder; and a sleeve-delivering device provided in a delivering station which is selected from the stations and is located forward from the applying station in the circulation direction and capable of putting the sleeve on the cup body.

19. An assembling apparatus according to claim 18, wherein the rotary portion of the cup holder is provided with a rotation input portion coaxial with the cup body, and the holder driving device comprises a rotation output portion and a drive power source for rotating output portion.

20. An assembling apparatus according to claim 18, wherein the adhesive-applying device is provided with a nozzle ejecting the adhesive agent toward the outer periphery of the cup body.

21. An assembly apparatus according to claim 18, wherein the cup holder is provided with an abutment portion capable of being brought into contact with an inner surface of a side wall of the cup body, and the holder driving device comprises a press mechanism capable of pressing a predetermined model member to the abutment portion with nipping the side wall therebetween to process the side wall.

22. An assembling apparatus according to any one of claims 18 to 21, wherein the conveying comprises a turn table capable of turning about a predetermined axis.

23. An assembling apparatus for combining a sleeve on an outer periphery of a cup body to produce a heat-insulating container, comprising:

a cup holder capable of holding a cup in an inverted posture in a vertical direction;

a sleeve-delivering device capable of putting the sleeve on the outer periphery of the cup body held on the cup holder from the upper side thereof; and a sleeve-fitting device having a jig capable of contacting an end portion of the sleeve put on the cup body in an axial direction thereof, the sleeve-fitting device being capable of pressing the jig toward the cup body to arrange the sleeve and the cup body with each other in an axial direction thereof;

wherein the jig is provided with an aligning equipment capable of engaging with the sleeve before the sleeve is pressed down by the jig to move the sleeve in a radial direction thereof so as to be aligned with the cup body.

24. An assembling apparatus according to claim 23, wherein the aligning equipment comprises pins arranged around the axis of the cup body, on the cup holder.

25. An assembling apparatus according to claim 24, wherein each of the pins is supported by a jig body of the fig so as to be movable in the vertical direction, and a lower end portion of each of the pins is formed with a tapered or rounded portion capable of contacting a lower end of a side wall of the cup body, which surrounds a bottom of the cup body.

* * * * *

UNITED STATES PATENT AND TRADEMARK OFFICE

CERTIFICATE OF CORRECTION

PATENT NO. : 6,663,926 B1
DATED : December 16, 2003
INVENTOR(S) : Yamada et al.

It is certified that error appears in the above-identified patent and that said Letters Patent is hereby corrected as shown below:

Title page,
Item [12], delete "Okushita et al." and insert -- Yamada et al. --
Item [75], Inventors, delete "Masataka Okushita, Tokyo (JP);"

Signed and Sealed this

Eighth Day of June, 2004

JON W. DUDAS
*Acting Director of the United States Patent and Trademark Office*